(12) United States Patent
Zitomer et al.

(10) Patent No.: US 12,152,197 B2
(45) Date of Patent: Nov. 26, 2024

(54) SYSTEMS FOR PYROLYSIS AND INCREASED PRODUCTION OF PYROLYSIS GAS

(71) Applicant: Marquette University, Milwaukee, WI (US)

(72) Inventors: Daniel Zitomer, Shorewood, WI (US); Zhongzhe Liu, Milwaukee, WI (US); Patrick McNamara, Milwaukee, WI (US)

(73) Assignee: Marquette University, Milwaukee, WI (US)

( * ) Notice: Subject to any disclaimer, the term of this patent is extended or adjusted under 35 U.S.C. 154(b) by 871 days.

(21) Appl. No.: 17/153,651

(22) Filed: Jan. 20, 2021

(65) Prior Publication Data

US 2021/0222071 A1  Jul. 22, 2021

Related U.S. Application Data

(60) Division of application No. 16/220,931, filed on Dec. 14, 2018, now abandoned, which is a
(Continued)

(51) Int. Cl.
*C10B 53/02* (2006.01)
*B01J 21/18* (2006.01)
(Continued)

(52) U.S. Cl.
CPC ............. *C10B 53/02* (2013.01); *B01J 21/18* (2013.01); *B01J 23/02* (2013.01); *B01J 23/745* (2013.01);
(Continued)

(58) Field of Classification Search
CPC .. C10B 53/02; B01J 21/18; B01J 23/02; B01J 23/745; B01J 23/78; B01J 37/084; B01J 2523/23; B01J 2523/842; C20F 11/10; G10G 1/086; G10G 2300/1011; C10K 3/02; C10L 1/02; C10L 5/447; C10L 2290/02;
(Continued)

(56) References Cited

U.S. PATENT DOCUMENTS 4,781,796 A  11/1988  Bridle et al.
5,466,383 A  11/1995  Lee
(Continued)

OTHER PUBLICATIONS

Sun et al. ("Decomposition and gasification of pyrolysis volatiles from pine wood through a bed of hot char", Fuel 90 (2011) 1041-1048) . (Year: 2011).*
(Continued)

*Primary Examiner* — Ali Z Fadhel
(74) *Attorney, Agent, or Firm* — Quarles & Brady LLP

(57) ABSTRACT

Disclosed herein are processes, systems, and catalysts for improving pyrolysis technology. The disclosed processes and systems utilize a catalyst to increase pyrolysis gas (py-gas) and decrease bio-oil yields in pyrolysis reactions. The disclosed catalysts may include biochar derived from pyrolysis of industrial residuals, such as pyrolysis of wastewater biosolids (WB) and paper mill sludge (PMS). The disclosed catalysts also may include ash derived from incineration of wastewater biosolids ("biosolids incineration ash" (BIA)).

9 Claims, 20 Drawing Sheets

Related U.S. Application Data continuation-in-part of application No. PCT/US2017/038130, filed on Jun. 19, 2017.

(60) Provisional application No. 62/351,757, filed on Jun. 17, 2016.

(51) Int. Cl.

| | |
|---|---|
| B01J 23/02 | (2006.01) |
| B01J 23/745 | (2006.01) |
| B01J 23/78 | (2006.01) |
| B01J 27/185 | (2006.01) |
| B01J 27/186 | (2006.01) |
| B01J 37/08 | (2006.01) |
| C02F 11/10 | (2006.01) |
| C10G 1/08 | (2006.01) |
| C10K 3/02 | (2006.01) |
| C10L 1/02 | (2006.01) |
| C10L 5/44 | (2006.01) |

(52) U.S. Cl.
CPC .............. *B01J 23/78* (2013.01); *B01J 37/084* (2013.01); *C02F 11/10* (2013.01); *C10G 1/086* (2013.01); *C10K 3/02* (2013.01); *C10L 1/02* (2013.01); *C10L 5/447* (2013.01); *B01J 27/1853* (2013.01); *B01J 27/186* (2013.01); *B01J 2523/00* (2013.01); *B01J 2523/22* (2013.01); *B01J 2523/23* (2013.01); *B01J 2523/842* (2013.01); *C10G 2300/1011* (2013.01); *C10L 2290/02* (2013.01); *Y02E 50/10* (2013.01); *Y02E 50/30* (2013.01); *Y02P 30/20* (2015.11)

(58) Field of Classification Search
CPC .......... Y02E 50/10; Y02E 50/30; Y02P 30/20; Y02W 10/40
See application file for complete search history.

(56) References Cited

U.S. PATENT DOCUMENTS

| | | | |
|---|---|---|---|
| 5,728,271 | A | 3/1998 | Piskorz et al. |
| 5,847,248 | A | 12/1998 | Bridle et al. |
| 6,362,127 | B1 | 3/2002 | Khalili et al. |
| 8,394,264 | B2 | 3/2013 | Sappok et al. |
| 8,790,428 | B2 | 7/2014 | Tetzlaff |
| 2009/0126271 | A1 | 5/2009 | Kyo et al. |
| 2015/0218457 | A1 | 8/2015 | Jacobsen |

OTHER PUBLICATIONS

Al-Rahbi et al. ("Thermal decomposition and gasification of biomass pyrolysis gases using a hot bed of waste derived pyrolysis char", Bioresource Technology 204 (2016) 71-79). (Year: 2016).*

Al-Rahbi et al., Thermal Decomposition and Gasification of Biomass Pyrolysis Gases Using a Hot Bed of Waste Derived Pyrolysis Char, Bioresource Technology, 2016, 204:71-79.

Antropov et al., Synthesis Gas Production as a Result of Biomass Torrefaction, International Scientific Journal for Alternative Energy and Ecology, 2011, 10(102):42-46.

Cao et al., Sewage Sludge-to-Energy Approaches Based on Anaerobic Digestion and Pyrolysis: Brief Overview and Energy Efficiency Assessment, Renewable and Sustainable Energy Reviews, 2012, 16(3):1657-1665.

Carey et al., Biosolid Derived Biochar to Immobilize and Recycle Ammonium from Wastewater for Agronomy, Proceedings of the Water Environment Federation, 2013, 19:107-120.

Carey et al., The Impact of Triclosan on the Spread of Antibiotic Resistance in the Environment, Frontiers in Microbiology, 2015, vol. 5, Article 780, pp. 1-11.

Carey et al., Biochar from Pyrolysis of Biosolids for Nutrient Adsorption and Turfgrass Cultivation, Water Environment Research, 2015, 87(12):2098-2106.

Carey et al., Triclocarban Influences Antibiotic Resistance and Alters Anaerobic Digester Microbial Community Structure, Environmental Science & Technology, 2016, 50(1):126-134.

Carey et al., Chronic Exposure to Triclosan Sustains Microbial Community Shifts and Alters Antibiotic Resistance Gene Levels in Anaerobic Digesters, Environmental Science: Processes & Impacts, 2016, 18(8):1060-1067.

Clarke et al., Review of 'Emerging' Organic Contaminants in Biosolids and Assessment of International Research Priorities for the Agricultural Use of Biosolids, Environment International, 2011, 37(1):226-247.

Donatello et al., Recycling and Recovery Routes for Incinerated Sewage Sludge Ash (ISSA): A Review, Waste Management, 2013, 33(11):2328-2340.

Eggen et al., Reducing the Discharge of Micropollutants in the Aquatic Environment: The Benefits of Upgrading Wastewater Treatment Plants, Environmental Science & Technology, 2014, 48:7683-7689.

Evans, Biosolids in Europe, Proceedings of the Water Environment Federation, 2012, No. 2, pp. 108-117.

Fonts et al., Sewage Sludge Pyrolysis for Liquid Production: A Review, Renewable and Sustainable Energy Reviews, 2012, 16(5):2781-2805.

Guan et al., Catalytic Steam Reforming of Biomass Tar Over Iron- or Nickel-Based Catalyst Supported on Calcined Scallop Shell, Applied Catalysis B: Environmental, 2012, 115-116:159-168.

Gude, Energy Positive Wastewater Treatment and Sludge Management, Edorium Journal of Waste Management, 2015, 1:10-15.

Hoffman et al., Pyrolysis of Wastewater Biosolids Significantly Reduces Estrogenicity, Journal of Hazardous Materials, 2016, 317:579-584.

Hossain et al., Agronomic Properties of Wastewater Sludge Biochar and Bioavailability of Metals in Production of Cherry Tomato (*Lycopersicon esculentum*), Chemosphere, 2010, 78:1167-1171.

Jhansi et al., Wastewater Treatment and Reuse: Sustainability Options, Consilience, 2013, 10:1-15.

Khanmohammadi et al., Effect of Pyrolysis Temperature on Chemical and Physical Properties of Sewage Sludge Biochar, Waste Management & Research, 2015, 33(3):275-283.

Kim et al., Examination of Three Different Organic Waste Biochars as Soil Amendment for Metal-Contaminated Agricultural Soils, Water Air Soil Pollut, 2015, 226:282, 11 pages.

Klinghoffer et al., Catalyst Properties and Catalytic Performance of Char from Biomass Gasification, Industrial & Engineering Chemistry Research, 2012, 51(40):13113-13122.

Lehto et al., Fuel Oil Quality and Combustion of Fast Pyrolysis Bio-Oils, VTT Technology 87, 2013, 84 pages.

Li et al., Hydrogen Production from Coal Gasification in Supercritical Water with a Continuous Flowing System, International Journal of Hydrogen Energy, 2010, 35(7):3036-3045.

Li, Importance of Volatile-Char Interactions During the Pyrolysis and Gasification of Low-Rank Fuels-A Review, Fuel, 2013, 112:609-623.

Liao et al., Detecting Free Radicals in Biochars and Determining Their Ability to Inhibit the Germination and Growth of Corn, Wheat and Rice Seedlings, Environmental Science & Technology, 2014, 48(15):8581-8587.

Liu et al., Speciation Evolutions of Heavy Metals During the Sewage Sludge Incineration in a Laboratory Scale Incinerator, Energy & Fuels, 2010, 24(4):2470-2478.

Liu et al., Sorption Enhanced Steam Hydrogasification of Coal for Synthesis Gas Production with In-Situ CO2 Removal and Self-Sustained Hydrogen Supply, International Journal of Hydrogen Energy, 2013, 38(17):7016-7025.

Liu, Development of a Sorption Enhanced Steam Hydrogasification Process for In-situ Carbon Dioxide (CO2) Removal and Enhanced Synthetic Fuel Production, 2014, Dissertation, University of California Riverside, 151 pages.

Liu et al., The Catalytic Pyrolysis of Food Waste by Microwave Heating, Bioresource Technology, 2014, 166:45-50.

(56) References Cited

OTHER PUBLICATIONS

Liu et al., Biochar Production and Bio-Oil Upgrading by Synergistic Catalytic Pyrolysis of Wastewater Biosolids and Industrial Wastes, Proceedings of the Water Environment Federation, 2016, 9:3182-3187.
Liu et al., Product Upgrading During Biosolids Pyrolysis by Using a Low-Cost Natural Catalyst, Proceedings of the Water Environment Federation, 2016, 3:796-802.
Lu et al., Land Application of Biosolids in the USA: A Review, Applied and Environmental Soil Science, 2012, vol. 2012, Article 201462, 11 pages.
U et al., Characterization of Sewage Sludge-Derived Biochars from Different Feedstocks and Pyrolysis Temperatures, Journal of Analytical and Applied Pyrolysis, 2013, 102:137-143.
Lumley et al., Techno-Economic Analysis of Wastewater Sludge Gasification: A Decentralized Urban Perspective, Bioresource Technology, 2014, 161:385-394.
Mani et al., Catalytic Decomposition of Toluene Using a Biomass Derived Catalyst, Fuel Processing Technology, 2013, 114:118-125.
McNamara et al., The Effect of Thermal Hydrolysis Pretreatment on the Anaerobic Degradation of Nonylphenol and Short-Chain Nonylphenol Ethoxylates in Digested Biosolids, Water Research, 2012, 46(9):2937-2946.
McNamara et al., Pyrolysis of Wastewater Biosolids: Lab-Scale Experiments and Modeling, Proceedings of the Water Environment Federation, 2014, 14 pages.
McNamara et al., Pyrolysis of Dried Wastewater Biosolids can be Energy Positive, Water Environment Research, 2016, 88(9):804-810.
Min et al., Catalytic Reforming of Tar During Gasification. Part I. Steam Reforming of Biomass Tar Using Ilmenite as a Catalyst, Fuel, 2011, 90(5):1847-1854.
Min et al., Catalytic Reforming of Tar During Gasification. Part II. Char as a Catalyst or as a Catalyst Support for Tar Reforming, Fuel, 2011, 90(7):2545-2552.
Mo et al., Energy-Nutrients-Water Nexus: Integrated Resource Recovery in Municipal Wastewater Treatment Plants, Journal of Environmental Management, 2013, 127:255-267.
Muradov et al., Production and Characterization of Lemna Minor Bio-Char and its Catalytic Application for Biogas Reforming, Biomass and Bioenergy, 2012, 42:123-131.
Ren, Catalytic Microwave Torrefaction and Pyrolysis of Douglas Fir Pellet to Improve Biofuel Quality, Dissertation, Dec. 2012, pp. 1-2, 4, 10-11, 77, 79, 82, 88, 91, 125.
Ren et al., Hydrocarbon and Hydrogen-Rich Syngas Production by Biomass Catalytic Pyrolysis and Bio-Oil Upgrading over Biochar Catalysts, RSC Advances, 2014, 4(21):10731-10737.
Ross et al., Emerging Investigators Series: Pyrolysis Removes Common Microconstituents Triclocarban, Triclosan, and Nonylphenol from Biosolids, Environmental Science: Water Research & Technology, 2016, 2(2):282-289.
Rover et al., Stabilization of Bio-Oils Using Low Temperature, Low Pressure Hydrogenation, Fuel, 2015, 153:224-230.
Samolada et al., Comparative Assessment of Municipal Sewage Sludge Incineration, Gasification and Pyrolysis for a Sustainable Sludge-to-Energy Management in Greece, Waste Management, 2014, 34(2):411-420.
Shen et al., Recent Progresses in Catalytic Tar Elimination During Biomass Gasification or Pyrolysis-A Review, Renewable and Sustainable Energy Reviews, 2013, 21:371-392.
Shen et al., In-situ Catalytic Conversion of Tar Using Rice Husk Char-Supported Nickel-Iron Catalysts for Biomass Pyrolysis/Gasification, Applied Catalysis B: Environmental, 2014, 152-153:140-151.
Sun et al., Decomposition and Gasification of Pyrolysis Volatiles from Pine Wood through a Bed of Hot Char, Fuel, 2011, 90(3):1041-1048.
Tong et al., Triclosan Adsorption Using Wastewater Biosolids-Derived Biochar, Environmental Science: Water Research & Technology, 2016, 2(4):761-768.
Torri et al., Biosolids Soil application: Why a New Special on an Old Issue?, Applied and Environmental Soil Science, vol. 2012, Article 265783, 3 pages.
Transparency Market Research, Biochar Market, https://www.transparencymarketresearch.com/us-biochar-market.html [accessed on Jan. 12, 2016, pursuant to p. 19 of specification].
Venkatesan et al., Mass Balance Model for Sustainable Phosphorus Recovery in a US Wastewater Treatment Plant, Journal of Environmental Quality, 2016, 45(1):84-89.
Wang et al., Catalytic Performance and Characterization of Ni—Fe Catalysts for the Steam Reforming of Tar from Biomass Pyrolysis to Synthesis Gas, Applied Catalysis A: General, 2011, 392(1-2):248-255.
Wang et al., Tar Reforming Using Char as Catalyst During Pyrolysis and Gasification of Shengli Brown Coal, Journal of Analytical and Applied Pyrolysis, 2014, 105:269-275.
Weston et al., Destruction of Tar in a Novel Coanda Tar Cracking System, Energy & Fuels, 2014, 28(2):1059-1065.
Xia et al., Triclocarban, Triclosan, Polybrominated Diphenyl Ethers, and 4-nonylphenol in Biosolids and in Soil Receiving 33-year Biosolids Application, Environmental Toxicology and Chemistry, 2010, 29(3):597-605.
Xu et al., Comprehensive Utilization of the Pyrolysis Products from Sewage Sludge, Environmental Technology, 2015, 36(14):1731-1744.
Yuan et al., Influence of Temperature on Product Distribution and Biochar Properties by Municipal Sludge Pyrolysis, Journal of Material Cycles and Waste Management, 2013, 15(3):357-361.
Zhang et al., An Advanced Biomass Gasification Technology with Integrated Catalytic Hot Gas Cleaning. Part II: Tar Reforming Using Char as a Catalyst or as a Catalyst Support, Fuel, 2013, 112:646-653.
Zhang et al., Heterogeneous Cracking Reaction of Tar Over Biomass Char, Using Naphthalene as Model Biomass Tar, Energy & Fuels, 2014, 28(5):3129-3137.
European Patent Office, Extended Search Report, Application No. 17814256.8, Aug. 13, 2020, 13 pages.
PCT International Search Report and Written Opinion, PCT/US2017/038130, Oct. 5, 2017, 8 pages.
Russian Article, 2015, 7 Pages, Cited in PCT/US2017/038130 International Search Report.
Ahuja et al., A model for primary and heterogeneous secondary reactions of wood pyrolysis, Chemical Engineering & Technology: Industrial Chemistry-Plant Equipment-Process Engineering-Biotechnology, 1996, 19(3):272-282.
Alden et al., Catalytic cracking of naphthalene on dolomite, In "Advances in Thermochemical Biomass Conversion," Springer Science and Business Media Dordrecht, 1993, vol. 1, pp. 216-232.
Amonette et al., Characteristics of biochar: microchemical properties, in "Biochar for Environmental Management - Science and Technology," ProQuest Ebook, 2009, Chapter 3, pp. 33-52.
Archer, Marketing biosolids: the experience of Milorganite with special reference to Canada, in "IWA Specialist Conference: Moving Forward, Waste Water Biosolids Sustainability: Technical, Managerial, and Public Synergy," Conference Proceedings, 2007, pp. 1017-1019.
Baratieri et al., The use of biomass syngas in IC engines and CCGT plants: A comparative analysis, Applied Thermal Engineerings, 2009, 29(16):3309-3318.
Bridle et al., Energy and nutrient recovery from sewage sludge via pyrolysis, Water Science and Technology, 2004, 50(9): 169-175.
Bright et al., Contaminant risks from biosolids land application: contemporary organic contaminant levels in digested sewage sludge from five treatment plants in Greater Vancouver, British Columbia, Environmental Pollution, 2003, 126 (1):39-49.
Chen et al., Ferrite process of electroplating sludge and enrichment of copper by hydrothermal reaction, Separation and Purification Technology, 2008, 62(2):297-303.
Conesa et al., Evolution of gases in the primary pyrolysis of different sewage sludges, Thermochimica Acta, 1998, 313(1):63-73.

(56) References Cited

OTHER PUBLICATIONS

Darmstadt et al., Corrosion of metals by bio-oil obtained by vacuum pyrolysis of softwood bark residues. An X-ray photoelectron spectroscopy and auger electron spectroscopy study, Energy & Fuels, 2004, 18(5): 1291-1301.
Dayton, A review of the Literature on Catalytic Biomass Tar Destruction, Milestone Completion Report, 2002, 33 pages.
Domínguez et al., Biogas to Syngas by Microwave-Assisted Dry Reforming in the Presence of Char, Energy & Fuels, 2007, 21(4):2066-2071.
El-Rub et al., Review of catalysts for tar elimination in biomass gasification processes, Industrial & Engineering Chemistry Research, 2004, 43(22):6911-6919.
El-Rub et al., Experimental comparison of biomass chars with other catalysts for tar reduction, Fuel, 2008, 87(10-11): 2243-2252.
Florin et al., Enhanced hydrogen production from biomass with in situ carbon dioxide capture using calcium oxide sorbents, Chemical Engineering Science, 2008, 63(2):287-316.
Fruehan, The rate of reduction of iron oxides by carbon, Metallurgical Transactions B, 1977, 8B(1): 279-286.
Fytili et al., Utilization of sewage sludge in EU application of old and new methods—A review, Renewable and Sustainable Energy Reviews, 2008, 12(1): 116-140.
Gilbert et al., Tar reduction in pyrolysis vapours from biomass over a hot char bed, Bioresource Technology, 2009, 100(23):6045-6051.
Han et al., The reduction and control technology of tar during biomass gasification/pyrolysis: an overview, Renewable and Sustainable Energy Reviews, 2008, 12(2):397-416.
Harrison, Sorption-Enhanced Hydrogen Production: A Review, Industrial & Engineering Chemistry Research, 2008, 47(17):6486-6501.
Hayashi et al., Roles of inherent metallic species in secondary reactions of tar and char during rapid pyrolysis of brown coals in a drop-tube reactor, Fuel, 2002, 81(15): 1977-1987.
Hossain et al., Thermal characterisation of the products of wastewater sludge pyrolysis, Journal of Analytical and Applied Pyrolysis, 2009, 85(1-2):442-446.
Iguanzo et al., On the pyrolysis of sewage sludge: the influence of pyrolysis conditions on solid, liquid and gas fractions, Journal of Analytical and Applied Pyrolysis, 2002, 63(1):209-222.
Lu et al., Surface area development of sewage sludge during pyrolysis, Fuel, 1995, 74(3): 344-348.
Lu et al., Corrosion properties of bio-oil and its emulsions with diesel, Chinese Science Bulletin, 2008, 53 (23):3726-3734.
Namioka et al., Practical method of gravimetric tar analysis that takes into account a thermal cracking reaction scheme, Energy & Fuels, 2009, 23(12):6156-6162.
Natesakhawat et al., Development of chromium-free iron-based catalysts for high-temperature water-gas shift reaction, Journal of Molecular Catalysis A: Chemical, 2006, 260(1-2): 82-94.
Newsome, The water-gas shift reaction, In "Catalysis Reviews: Science and Engineering," 1980, 21(2):275-318.
NokkosmÄki et al., Catalytic conversion of biomass pyrolysis vapours with zinc oxide, Journal of Analytical and Applied Pyrolysis, 2000, 55(1): 119-131.
Nordgreen et al., Elemental Iron as a Tar Breakdown Catalyst in Conjunction with Atmospheric Fluidized Bed Gasification of Biomass: A Thermodynamic Study, Energy & Fuels, 2006, 20(3):890-895.
Nordgreen et al., Metallic iron as a tar breakdown catalyst related to atmospheric, fluidised bed gasification of biomass, Fuel, 2006, 85(5-6): 689-694.
Nowakowski et al., Phosphorus catalysis in the pyrolysis behaviour of biomass, Journal of Analytical and Applied Pyrolysis, 2008, 83(2): 197-204.
Oasmaa et al., Fuel oil quality of biomass pyrolysis oils state of the art for the end users, Energy & Fuels, 1999, 13 (4):914-21.
Polychronopoulou et al., Absorption-enhanced reforming of phenol by steam over supported Fe catalysts, Journal of Catalysis, 2006, 241(1): 132-148.
Rulkens, Sewage sludge as a biomass resource for the production of energy: Overview and assessment of the various options, Energy & Fuels, 2008, 22(1):9-15.
Sadaka et al., Pyrolysis and bio-oil, University of Arkansas: Division of Agriculture, Agriculture and Natural Resources, FSA1052, United States Department of Agriculture, and County Governments Cooperating, 2009, 6 pages.
Scott et al., Sludge characteristics and disposal alternatives for the pulp and paper industry, In "Proceedings of the 1995 International Environmental Conference," Tappi Press, 1995, pp. 269-279.
Singh et al., Potential benefits and risks of land application of sewage sludge, Waste Management, 2008, 28 (2):347-358.
Sommers et al., Chemical composition of sewage sludge from selected Indiana cities, Proceedings of the Indiana Academy of Science, Purdue University Agricultural Experiment Station, 1972, 82(4957):424-432.
Taralas et al., Thermal and catalytic cracking of n-Heptane in presence of CaO, MgO and Calcined Dolomites, The Canadian Journal of Chemical Engineering, 1991, 69(6): 1413-1419.
Thipkhunthod et al., Pyrolytic characteristics of sewage sludge, Chemosphere, 2006, 64(6): 955-962.
Uddin et al., Catalytic decomposition of biomass tars with iron oxide catalysts, Fuel, 2008, 87(4-5):451-459.
Vreugdenhil et al., Tar formation in pyrolysis and gasification, Energy Research Centre of the Netherlands, 2009, ECN-E-08-087, 37 pages.

\* cited by examiner

1. Reactor vessel 2. Radiative heater 3. Gas purge and release system 4. Thermocouple and pressure gauge 5. Tubular reactor 6. Radiative heater 7. Condenser 8. Ice bath 9. Tedlar® bag

SYSTEMS FOR PYROLYSIS AND INCREASED PRODUCTION OF PYROLYSIS GAS

CROSS-REFERENCE TO RELATED PATENT APPLICATIONS

The present application is a divisional application of U.S. application Ser. No. 16/220,931, filed on Dec. 14, 2018, which is a continuation-in-part application under 35 U.S.C. § 120 of International Application No. PCT/US2017/038130, filed on Jun. 19, 2017, which application claims the benefit of priority under 35 U.S.C. § 119(e) to U.S. Provisional Patent Application No. 62/351,757, filed on Jun. 17, 2016, the contents of which are incorporated herein by reference in their entireties.

BACKGROUND

The field of the invention relates to pyrolysis processes and systems. In particular, the field relates to the use of catalysts for pyrolysis processes and systems that result in increased production of pyrolysis gas (py-gas) and decreased production or elimination of bio-oil.

Pyrolysis refers to the decomposition of a biomass feedstock in the absence of significant oxygen that is brought about by high temperatures. Pyrolysis processes may be characterized as "slow pyrolysis" or "fast pyrolysis." Fast pyrolysis, which is sometimes referred to as "flash pyrolysis," takes place in less than two seconds with temperatures between 300 and 550 degrees Celsius. The three main products of fast pyrolysis and slow pyrolysis are biomass char or "biochar," biomass oil or "bio-oil," and pyrolysis gas or "py-gas," which includes methane, hydrogen, carbon monoxide, carbon dioxide and other constituents. Fast pyrolysis typically yields ~60% bio-oil, ~20% py-gas, and ~20% biochar. Slow pyrolysis takes several minutes to hours to complete and results in biochar as the main product.

Of the three main products of pyrolysis, biochar is utilized as a soil amendment for soil conditioning and carbon sequestration as well as other beneficial applications (cat litter, as a fuel, etc.). In addition, biochar derived from pyrolysis processes may be used as a catalyst in subsequent pyrolysis reactions. (See, e.g., Gilbert et al., *Bioresource Technology*, 100(23), 6045-6051 (2009); Sun et al., *Fuel*, 90(3), 1041-1048 (2011); Bosong et al., Advances in Biomedical Engineering, 9, 59, (2012); and Ren et al., *RSC Advances*, 4(21), 10731-10737 (2014); the contents of which are incorporated herein by reference in their entireties).

The other two main products, py-gas and bio-oil, may be utilized as fuel. Py-gas is relatively clean and can be easily utilized in boilers, internal combustion engines, or other equipment for on-site energy generation. In contrast, bio-oil contains acids and water, and as such, bio-oil is corrosive and difficult to use directly as fuel. Usually, bio-oil is co-combusted with coal or natural gas at an approximately 1:9 mass ratio in boilers for energy recovery. The acidic and corrosive properties of bio-oil are always a concern because they can lead to corrosion, breakdown, and maintenance problems when used in engines. Raw bio-oil may be further processed to produce chemicals and liquid fuel, for example via catalysis, but further processing is costly and is still under development.

Therefore, pyrolysis processes that result in an increase in py-gas production and/or a decrease in bio-oil yield are desirable. Here, the inventors disclose the use of catalysts that can be used in pyrolysis reactions in order to increase py-gas production and to decrease bio-oil production.

SUMMARY

Disclosed herein are processes, systems, and catalysts for improving pyrolysis technology. The present inventors have discovered that certain catalysts may be used to increase pyrolysis gas (py-gas) and decrease bio-oil in pyrolysis reactions. The disclosed catalysts may include biochar derived from pyrolysis of industrial residuals, such as pyrolysis of wastewater biosolids (WB) and paper mill sludge (PMS). The disclosed catalysts also may include ash derived from incineration of wastewater biosolids ("biosolids incineration ash" (BIA)).

In one aspect, the inventors have observed that bio-chars derived from WB (WB-biochar) and PMS (PMS-biochar) as well as biosolids incineration ash" (BIA) exhibit good catalytic performance in pyrolysis processes. In particular, WB-biochar, PMS-biochar, and BIA may be utilized to increase py-gas production and decrease bio-oil production in pyrolysis processes. In addition, WB-biochar, PMS-biochar, and BIA may be utilized to minimize heavy hydrocarbon content in the bio-oil. The color of condensate and bi-oil produced in pyrolysis processes using WB-biochar, PMS-biochar, and BIA as catalysts is more transparent, which is indicative of a lower concentration of unsaturated hydrocarbons. Notably, WB-biochar and PMS-biochar exhibit superior catalytic performance in pyrolysis processes as compared to other biochars in the art, such as biochars prepared from corn stover and wood.

The inventors have observed that the chemical composition of WB-biochar, PMS-biochar, and BIA contributes to their superior performance as catalysts, including the significant content of chemical elements such as transition metals (e.g., iron), alkali earth metals (e.g., calcium) and alkaline earth metals (e.g., magnesium) in the composition of WB-biochar, PMS-biochar, and BIA. Notably, WB-biochar, PMS-biochar, and BIA include a higher content of calcium, magnesium, as well as iron, as compared to biochars obtained from wood and corn stover, which may contribute to their improved catalytic effect.

The catalysts disclosed herein may be used to upgrade pyrolysis vapor to produce more py-gas and less bio-oil. The resulting bio-oil has lower concentrations of heavy unsaturated hydrocarbons indicated by clear color. Hence, WB-biochar, PMS-biochar, and BIA may be used as cost-efficient, superior catalysts and/or catalyst precursors.

DETAILED DESCRIPTION

Definitions

Figure 1:
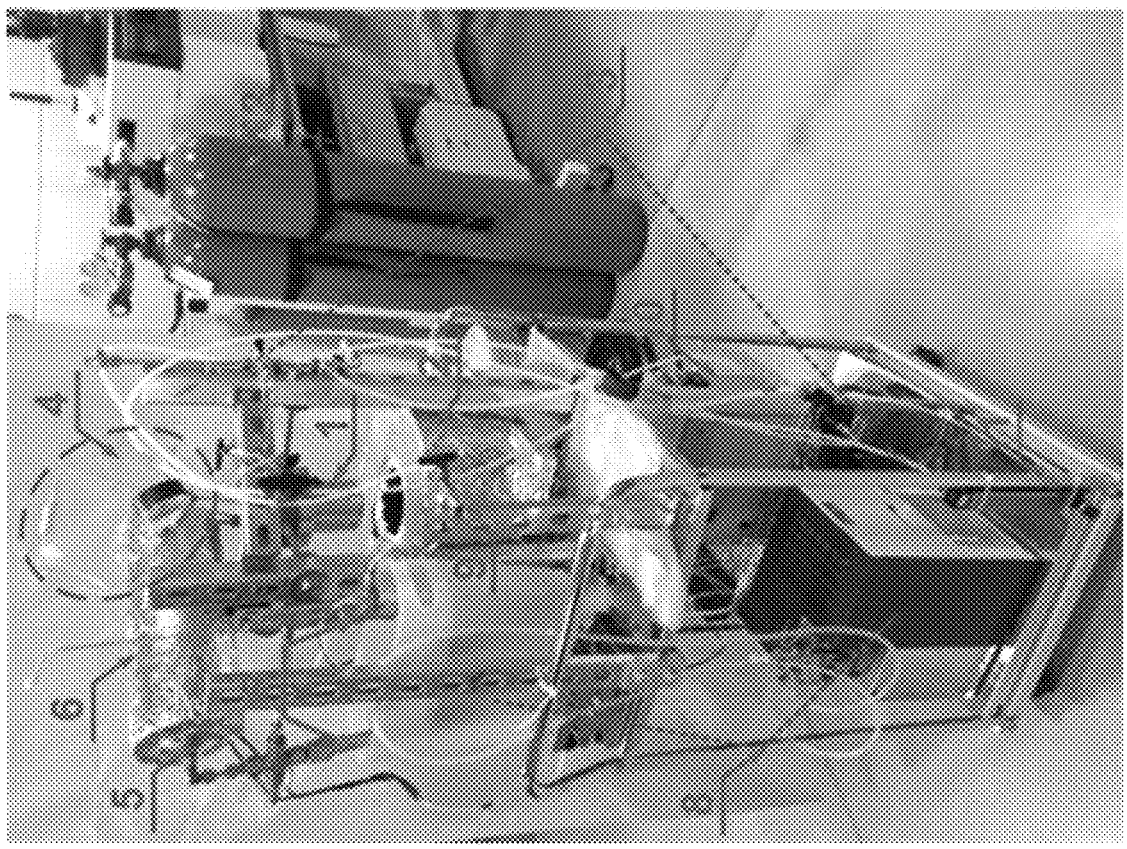
FIG. 1. Mobile pyrolytic system.

The disclosed subject matter further may be described utilizing terms as defined below.

Unless otherwise specified or indicated by context, the terms "a", "an", and "the" mean "one or more." For example, "a catalyst" may refer to "one or more catalysts."

As used herein, "about", "approximately," "substantially," and "significantly" will be understood by persons of ordinary skill in the art and will vary to some extent on the context in which they are used. If there are uses of the term which are not clear to persons of ordinary skill in the art given the context in which it is used, "about" and "approximately" will mean plus or minus ≤10% of the particular term and "substantially" and "significantly" will mean plus or minus >10% of the particular term.

As used herein, the terms "include" and "including" have the same meaning as the terms "comprise" and "comprising." The terms "comprise" and "comprising" should be interpreted as being "open" transitional terms that permit the inclusion of additional components further to those components recited in the claims. The terms "consist" and "consisting of" should be interpreted as being "closed" transitional terms that do not permit the inclusion of additional components other than the components recited in the claims. The term "consisting essentially of" should be interpreted to be partially closed and allowing the inclusion only of additional components that do not fundamentally alter the nature of the claimed subject matter.

As used herein, the term "pyrolysis" refers to the process that takes place when organic matter or biomass is heated in the absence of a stoichiometric amount of oxygen to produce combustible gases and other products. Pyrolysis of biomass at a high temperature (e.g., at a temperature >300, 400, 500, 600, 700, or 800° C., or within a temperature range bounded by any of these values) decomposes the biomass into volatile matter, including condensable vapor (i.e., bio-oil) and gases (i.e., py-gas), and solid carbon(i.e., biochar).

The disclosed catalysts may include one or more of the solid product obtained from pyrolysis of wastewater biosolids (WB-biochar), a biochar obtained from pyrolysis of paper mill sludge (PMS-biochar), or ash obtained from biosolids incineration (BIA). Preferably, the disclosed catalyst includes metal or a metal oxide or metal salt. Suitable metals may include, but are not limited to a transition metal (e.g., iron), an alkali metal (e.g., calcium), and/or an alkali earth metal (e.g., magnesium). Preferably, the metal, metal oxide, and/or metal salt is present in the catalyst at a suitable concentration, for example, at least about 1%, 2%, 3%, 4%, 5%, 6%, 7%, 8%, 9%, 10%, or 15%, or within a concentration range bounded by any of these concentration values. Preferably, the catalyst has a suitable surface area, pore size and/or density, for example where the catalyst has a cumulative surface area as determined by density function theory (DFT) of at least about $1 \times 10^1$, $2 \times 10^1$, $3 \times 10^1$, $4 \times 10^1$, $5 \times 10^1$, $6 \times 10^1$, $7 \times 10^1$, $8 \times 10^1$, $9 \times 10^1$, or $10 \times 10^1$ m$^2$/g, or within a range bounded by any of these values.

As contemplated herein, the disclosed catalysts may include one or more of the solid product obtained from pyrolysis of wastewater biosolids (WB-biochar), a biochar obtained from pyrolysis of paper mill sludge (PMS-biochar), or ash obtained from biosolids incineration (BIA). Ash obtained from biosolids incineration (BIA) may be distinguished from WB-biochar and PMS-biochar because biosolids incineration is performed in an aerobic environment, in contrast to pyrolysis which is performed in an anaerobic environment. As such, any carbon present in biosolids will be burned during incineration to carbon dioxide or carbon monoxide. BIA therefore may be distinguished from WB-biochar and PMS-biochar, for example, based on a relatively lower content of carbon in BIA, where BIA preferably has less than about 10%, 5%, 2%, or 1% carbon by weight, or the BIA has a carbon content within a range bounded by any of these concentration values.

The disclosed catalysts may be utilized in methods or systems that include the use of a single reactor or multiple reactors for pyrolysis. For example, the disclosed catalysts may be directly added to existing single reactors for catalytic pyrolysis to increase production of pyrolysis gas (py-gas) and/or decrease production or elimination of bio-oil. Alternatively or additionally, the disclosed catalysts may be present in a second, separate, downstream reactor from a main, first, upstream reactor, where the second, separate, downstream reactor may be described as a catalytic reactor used treat one or more products of pyrolysis (e.g., pyrolysis vapor containing bio-oil), generated in the main, first, upstream reactor.

Illustrative Embodiments

The following embodiments are illustrative and are not intended to limit the scope of the claimed subject matter.

Embodiment 1. A method comprising performing pyrolysis of a biomass or biosolids in the presence of a catalyst, the catalyst comprising the solid product obtained from pyrolysis of wastewater biosolids (WB-biochar), a biochar obtained from pyrolysis of paper mill sludge (PMS-biochar), or ash obtained from biosolids incineration (BIA).

Embodiment 2. The method of embodiment 1, wherein the catalyst comprises a metal or a salt or oxide thereof selected from calcium, iron, and magnesium.

Embodiment 3. The method of embodiment 2, wherein the catalyst comprises the metal or the salt or oxide thereof at a concentration of at least about 1%, 2%, 3%, 4%, 5%, 6%, 7%, 8%, 9%, or 10% by dry weight, or within a concentration range bounded by any of the foregoing concentration values.

Embodiment 4. The method of any of the foregoing embodiments, wherein the catalyst is WB-biochar produced by pyrolyzing dried biosolids material comprising waste activated sludge, raw primary sludge, anaerobically digested sludge, aerobically digested sludge, lime-stabilized sludge, or a mixture thereof.

Embodiment 5. The method of any of the foregoing embodiments, wherein the WB-biochar or PMS-biochar is a recycled product of pyrolysis.

Embodiment 6. A method comprising treating a product of pyrolysis by heating the product in the presence of a catalyst comprising the solid product obtained from pyrolysis of wastewater biosolids (WB-biochar), a biochar obtained from pyrolysis of paper mill sludge (PMS-biochar), or ash obtained from biosolids incineration (BIA).

Embodiment 7. The method of embodiment 6 comprising: (a) pyrolyzing a biomass or biosolids in a first reactor vessel to generate the pyrolysis product, wherein the pyrolysis product comprises a vapor comprising bio-oil; (b) passing the vapor through a second reactor vessel comprising the catalyst; and (c) condensing the vapor to separate a liquid product comprising bio-oil and a gaseous product comprising py-gas.

Embodiment 8. The method of embodiment 7, wherein the second reactor vessel is heated to a temperature of at least about 400, 500, 600, 700, or 800° C., or within a temperature range bounded by any of these temperature values.

Embodiment 9. The method of embodiment 7, wherein the catalyst and the pyrolysis product are present in the second reactor vessel at a concentration ratio by weight of (0.01-1):1.

Embodiment 10. The method of any of the embodiments of 6-9, wherein the catalyst comprises metal or a salt or oxide thereof.

Embodiment 11. The method of embodiment 10, wherein the metal is selected from calcium, iron, and magnesium.

Embodiment 12. The method of embodiment 10 or 11, wherein the catalyst comprises the metal or the salt or oxide thereof at a concentration of at least about 1%, 2%, 3%, 4%, 5%, 6%, 7%, 8%, 9%, or 10% by dry weight, or within a concentration range bounded by any of the foregoing concentration values.

Embodiment 13. The method of any of embodiment 6-12, wherein the catalyst is WB-biochar produced by pyrolyzing dried biosolids material comprising waste activated sludge, raw primary sludge, anaerobically digested sludge, aerobically digested sludge, lime-stabilized sludge or a mixture thereof.

Embodiment 14. The method of any of embodiments 6-13, wherein the catalyst is a recycled product of pyrolysis.

Embodiment 15. The method of embodiment 7, wherein catalyst is produced in step (a) and recycled for use in step (b).

Embodiment 16. A system for performing pyrolysis comprising a heated reactor vessel for pyrolyzing a biomass, the heated reactor vessel comprising a catalyst, the catalyst comprising a biochar obtained from pyrolysis of wastewater biosolids (WB-biochar), a biochar obtained from pyrolysis of paper mill sludge (PMS-biochar), or ash obtained from biosolids incineration (BIA).

Embodiment 17. The system of embodiment 16, wherein the catalyst comprises metal or a salt or oxide thereof.

Embodiment 18. The system of embodiment 17, wherein the metal is selected from calcium, iron, and magnesium.

Embodiment 19. The system of embodiment 17 or 18, wherein the catalyst comprises the metal or the salt or oxide thereof at a concentration of at least about 1% by dry weight.

Embodiment 20. The system of any of embodiments 16-19, wherein the catalyst is WB-biochar produced by pyrolyzing dried biosolids material comprising waste activated sludge, raw primary sludge, anaerobically digested sludge, aerobically digested sludge, lime-stabilized sludge, or a mixture thereof.

Embodiment 21. A system for performing pyrolysis comprising: (a) a first heated reactor vessel for pyrolyzing a biomass or biosolids to generate a pyrolysis product, wherein the pyrolysis product comprises a vapor; (b) a second heated reactor vessel configured for receiving and treating the pyrolysis product, the second heated reactor vessel comprising a catalyst, the catalyst comprising a biochar obtained from pyrolysis of wastewater biosolids (WB-biochar), a biochar obtained from pyrolysis of paper mill sludge (PMS-biochar), or ash obtained from biosolids incineration (BIA); and (c) a condenser configured for receiving the treated pyrolysis product and separating the vapor to obtain a liquid product comprising bio-oil and a gaseous product comprising py-gas.

Embodiment 22. The system of embodiment 21, further comprising one or more heating elements for heating the first reactor vessel and the second reactor vessel to a temperature of at least about 400, 500, 600, 700, 800° ° C., or to a temperature within a range bounded by any two of the foregoing temperature values.

Embodiment 23. The system of embodiment 21, wherein the catalyst comprises metal or a salt or oxide thereof.

Embodiment 24. The system of embodiment 23, wherein the metal is selected from calcium, iron, and magnesium.

Embodiment 25. The system of embodiment 23 or 24, wherein the catalyst comprises the metal or the salt or oxide thereof at a concentration of at least about 1%, 2%, 3%, 4%, 5%, 6%, 7%, 8%, 9%, 10% by dry weight, or within a concentration range bounded by any two of these values.

Embodiment 26. The system of any of embodiments 21-25, wherein the catalyst is WB-biochar produced by pyrolyzing dried biosolids material comprising waste activated sludge, raw primary sludge, anaerobically digested sludge, or a mixture thereof.

EXAMPLES

Example 1—Product Upgrading During Biosolids Pyrolysis by Using a Low-Cost Natural Catalyst

Abstract

A new wastewater biosolids pyrolysis process coupled with downstream catalysis was investigated. The low-cost natural catalyst was from a specific regional byproduct. The process can synergistically treat regional wastes with wastewater biosolids to produce more energy in the form of pyrolysis gas (py-gas) which is similar to anaerobic digester biogas and can be readily utilized on site. The process can also upgrade and reduce the amount of the bio-oil product that can be corrosive and require upgrading before use as a fuel. Also, a clean, valuable agricultural soil amendment called biochar is produced. The catalyst introduction reduced the bio-oil yield and increased the py-gas yield with feedstock: catalyst mass ratio of 1:1. Meanwhile, the $H_2$ percentage increased during the catalytic process. Moreover, the bio-oil was upgraded to form more cleanly burned fuel. More biosolids energy was transformed to py-gas, and less to bio-oil via the catalysis process.

Introduction

Approximately 6.5 million metric dry tons of wastewater biosolids are produced in the United States (Lu et al., 2012). Treatment processes such as anaerobic digestion, thermophilic digestion, hydrothermal processing can partially recover energy and resources from biosolids (Chen et al., 2008; McNamara et al., 2012) and finally harness biosolids as a fertilizer for land application, but residual energy is not fully utilized and secondary pollution is also a concern (Carey and McNamara, 2014; Clarke and Smith, 2011). Hence, post-treatment processes such as incineration, gasification and pyrolysis are of interest to gain energy, destroy pathogens and organic constituents, and yield products such as biochar (Bridle and Pritchard, 2004; Liu, 2013; Liu et al., 2010).

Compared to incineration and gasification, biosolids pyrolysis is more favorable for energy savings with material recovery (Samolada and Zabaiotou, 2014). Pyrolysis is a process which decomposes organic matter upon heating under anaerobic conditions. The resulting products are biochar, a valuable soil amendment product which offers improved soil moisture holding capacity and plant growth, along with pyrolysis gas (py-gas), and bio-oil which can both be used as fuel. Existing drying systems in water reclamation facilities can be readily coupled with pyrolysis to be a recovery option. Heat dried biosolids are an established type of soil conditioner produced by municipalities such as the Milwaukee Metropolitan Sewerage District (MMSD) and are suitable pyrolysis feedstock. In particular, previous research demonstrated that biosolids-derived biochar can support turfgrass cultivation as an effective fertilizer (Carey et al., 2015). The U.S. biochar market was valued at $1.45 million in 2013 and is projected to reach $4.94 million by 2020 (Transparency Market Research, 2014).

However, the mass fraction of bio-oil during biosolids slow pyrolysis is over 40% of the total product (McNamara et al., 2014). Bio-oil can be an undesirable product because of its acidic, reactive and unstable properties (Lu et al., 2008). Because of this, bio-oil can be challenging to convey and store, often requiring costly equipment or pretreatment before it can be used as a clean fuel or be co-fired with other fuels (Sadaka and Boateng, 2009). In contrast, py-gas more easily can be burned in an engine or burner to supply energy on site. Thus, reducing bio-oil yield and increasing py-gas yield should be investigated.

Catalysis is an efficient pathway to reduce bio-oil while increasing py-gas yields. Primary tars are the main component of bio-oil, which are a black mixture of high molecular weight hydrocarbons and free carbon (Daintith, 2008). Tar destruction using metal containing catalyst is effective (Nordgreen et al., 2006; Wang et al., 2011). In addition to wastewater biosolids, various high-yield wastes are generated in the United States every year, such as agricultural wastes and industrial wastes. Most wastes contain alkali metals and trace heavy metals that have potential catalytic effect. These wastes can be beneficially reclaimed instead of landfilling. Therefore, these wastes could be low-cost natural catalysts for thermochemical processing.

The work described herein was performed to evaluate the catalytic effect of a specific byproduct-derived catalyst on the product yield and quality during biosolids pyrolysis. The goal was to reduce bio-oil production and increase py-gas yield. Meanwhile, the property change of py-gas and bio-oil such as energy content, composition and color was also determined.

Methodology

Figure 2:
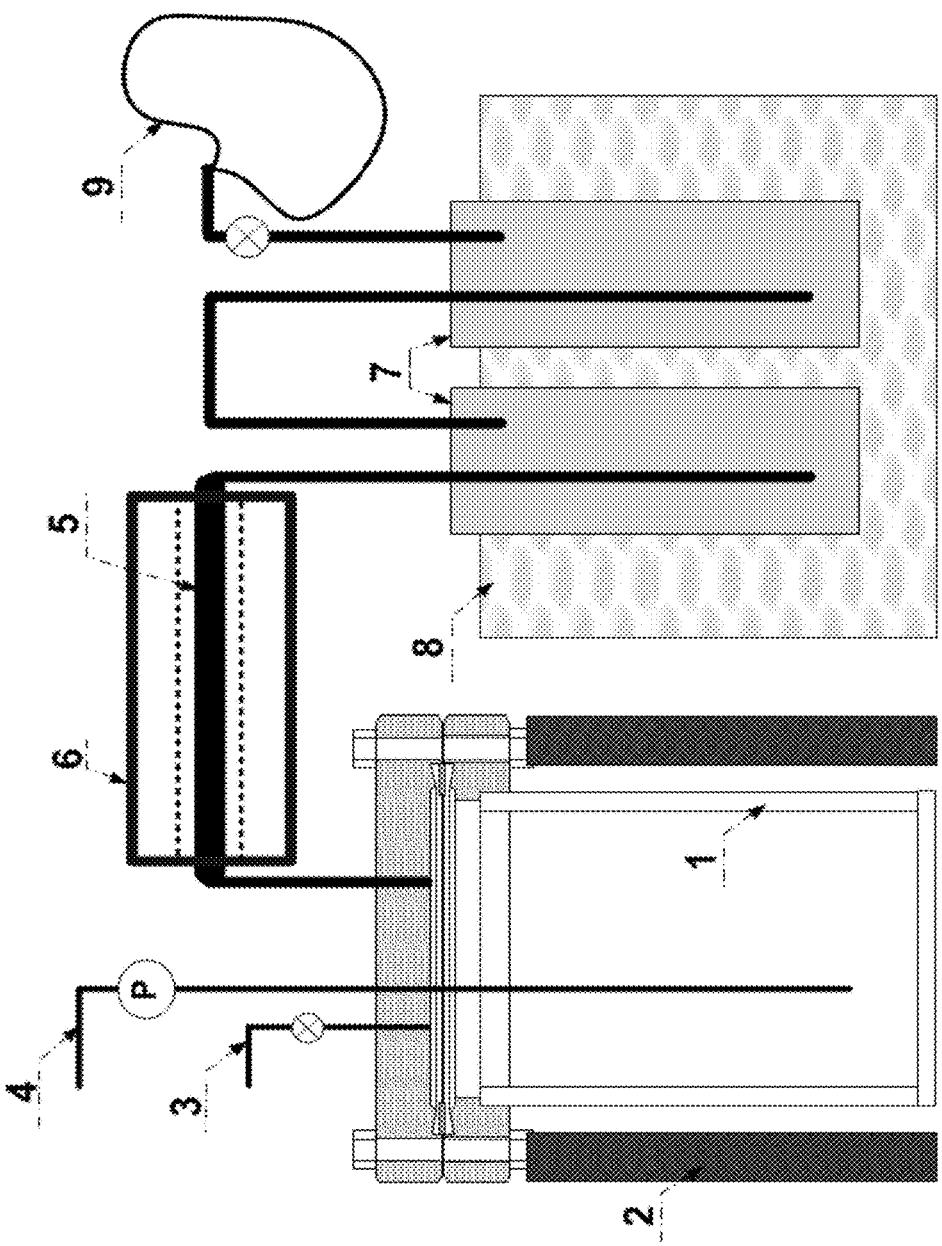
FIG. 2. Schematic of lab-scale pyrolysis system.

Dried biosolids (MilorganiteR) were collected from a water resource reclamation facility (Milwaukee Metropolitan Sewerage District, Milwaukee, Wisconsin). A mobile pyrolytic system was used for this study (FIG. 1 and FIG. 2). The system included a stainless batch vessel, a ceramic radiative heater, a gas purge/release/vacuum system, a downstream tubular reactor, and a collection system for liquid and gas products. The real-time pressure and temperature were monitored by pressure gauges and thermocouples at different locations.

The catalyst was first produced at 500° C. to 800° C. The hot catalyst bed was located in the downstream tubular reactor. The catalyst temperature was maintained at the same temperature as the main reactor vessel. Dried biosolids were pyrolyzed in an oxygen-free environment by purging argon. The catalytic performance was determined by varying pyrolysis temperature and biosolids feedstock to waste-derived catalyst mass ratio. The pyrolysis temperature was varied from 500° ° C. to 800° C.; the biosolids:catalyst mass ratio ranged from 1:1 to 4:1. Blank tests without catalyst were also conducted as controls.

Figure 3:
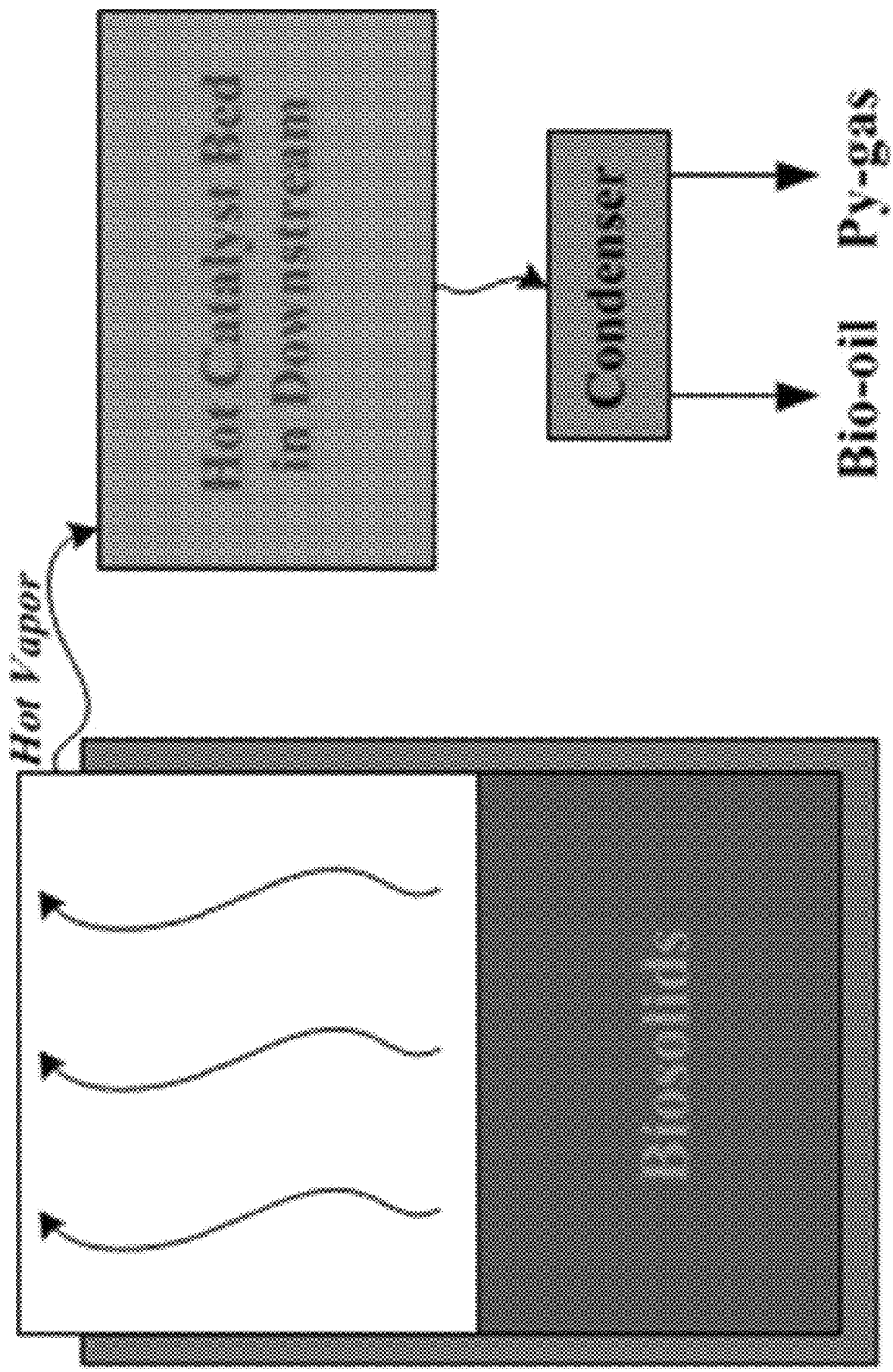
FIG. 3. Schematic of the downstream catalytic process.

The schematic of the downstream catalytic process is also presented in FIG. 3. After the hot vapor exited the main reactor, it passed through the hot catalyst and then was separated by condensation. For non-catalytic tests, the downstream temperature was maintained at 500° C. to avoid condensation in the tubular reactor. It was assumed that the secondary reactions such as steam reforming among vapor components were minimized at this temperature and over such a short distance. The bio-oil and py-gas were collected in the condensing tubes and a Tedlar bag, respectively. The mass of biochar and bio-oil was measured using an analytical balance (Mettler Toledo B3001-S). The py-gas mass was calculated by weight difference.

The gas composition was determined as described previously (McNamara et al., 2014). The major detected gas components include hydrogen, methane, carbon dioxide, and carbon monoxide. The higher heating value (HHV) of the py-gas mixture was determined by multiplying the measured mole fractions and the corresponding heating values of gas components. The HHVs of the biochar and bio-oil products were measured by bomb calorimetry (Parr 1341, Parr Instrument Company, Moline, IL). The product energy per mass of biosolids pyrolyzed (KJ/kg biosolids) was calculated by multiplying the HHV of each product by the corresponding yield per mass of biosolids pyrolyzed.

Results

The Effect of Feedstock to Catalyst Mass Ratio on the Product Yield. The catalytic effect on the product yield as a function of feedstock to catalyst mass ratio at different temperatures was first evaluated. There was almost no change in product yield with catalyst addition at 500° C. When the temperature was increased to 600° C. and the mass ratio increased to 1:1, the bio-oil fraction decreased and the py-gas fraction increased accordingly. The catalytic effect was more significant at higher temperature of 700° C. and 800° C. The py-gas yield was enhanced dramatically and the bio-oil yield decreased simultaneously with the increase of catalyst loading. The relevant mechanism will be investigated in the future work.

The Effect of Feedstock to Catalyst Mass Ratio on the Bio-Oil and Py-Gas Property The bio-oil property was also changed in addition to the reduction in its yield. Compared to the non-catalytic bio-oil, the color of the bottom layer in the catalyzed bio-oil became more clear at 600° C. The color further improved at 800° C.

The py-gas composition at 500° C. was almost constant except the $CH_4$ fraction increased slightly, indicating that the catalyst could not upgrade the bio-oil vapor at low temperature. However, when the pyrolysis temperature ranged from 600° C. to 800° C., the catalyst had a substantial impact on gas composition. The $H_2$ percentage increased significantly with increased catalyst loading.

The Effect of Feedstock to Catalyst Mass Ratio on the Energy Content and Yield. The energy content and the total product energy per mass of feedstock were affected by the catalyst addition from 600° ° C. to 800° C. Due to the great increase of $H_2$ and its low volumetric HHV (13,000 KJ/m³), the overall HHV of py-gas decreased due to dilution by $H_2$. At 600° C., the py-gas HHV was lower. At 700° C. and 800° C., the py-gas HHV increased when the feedstock to catalyst ratio was 1:1. This was mainly because of the decrease in the fraction of non-combustible $CO_2$ and the slight increase in $CH_4$ concentration. Nevertheless, with much more $H_2$ produced at higher catalyst loading (i.e. at ratio of 1:1), the py-gas HHV decreased.

As for bio-oil, catalyst addition resulted in a liquid product containing more low molecular weight hydrocarbons and higher water content by decomposing the tar components in the bio-oil vapor phase. Some research regarding catalytic tar reduction was published previously (Dayton, 2002; Min et al., 2011). Similarly, in this study, by converting condensable energetic hydrocarbons into gas product such as $H_2$ and producing more water simultaneously, the bio-oil HHV decreased with the downstream catalytic upgrading. When the biosolids:catalyst mass ratio was 1:1, the HHV was lower. This indicated that energy that was originally contained in the non-catalyzed bio-oil was transferred to the gas phase via the downstream catalytic process employed.

Because the biochar product was not involved in the downstream catalysis, the produced biochar energy was same for both non-catalytic and catalytic tests. Also, the biochar HHV at three different temperatures was similar. However, the energies of the liquid and gas phases changed significantly. Due to the lower energy content and reduced yield, the bio-oil energy declined accordingly.

Besides the internal energy in the product as discussed above, there were also sensible and latent energies associated with hot non-condensable gas, condensable vapor, and hot char. The values of sensible and latent energies for this study were not measured. However, the values are generally small compared to the inherent energy of chemical components (McNamara et al., 2014). Assuming the overall process is a closed system including both pyrolysis and catalysis, if the total output energy is lower than the input energy (i.e. biosolids energy-HHV is 15800 KJ/kg), then the overall process is exothermic. Therefore, even without including the small amount of sensible and latent energies, the integrated process is most likely exothermic under all the pyrolysis conditions except at 800° C. with the biosolids:catalyst ratio of 1:1.

Discussion and Conclusions

This work demonstrated that downstream catalysis using a specific waste-derived catalyst simultaneously reduced bio-oil yield and increased py-gas yield. This may be beneficial at water reclamation facilities because bio-oil handling and use as fuel is challenging, whereas py-gas utilization is less complicated. The catalytic effect was most likely due to the inherent alkali metals and trace heavy metals in the catalyst precursor. Meanwhile, the bio-oil properties were also upgraded. However, due to the catalytic bio-oil upgrading and more water produced in the liquid phase, the bio-oil energy content decreased. For the final product energy distribution, more energy was transferred to py-gas from bio-oil via catalysis. Additionally, even including the extra sensible and latent energies, the overall catalytic pyrolysis process can be endothermic.

In conclusion, biosolids pyrolysis via downstream catalysis by using a byproduct-derived catalyst can address current concerns regarding biosolids handling as well as the needs for energy and resource recovery. Sewage sludge catalytic pyrolysis may do the following: (1) synergistically treat regional wastes and wastewater biosolids (2) produce more energy in the form of py-gas which can be readily utilized (3) reduce and upgrade the bio-oil product, and (4) produce a valuable agricultural soil amendment called biochar.

References

Bridle, T., Pritchard, D., 2004. Energy and nutrient recovery from sewage sludge via pyrolysis. *Water Sci. Technol.*, 2004; 50(9):169-75.

Carey, D. E., McNamara, P. J., 2014. The impact of triclosan on the spread of antibiotic resistance in the environment. *Front. Microbiol.* 5, 780. doi: 10.3389/fmicb.2014.00780

Carey, D. E., McNamara, P. J., Zitomer, D. H., 2015. Biochar from Pyrolysis of Biosolids for Nutrient Adsorption and Turfgrass Cultivation. *Water Environ. Res.* 87, 2098-106. doi:10.2175/106143015X14362865227391

Chen, D., Yu, Y., Zhu, H., Liu, Z., Xu, Y., 2008. Ferrite process of electroplating sludge and enrichment of copper by hydrothermal reaction, *Separ. and Purif. Technol.*, Vol. 62, Issue 2, 1 Sept. 2008, Pages 297-303.

Clarke, B. O., Smith, S. R., 2011. Review of "emerging" organic contaminants in biosolids and assessment of international research priorities for the agricultural use of biosolids. *Environ. Int.* 37, 226-247. doi: 10.1016/j.envint.2010.06.004

Daintith, J., 2008. *A dictionary of chemistry.*

"A review of the literature on catalytic biomass tar destruction." US Department of Energy, National Renewable Energy Laboratory, Golden, CO.

Liu, Z., 2013. Development of a Sorption Enhanced Steam Hydrogasification Process for In-situ Carbon Dioxide ($CO_2$) Removal and Enhanced Synthetic Fuel Production., Dissertation, University of California, Riverside, 2014, 151 pages.

Liu, Z., Qian, G., Sun, Y., Xu, R., Zhou, J., Xu, Y., 2010. Speciation Evolutions of Heavy Metals during the Sewage Sludge Incineration in a Laboratory Scale Incinerator. *Energy & Fuels* 24, 2470-2478. doi: 10.1021/ef901060u Lu, Q., He, Z., Stoffella, P., 2012. Land application of biosolids in the USA: A review. *Appl. Environ. Soil Sci.*, Vol. 2012 (2012), Article ID 201462, 11 pages.

Lu, Q., Zhang, J., Zhu, X., 2008. Corrosion properties of bio-oil and its emulsions with diesel. *Chinese Sci. Bull.*, December 2008, Vol. 53, Issue 23, pp 3726-3734.

McNamara, P., Koch, J., Zitomer, D., 2014. Pyrolysis of Wastewater Biosolids: Lab-Scale Experiments and Modeling. *Proc. Water Environ. Fed.* 2014, 1-14. doi: 10.2175/193864714816196655

McNamara, P. J., Wilson, C. A., Wogen, M. T., Murthy, S. N., Novak, J. T., Novak, P. J., 2012. The effect of thermal hydrolysis pretreatment on the anaerobic degradation of nonylphenol and short-chain nonylphenol ethoxylates in digested biosolids. *Water Res.* 46, 2937-46. doi:10.1016/j.watres.2012.03.015

Min, Z., Yimsiri, P., Asadullah, M., Zhang, S., Li, C., 2011. Catalytic reforming of tar during gasification. Part II. Char as a catalyst or as a catalyst support for tar reforming. *Fuel*, Vol. 90, Issue 7, July 2011, Pages 2545-2552.

Nordgreen, T., Liliedahl, T., Sjöström, K., 2006. Metallic iron as a tar breakdown catalyst related to atmospheric, fluidised bed gasification of biomass. *Fuel.*, Vol. 85, Issues 5-6, March-April 2006, Pages 689-694.

Sadaka, S., Boateng, A., 2009. *Pyrolysis and bio-oil.*, University of Arkansas Division of Agriculture, Research & Extension.

Samolada, M. C., Zabaniotou, A. A., 2014. Comparative assessment of municipal sewage sludge incineration, gasification and pyrolysis for a sustainable sludge-to-energy management in Greece. *Waste Manag.* 34, 411-420. doi: 10.1016/j.wasman.2013.11.003

Transparency Market Research, 2014. U.S.Biochar Market-Global Industry Analysis, *Trends, Forecast* 2014-2020. (http://www.transparencymarketresearch.com/us-biochar-market.html, accessed on Jan. 12, 2016).

Wang, L., Li, D., Koike, M., Koso, S., 2011. Catalytic performance and characterization of Ni—Fe catalysts for the steam reforming of tar from biomass pyrolysis to synthesis gas. *Appl. Catal. A: General*, Vol. 292, Issues 1-2, 29 Jan. 2011, Pages 248-255.

Example 2—can Autocatalytic Pyrolysis of Wastewater Biosolids be Energy Neutral and Generate Value-Added Products?

Abstract

Over eight million metric dry tons of wastewater biosolids are produced annually from water resource recovery facilities (WRRFs) in the United States. WRRFs are facing multiple challenges including energy generation, nutrient recovery, and pollutant removal requirements. Autocatalytic pyrolysis of wastewater biosolids is a promising process to improve energy generation and product recovery while removing pollutants. In particular, it can generate biochar (a valuable soil amendment) as well as high-yield pyrolysis gas, which is a renewable clean energy to complement the energy requirement at WRRFs. An energy analysis of autocatalytic pyrolysis was conducted with the assumption of zero heat loss and using the highest catalyst loading. The results showed that the autocatalytic pyrolysis at 600° C. and 700° C. was slightly exothermic but was endothermic at 800° C. Therefore, some py-gas was used to supply the heat for 800° C. operation. However, the remaining fraction of py-gas still reduced the energy for biosolids drying by approximately 80%. At pyrolysis temperatures of 600° C. and 700° C., the remaining py-gas could cover 40% and 70% of the energy for biosolids drying, respectively. In summary, autocatalytic pyrolysis of wastewater biosolids can be energy neutral and generate the value-added product, biochar.

Introduction

Over eight million metric dry tons of wastewater biosolids are produced annually from water resource recovery facilities (WRRFs) in the United States (Gude, 2015). WRRFs are facing multiple challenges including energy generation, nutrient recovery, and pollutant removal requirements (Eggen et al., 2014; Jhansi and Mishra, 2013; Mo and Zhang, 2013; Venkatesan et al., 2016). Pyrolysis could be a key technology to aid in energy generation and product recovery while removing pollutants.

Figure 4:
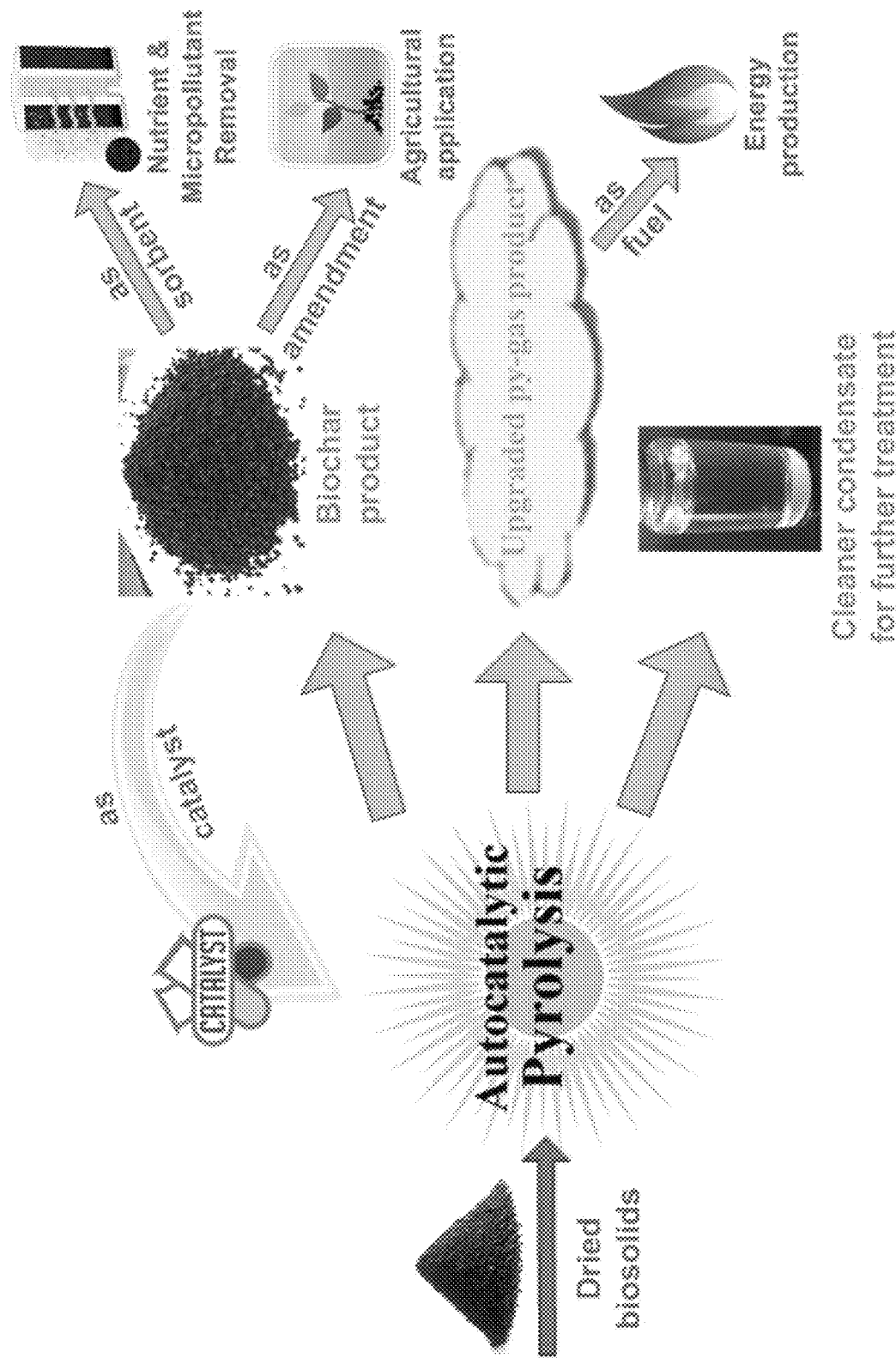
FIG. 4. Autocatalytic pyrolysis process and its value-added products.

Biosolids pyrolysis is a process that decomposes wastewater biosolids upon heating at elevated temperature under anoxic conditions. The process produces biochar, a valuable soil amendment, along with pyrolysis gas (py-gas), and bio-oil (pyrolysis condensate) (Bridle and Pritchard, 2004). Meanwhile, micropollutants such as triclosan and estrogens can be removed from biochar during pyrolysis (Hoffman et al., 2016; Ross et al., 2016). Moreover, pretreated biochar can be used as an adsorbent for nutrient and micropollutant removal from used water (Carey et al., 2015; Tong et al., 2016). A recent study concluded that biosolids pyrolysis could be a low waste solution to biosolids handling in Europe (Samolada and Zabaniotou, 2014). However, biosolids derived bio-oil normally accounts for approximately 40% (by mass) of the total products of biosolids pyrolysis (Inguanzo and Dominquez, 2002; McNamara et al., 2014), and the bio-oil requires costly upgrading before being used as a fuel due to its corrosive and unstable properties. Thus, autocatalytic biosolids pyrolysis (FIG. 4) was developed by using biochar as the catalyst to convert the majority of bio-oil vapor to py-gas that needs no conditioning before use for energy recovery via combustion. Our previous work showed that using biochars such as biosolids derived biochar as a catalyst can significantly reduce bio-oil yield while increasing py-gas yield (Liu et al., 2016; Liu et al., 2016). Using our biosolids derived biochar catalyst, energy can shift from bio-oil to py-gas and the remaining condensate becomes cleaner with fewer high-molecular-weight hydrocarbons. The autocatalytic process has many potential benefits including maximizing energy generation, minimizing negative environmental impacts, and recovering nutrients.

To ensure that the autocatalytic process is sustainable, a complete energy balance analysis must be conducted. The main objective of this study was to evaluate the enthalpy of autocatalytic pyrolysis of dried biosolids. Also, the net energy in py-gas (i.e. the remaining energy after a portion of total energy in py-gas is used to heat the pyrolysis process) was compared to the heat required for biosolids drying in order to determine how much energy for drying can be saved by using the py-gas.

Methods

Dried biosolids (i.e., MilorganiteR) was pyrolyzed with the introduction of biochar as a catalyst located downstream. The hot pyrolysis vapor exited the main pyrolysis reactor, passed through the hot catalyst, and was then separated by condensation. The biochar was obtained in the main reactor, and the bio-oil was collected in the condensers. The py-gas was collected in a Tedlar® bag for gas chromatography analysis. The pyrolysis temperature was varied from 600° ° C. to 800° C. The catalyst temperature was maintained at the same value as the main pyrolysis reactor. The mass ratio of catalyst to feedstock ranged from 0.2 to 1. Control tests without catalyst addition were conducted with the downstream temperature fixed at 500° C. The energy content, higher heating value (HHV), of py-gas was calculated based on the gas composition and the corresponding component HHVs. The HHVs of biochar and bio-oil were determined by bomb calorimetry (Parr 1341, Parr Instrument Company, Moline, IL). The chemical energy (kJ) of the product per mass (kg) of biosolids pyrolyzed was calculated by multiplying the yield by the corresponding HHV.

Figure 5:
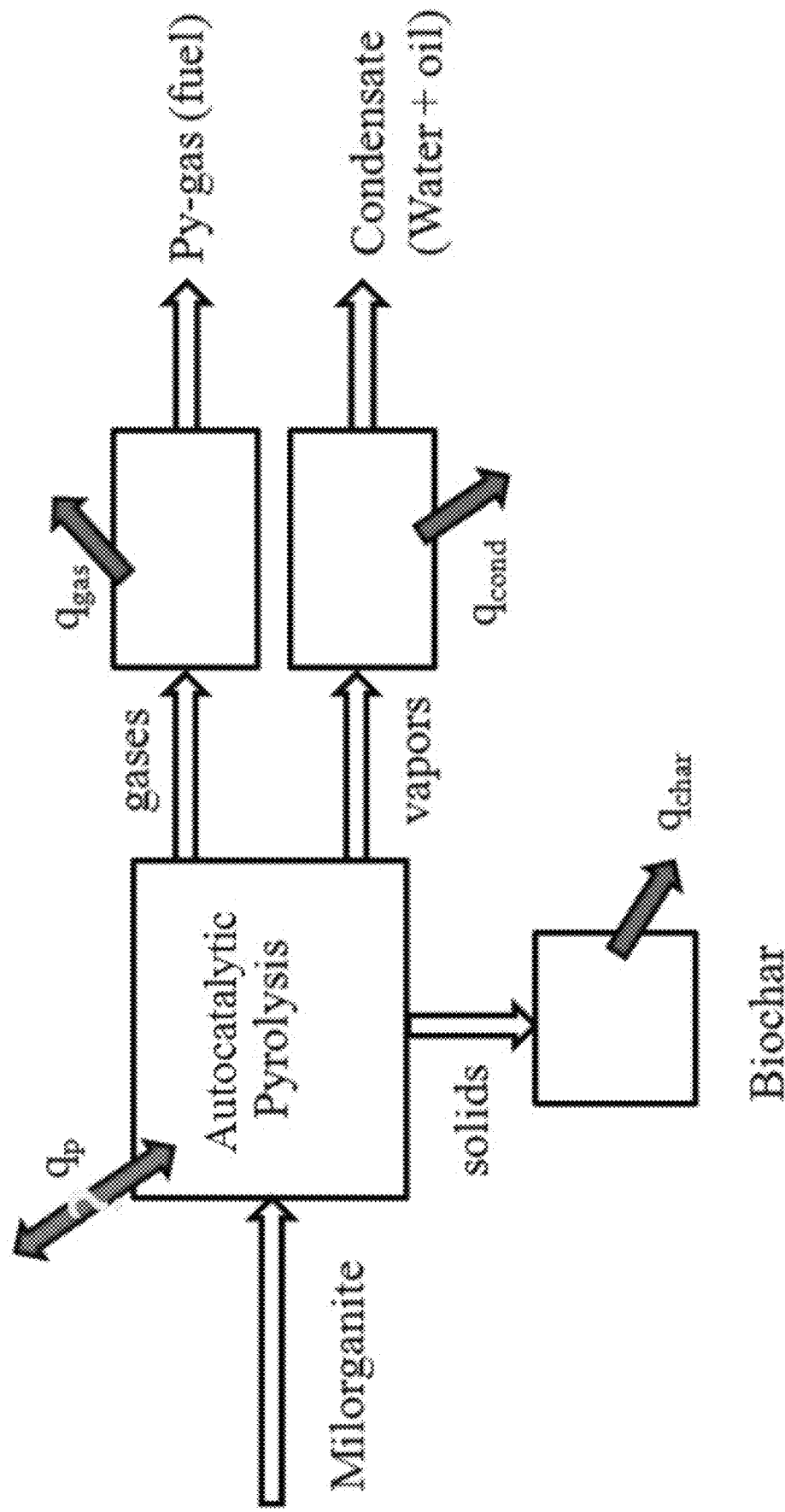
FIG. 5. Relevant heat flows during autocatalytic pyrolysis of biosolids. Double-headed arrow into the "autocatalytic process" indicates uncertain heat required for pyrolysis and single-headed arrows indicate heat released from products (modified based on McNamara et al., 2016).

The enthalpy of autocatalytic pyrolysis was calculated using a modified heat balance (FIG. 5) based on our previous work (McNamara et al. 2016). The heat flow diagram shows that the input energy is the chemical energy of dried biosolids and the output energies are the chemical energies of biochar, bio-oil, py-gas, heat loss, and sensible and latent heat released when the products cooled down to the reference temperature of 25° C. No heat loss was assumed in this study. The sensible heat of py-gas was estimated based on the temperature-dependent heat capacity of each gas component. The sensible and latent heat of bio-oil was estimated according to the properties of petroleum with a similar specific gravity of 1. The enthalpy of autocatalytic pyrolysis was determined by the difference of output energy minus input energy. A negative difference meant exothermic and positive meant endothermic.

Results and Discussion

Autocatalytic biosolids pyrolysis increased the py-gas yield and decreased the bio-oil yield simultaneously (Liu et al., 2016). Meanwhile, the py-gas HHV increased and the bio-oil HHV decreased during autocatalysis compared to the control test without catalyst. In particular, when the catalyst to feedstock ratio increased to 1 at 800° C., the bio-oil HHV decreased to its lowest value of 1,300 KJ/kg. Correspondingly, the energy contained in bio-oil decreased dramatically and more energy shifted from bio-oil to py-gas via autocatalysis. When 1 kg of biosolids was pyrolyzed at 800° ° C. with the highest catalyst loading, the py-gas energy was 11,100 kJ while the bio-oil energy was only 275 kJ.

At 600° ° C. and 700° C., the total output energy for both non-catalytic and autocatalytic pyrolysis was lower than the input energy (biosolids input energy was 15800 kJ), indicating both processes were slightly exothermic. The non-catalytic pyrolysis was also exothermic at 800° C. However, at 800° C. with a catalyst to feedstock mass ratio of 1, autocatalytic pyrolysis was slightly endothermic because the total output energy was greater than the input energy.

Because autocatalytic pyrolysis is exothermic at 600° C. and 700° C., the energy in the py-gas can be totally used for biosolids drying. At 600° ° C. and 700° ° C. with the highest catalyst loading, the reduction percentages of energy for biosolids drying were 40% and 70%, respectively. At 800° C., even though a fraction of the py-gas was used to supply the heat for the endothermic autocatalytic pyrolysis, the remaining py-gas could reduce the energy for biosolids drying by approximately 80%.

Conclusions

Autocatalytic pyrolysis of wastewater biosolids can generate, biochar, a value-added product, as well as high-yield py-gas. Py-gas is a renewable clean energy source which can complement the energy requirement at WRRFs. Common micropollutants can be removed from biochar during pyrolysis. Biosolids derived biochar proved to be a cost-effective catalyst during autocatalytic pyrolysis to improve on-site energy recovery. An energy analysis was conducted with the assumption of zero heat loss and at the highest catalyst loading. The results showed that the autocatalytic pyrolysis at 600° C. and 700° C. was slightly exothermic but was endothermic at 800° C. Therefore, py-gas was partially used to supply the heat for 800° C. operation. However, the remaining py-gas still reduced the energy for biosolids drying by approximately 80%. At 600° C. and 700° C., the remaining py-gas could cover 40% and 70% of the energy for biosolids drying, respectively. In summation, the autocatalytic pyrolysis of wastewater biosolids can be an energy neutral process that produces clean biochar.

References

Bridle, T., Pritchard, D., 2004. Energy and nutrient recovery from sewage sludge via pyrolysis. *Water Sci. Technol.* 50, 169-175.

Carey, D. E., McNamara, P. J., Zitomer, D. H., 2015. Biochar from Pyrolysis of Biosolids for Nutrient Adsorption and Turfgrass Cultivation. *Water Environ. Res.* 87, 2098-106. doi: 10.2175/106143015X14362865227391

Eggen, R. I. L., Hollender, J., Joss, A., Schärer, M., Stamm, C., 2014. Reducing the discharge of micropollutants in the aquatic environment: the benefits of upgrading wastewater treatment plants. *Environ. Sci. Technol.* 48, 7683-9. doi: 10.1021/es500907n Gude, V., 2015. Energy positive wastewater treatment and sludge management. *Edorium J. Waste Management.* 1, 10-15.

Hoffman, T. C., Zitomer, D. H., McNamara, P. J., 2016. Pyrolysis of Wastewater Biosolids Significantly Reduces Estrogenicity. *J. Hazard. Mater.* doi: 10.1016/j.jhazmat.2016.05.088

Inguanzo, M., Dominguez, A., 2002. On the pyrolysis of sewage sludge: the influence of pyrolysis conditions on solid, liquid and gas fractions. *J. Anal. Appl. Pyrol.* 63, 209-222.

Jhansi, S. C., Mishra, S. K., 2013. Wastewater Treatment and Reuse: Sustainability Options. *Cons. J. Sustain. Dev.* 10, 1-15.

Liu, Z., McNamara, P., Zitomer, D., 2016. Biochar Production and Bio-oil Upgrading by Synergistic Catalytic Pyrolysis of Wastewater Biosolids and Industrial Wastes. *Proc. Water Environ. Fed.* 2016, 3182-3187. doi: 10.2175/193864716819713682

McNamara, P., Koch, J., Zitomer, D., 2014. Pyrolysis of Wastewater Biosolids: Lab-Scale Experiments Proc. *Water and Modeling. Environ. Fed.* 2014, 1-14. doi: 10.2175/193864714816196655

McNamara, P. J., Koch, J. D., Liu, Z., Zitomer, D. H., 2016. Pyrolysis of Dried Wastewater Biosolids Can Be Energy Positive. *Water Environ. Res.* 88, 804-810. doi: 10.2175/106143016X14609975747441

Mo, W., Zhang, Q., 2013. Energy-nutrients-water nexus: integrated resource recovery in municipal wastewater treatment plants. *J. Environ. Manage.* 127, 255-67. doi: 10.1016/j.jenvman.2013.05.007

Ross, J. J., Zitomer, D. H., Miller, T. R., Weirich, C. A., McNamara, P. J., 2016. Emerging investigators series: pyrolysis removes common microconstituents triclocarban, triclosan, and nonylphenol from biosolids. *Environ. Sci. Water Res. Technol.* 2, 282-289. doi: 10.1039/C5EW00229J Samolada, M. C., Zabaniotou, A. A., 2014. Comparative assessment of municipal sewage sludge incineration, gasification and pyrolysis for a sustainable sludge-to-energy management in Greece. *Waste Manag.* 34, 411-420. doi: 10.1016/j.wasman.2013.11.003

Tong, Y., Mayer, B. K., McNamara, P. J., 2016. Triclosan adsorption using wastewater biosolids-derived biochar. *Environ. Sci. Water Res. Technol.* 2, 761-768. doi: 10.1039/C6EW00127K Venkatesan, A. K., Hamdan, A.-H. M., Chavez, V. M., Brown, J. D., Halden, R. U., 2016. Mass Balance Model for Sustainable Phosphorus Recovery in a US Wastewater Treatment Plant. *J. Environ. Qual.* 45, 84-9. doi: 10.2134/jeq2014.11.0504

Zhongzhe Liu, Patrick McNamara, Daniel Zitomer, 2016. Product upgrading during biosolids pyrolysis by using a low-cost natural catalyst, in: Proceedings of the Water Environment Federation, *Residuals and Biosolids* 2016, pp. 796-802(7).

Example 3—Biochar Production and Bio-Oil Upgrading by Synergistic Catalytic Pyrolysis of Wastewater Biosolids and Industrial Wastes Abstract Catalytic pyrolysis of wastewater biosolids was conducted using specific industrial-waste derived catalysts to reduce crude bio-oil yield while increasing pyrolysis gas (py-gas) yield simultaneously. This was done because bio-oil can be difficult to handle, whereas py-gas is a desirable product that can be easily combusted for energy. A lab-scale pyrolyzer with a downstream catalyst bed was employed. Higher py-gas yields were obtained using B3 and B4 catalysts compared to B1 and B2 catalysts, especially at temperatures over 700° C. The py-gas yields increased compared to non-catalyzed control. Meanwhile, the bio-oil yield decreased dramatically. Hence, B3 and B4 catalysts can increase on-site energy recovery from py-gas. Also, the bio-oil optical properties were improved and the energetic py-gas constituent concentrations such as H2 increased. This catalytic process could be beneficial at water reclamation facilities because energy recovery from py-gas is less complicated. Moreover, this process can produce a clean, value-added soil conditioner called biochar.

Introduction

Approximately eight million dry tons of wastewater biosolids are produced in the United States, and about 60% of biosolids are used for land application (Gude, 2015; Lu et al., 2012). Heat dried biosolids are usually land applied as a soil conditioner or fertilizer. They are produced by some municipalities and are widely applied in North America (Archer, 2007). However, residual energy in biosolids is not recovered before biosolids land application and microconstituents such as contaminants of emerging concern within biosolids are a public issue (Carey and McNamara, 2014; Clarke and Smith, 2011; Eggen et al., 2014). Therefore, post-treatment techniques such as incineration, gasification, and pyrolysis that recover energy and resources while destroying micropollutants are of great interest (Bridle and Pritchard, 2004; Liu, 2013; Liu et al., 2010).

Pyrolysis is a process which decomposes organic matter upon heating in an oxygen-free environment. The pyrolysis products are biochar, pyrolysis gas (py-gas), and crude bio-oil (pyrolysis condensate). Biochar is a well-recognized valuable soil amendment that increases soil moisture holding capacity and plant growth. Py-gas and bio-oil can both be used as fuel for energy recovery. Pyrolysis is a promising biosolids handling process and could readily be added to existing water reclamation facilities. Specifically, our previous work demonstrated that biosolids-derived biochar can support bluegrass cultivation as an effective fertilizer and pyrolysis removes micropollutants from the biochar product (Carey et al., 2013; Hoffman et al., 2016; Ross et al., 2016). However, bio-oil from biosolids pyrolysis normally accounts for at least 40% of the total product mass (McNamara et al., 2014) and can be an undesirable product because of its acidic and unstable properties (Darmstadt et al., 2004). Therefore, bio-oil often requires costly pretreatment before it can be used as a clean fuel; it can also be co-fired in limited amounts with other fuels, but these technologies are still under development (Sadaka and Boateng, 2009). In contrast, the energy of py-gas can be easily recovered by combustion in gas engines or boilers. Hence, methods to increase py-gas yield while reduce bio-oil yield are of great interest.

Catalysis is an efficient method to reduce bio-oil while increasing py-gas yields during pyrolysis or gasification. Bio-oil is largely composed of primary tars, a black mixture of high molecular weight hydrocarbons and free carbon. Pyrolysis vapor conversion to py-gas using catalyst has proven to be effective (Han and Kim, 2008). However, there is little information regarding catalytic wastewater biosolids pyrolysis to reduce bio-oil production. So the selection of suitable low-cost catalysts and the catalytic influence on wastewater biosolids and sludge pyrolysis should be investigated.

In addition to wastewater biosolids, various biomass residuals are generated from different industries in the United States every year, such as agricultural wastes (e.g. corn stover and sunflower stalks), bioethanol byproducts, and forest residues. The total annual production could be over hundreds of millions of dry tons. However, most of these residuals are not further processed and utilized in a value-added process.

Figure 6:
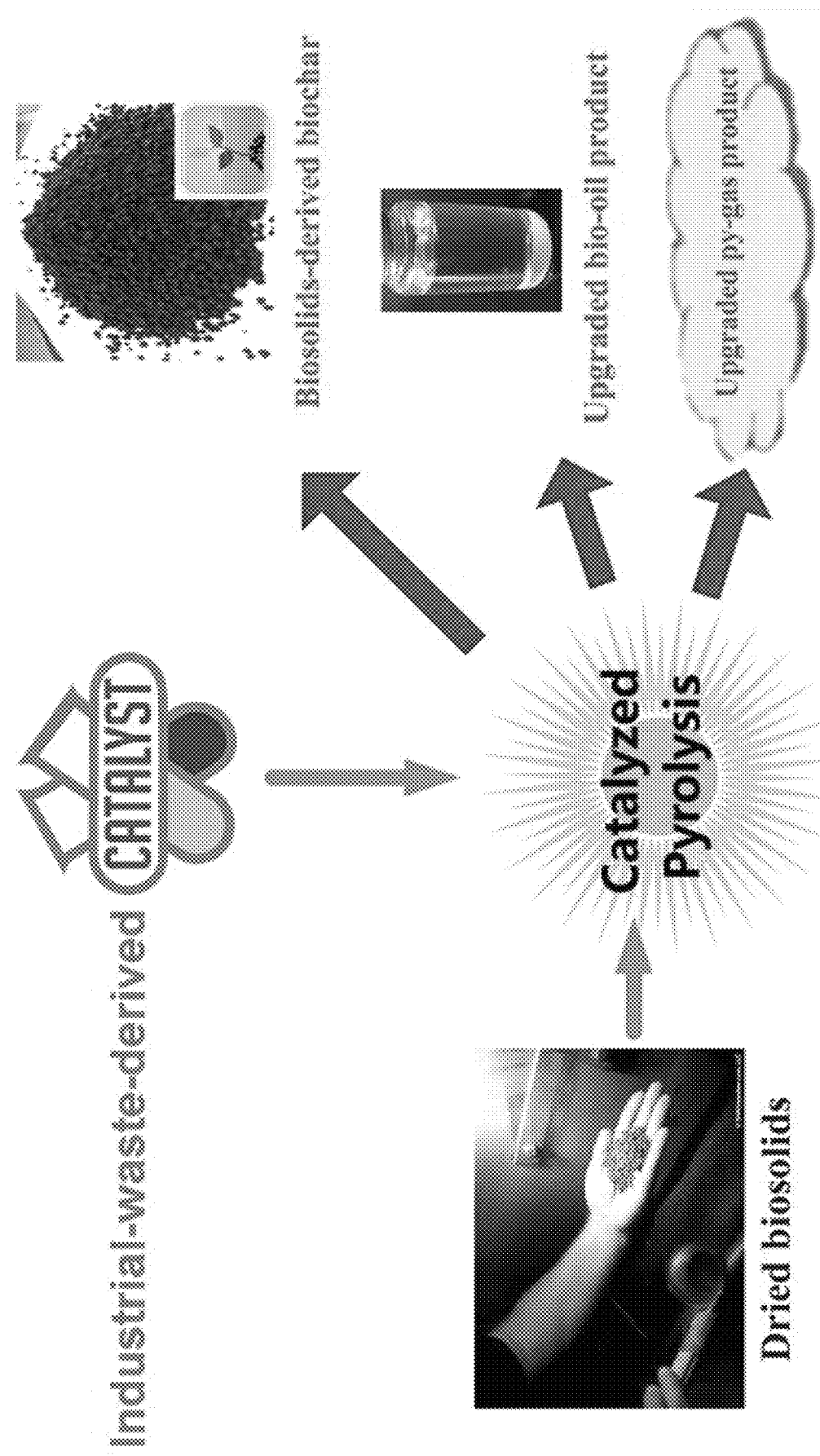
FIG. 6. Concept of catalytic pyrolysis of biosolids using industrial-waste-derived catalyst.

Therefore, the work described herein was performed to evaluate the potential of specific industrial wastes as low-cost catalysts to increase py-gas and decrease bio-oil (FIG. 6). The catalytic effect of each industrial-waste-derived catalyst was investigated. The optimum catalyst was determined based on reduced bio-oil and increased py-gas production. The resulting biochar can be a value-added soil amendment and carbon sequestration product for agricultural application.

Methodology

Four different types of biomass residue from industrial sidestreams were used to produce the catalysts. They were prepared by specific pretreatment and denoted as B1, B2, B3, and B4. Dried biosolids (i.e. Milorganite®) from a municipal water resource reclamation facility (Jones Island Water Resource Reclamation Facility, Milwaukee, WI, USA) was pyrolyzed in an oxygen-free environment by purging with argon after the introduction of each catalyst in the catalyst bed. The mobile catalytic system (FIG. 1 and FIG. 2) included a main reactor vessel, radiative heater, gas sparging system, downstream hot catalyst bed, and two condensers for gas/liquid separation. The pressure and temperature were monitored by pressure gauges and thermocouples. The catalytic potential of each industrial-waste-derived catalyst was determined by varying the pyrolysis temperature from 600° C. to 800° C. The catalyst bed temperature was maintained at the same temperature as the main reactor vessel. The catalyst-to-feedstock mass ratio was 0.33. Control tests (i.e. blank tests) without catalyst were conducted in which the downstream temperature was maintained at 500° C. to avoid condensation in the downstream empty catalytic reactor.

The bio-oil and py-gas were collected in the condensers and Tedlar bag, respectively. The mass of biochar and bio-oil was measured and the py-gas mass was calculated by difference. The analytical method of bio-oil and py-gas was described previously (McNamara et al., 2014). The product energy per mass of biosolids pyrolyzed (kJ/kg biosolids) was calculated by multiplying the higher heating value of each product with the corresponding yield.

The Catalytic Effect on the Product Yield. The catalytic effect of each industrial-waste-derived catalyst was investigated on the productions of bio-oil and py-gas. Because biochar was produced in the main reactor vessel and not involved in the hot catalyst bed, its production did not change at each pyrolysis temperature. The catalytic experiment results showed that at 700° C. all the catalysts could increase the py-gas yield and reduce the bio-oil yield simultaneously. In particular, there was much higher py-gas yield by using B3 and B4 catalysts compared to that by using B1 and B2. At higher temperature of 800° C., only B3 and B4 catalysts had obvious catalytic effect on the py-gas yield enhancement. The py-gas yields were increased. At the meantime, the bio-oil yield could be reduced to the lowest. Hence, B3 and B4 catalysts were excellent for increasing py-gas production. At a lower temperature of 600° C., there was almost no change in product yield with and without catalysts. Therefore, temperature played an important role in catalysis.

The Catalytic Effect on the Bio-oil and Py-gas Property. The introduction of catalyst improved bio-oil optical properties and increased the energetic constituent concentrations in the py-gas. B1 and B2 catalyzed bio-oils had two distinct layers and the color did not change too much when comparing to the blank test. In contrast, B3 and B4 catalysts resulted in a single aqueous layer and the color turned to light yellow and almost transparent, respectively. Therefore, these two catalysts had much better catalytic performance for improving bio-oil quality. The dark color of bio-oil is closely related to the high content of unsaturated hydrocarbons (Sappok and Wagels, 2013). Further chemical analysis of bio-oil will be conducted. It is most likely that the catalyzed bio-oil contains less unsaturated organic matters according to the color. The py-gas composition was improved significantly via catalysis by using B3 and B4 catalysts. At higher temperature of 700° C. and 800° ° C. with B3 and B4 catalysts, $H_2$ percentage was enhanced greatly while CO2 percentage was reduced at the same time. It indicated that these two catalysts contributed to the tar reforming and dry reforming reactions to increase $H_2$ production. However, B1 and B2 catalysts did not have dramatic change in the gas composition except $H_2$ increased a little bit. At 600° ° C., no significant change was observed for all the catalysts.

The Catalytic Effect on the Product Energy Distribution. The energy contents of bio-oil and py-gas and the product energy distribution were affected by the catalyst introduction. Because of the decrease of CO2 and the increase of energetic gases such as CH4 and H2, the py-gas energy content increased by approximately 3000 $KJ/m^3$. Meanwhile, the bio-oil energy content decreased to below 3000 KJ/kg. It was most likely that the tar decomposition resulted in low molecular weight hydrocarbons and higher water content. In particular, for B3 and B4 catalysts, due to the increase of py-gas yield and the decrease of bio-oil yield, the py-gas and bio-oil product energies per mass of biosolids pyrolyzed (KJ/kg biosolids) increased and reduced dramatically, respectively. It meant more energy was transferred to the gas phase for more efficient energy recovery on site.

Discussion and Conclusions

This work demonstrated that specific catalysts (i.e. B3 and B4) reduced bio-oil yield and increased py-gas yield simultaneously. This could be beneficial at water reclamation facilities because energy recovery from bio-oil is challenging, while energy recovery from py-gas is convenient. In the meantime, the bio-oil from catalyzed pyrolysis was more clear, indicating the decomposition of unsaturated hydrocarbons. For the product energy distribution, more energy was in the py-gas via catalysis for better on-site energy recovery.

In summary, biosolids pyrolysis via downstream catalysis by using industrial-waste-derived catalyst can improve biosolids handling as well as energy and resource recovery. Wastewater biosolids catalytic pyrolysis may do the following: (1) synergistically treat regional industrial wastes with biosolids (2) produce more energy in the py-gas for convenient energy recovery (3) reduce bio-oil yield and improve its quality, and (4) produce a value-added soil conditioner called biochar.

References

Archer, M. (2007) Marketing biosolids: the experience of Milorganite with special reference to Canada. *Waste water biosolids sustainability: technical, managerial, and public synergy*, Moncton, New Brunswick, Canada, 1017-1019.

Bridle, T.; Pritchard, D. (2004) Energy and nutrient recovery from sewage sludge via pyrolysis. *Water Sci. Technol.* 50(9), 169-175.

Carey, D. E.; McNamara, P. J. (2014) The impact of triclosan on the spread of antibiotic resistance in the environment. *Front. Microbiol.* 5, 780.

Carey, D.; McNamara, P.; Zitomer, D. (2013) Biosolid derived biochar to immobilize and recycle ammonium from wastewater for agronomy. *Proc. Water Environ. Fed.* 19, 107-120.

Clarke, B. O.; Smith, S. R. (2011) Review of "emerging" organic contaminants in biosolids and assessment of international research priorities for the agricultural use of biosolids. *Environ. Int.,* 37 (1), 226-247.

Darmstadt, H.; Garcia-Perez, M.; Adnot, A. (2004) Corrosion of metals by bio-oil obtained by vacuum pyrolysis of softwood bark residues. An X-ray photoelectron spectroscopy and auger electron spectroscopy study. *Energy & Fuels,* 18(5), 1291-1301.

Eggen, R. I. L.; Hollender, J.; Joss, A.; Schärer, M.; Stamm, C. (2014) Reducing the discharge of micropollutants in the aquatic environment: the benefits of upgrading wastewater treatment plants. *Environ. Sci. Technol.,* 48 (14), 7683-9.

Gude, V. (2015) Energy positive wastewater treatment and sludge management. *Edorium Journal of Waste Management,* 1, 10-15.

Han, J.; Kim, H. (2008) The reduction and control technology of tar during biomass gasification/pyrolysis: an overview. *Renew. Sustain. Energy Rev.* 12(2), 397-416.

Hoffman, T. C.; Zitomer, D. H.; McNamara, P. J. (2016) Pyrolysis of Wastewater Biosolids Significantly Reduces Estrogenicity. *J. Hazard. Mater.* 317, 579-584.

Liu, Z. (2013) Development of a Sorption Enhanced Steam Hydrogasification Process for In-situ Carbon Dioxide (CO2) *Removal and Enhanced Synthetic Fuel Production.* University of California Riverside.

Liu, Z.; Qian, G.; Sun, Y.; Xu, R.; Zhou, J.; Xu, Y. (2010) Speciation Evolutions of Heavy Metals during the Sewage Sludge Incineration in a Laboratory Scale Incinerator. *Energy & Fuels* 24 (4), 2470-2478.

Lu, Q.; He, Z.; Stoffella, P. (2012) Land application of biosolids in the USA: A review. *Appl. Environ. Soil Sci.*

McNamara, P.; Koch, J.; Zitomer, D. (2014) Pyrolysis of Wastewater Biosolids: Lab-Scale Experiments and Modeling. *Proc. Water Environ. Fed.* 2, 1-14.

Ross, J. J.; Zitomer, D. H.; Miller, T. R.; Weirich, C. A.; McNamara, P. J. (2016) Emerging investigators series: pyrolysis removes common microconstituents triclocarban, triclosan, and nonylphenol from biosolids. *Environ. Sci. Water Res. Technol.,* 2 (2), 282-289.

Sadaka, S., Boateng, A., 2009. Pyrolysis and bio-oil., University of Arkansas Division of Agriculture, Research & Extension.

Sappok, M.; Wagels, D. (2013) Method for stabilizing heating oil or diesel oil, particularly heating oil or diesel oil from the depolymerization of hydrocarbon-containing residues, or pyrolysis oil. U.S. Pat. No. 8,394,264.

Example 4—Autocatalytic Pyrolysis of Wastewater Biosolids for Product Upgrading

Abstract

Maximizing energy recovery, minimizing adverse environmental impacts, and recovering beneficial resources are three main goals for the future sustainable water resource recovery facilities. Wastewater biosolids pyrolysis is a promising technology that could help facilities reach these goals because it produces biochar that is a valuable soil amendment as well as bio-oil and pyrolysis gas (py-gas) that contain energy. The raw bio-oil, however, is corrosive; therefore recovering its energy can be challenging using standard equipment. A novel autocatalytic biosolids pyrolysis process that uses wastewater biosolids derived biochar (WB-biochar) as a catalyst was investigated to increase py-gas yield for easier energy recovery. Use of WB-biochar catalyst increased the py-gas fraction by nearly two-fold with a concomitant decrease in the bio-oil fraction at highest catalyst loading. The catalyzed bio-oil also contained fewer constituents based on GC-MS and GC-FID analyses. The energy shifted from the bio-oil to the py-gas, indicating the potential for easier on-site energy recovery using the relatively clean py-gas. The metals contained in the wastewater biosolids played an important role in upgrading the pyrolysis products. The oxides and salt forms of Mg, Ca, and Fe in the WB-biochar synergistically and significantly reduced the bio-oil yield and increased the py-gas yield.

Introduction

Water resource recovery facilities (WRRFs) are facing multiple challenges at the *nexus* of energy generation, nutrient recovery and pollutant removal[1-4]. Improving onsite energy generation and recovering value-added products are common goals for sustainable water resource reclamation. In addition, removing micropollutants is important for water reuse applications and public health. Wastewater biosolids are a major byproduct from WRRFs, and over eight million dry tons are produced annually in the United States, of which 60% are land applied because of their beneficial soil conditioner properties[5]. Even though biosolids are stabilized using processes such as anaerobic digestion, residual energy in refractory biosolids is not recovered before biosolids land application[6]. In addition, micropollutants such as organic contaminants of emerging concern and pathogens from biosolids are also public health issues[7-11]. For instance, biosolids land application is banned by some jurisdictions such as Switzerland due to perceived environmental issues regarding emerging contaminants[12,13]. Therefore, post-treatment techniques to maximize energy recovery and minimize adverse environmental impacts and public health concerns due to biosolids reuse are critical elements for sustainable water resource recovery.

In addition to anaerobic digestion, other biosolids handling technologies are employed or under development for energy and resource recovery, including incineration, gasification, and pyrolysis[14-18]. Sludge incineration is an established process for energy production; however, it does not yield a high quality soil-amendment product, and nutrients in biosolids are wasted in ash that is typically disposed of in landfills. Also, sludge incineration has air emission concerns including the possibility of heavy metals and toxic organic chemicals in gas[19,20]. Sludge gasification (i.e. converting sludge at high temperature of over 700° C. using a substoichiometric amount of oxygen and/or steam) produces synthesis gas that can be used for energy production in addition to liquid for fuel or chemical synthesis[16,21], but the solid product is ash with little or no agricultural value. Also, biosolids gasification has not been successfully commercialized[20].

Pyrolysis is a thermochemical process that decomposes organic matter upon heating at elevated temperatures under anoxic conditions. Compared to other thermochemical processing techniques, biosolids pyrolysis can be more favorable in terms of energy recovery, resource recovery, and contaminant removal. A recent study concluded that biosolids pyrolysis could be a low-waste solution to biosolids handling in Europe when compared to incineration and gasification[22]. Biosolids pyrolysis can produce biochar, a valuable soil amendment that results in improved soil moisture holding capacity and plant growth, along with pyrolysis gas (py-gas), and bio-oil that can both be used as fuel[17]. Previous research demonstrated that biochar can be used to sorb nutrients from digested wastewater sludge belt filter press filtrate. When added to soil, the biochar and sorbed nutrients increased grass growth rates similar to that of commercial fertilizer[23]. Existing drying systems in WRRFs could be coupled to pyrolysis because biosolids drying is the most energy intensive portion of the pyrolysis process. Furthermore, biosolids pyrolysis can remove micropollutants such as triclosan and triclocarban as well as reduce total estrogenicity of the solid material produced[24,25].

Most biosolids pyrolysis studies have focused on slow pyrolysis (hereafter referred to as pyrolysis). The yields and properties of the three pyrolysis products have been characterized using different temperature, residence time, heating rate, and feedstock type[26-35]. Crude biosolids-derived bio-oil (i.e. pyrolysis condensate, hereafter referred to as bio-oil) normally accounts for approximately 40% (by mass) of the total biosolids pyrolysis products[18,31]. This bio-oil has a light non-aqueous phase and an aqueous phase containing water and soluble organics. However, unlike py-gas which can be used directly in traditional power generators such as internal combustion engines[36], direct combustion of bio-oil alone requires costly pretreatment as well as modification of combustion systems and operating conditions due to its high viscosity, acidity, water content, and corrosiveness[37,38]. Alternatively, bio-oil can be upgraded using hydrogen and catalysts to produce drop-in-grade fuels such as diesel, but these technologies are still under development[39]. Fonts et al. (2012) concluded that full-scale implementation of biosolids pyrolysis has been limited by the low economic value of the bio-oil product[33]. Since py-gas is relatively clean and can be easily burned in gas engines and boilers, reducing bio-oil yield and increasing cleaner py-gas yield is a promising solution to intensify on-site energy recovery at WRRFs.

Figure 7:
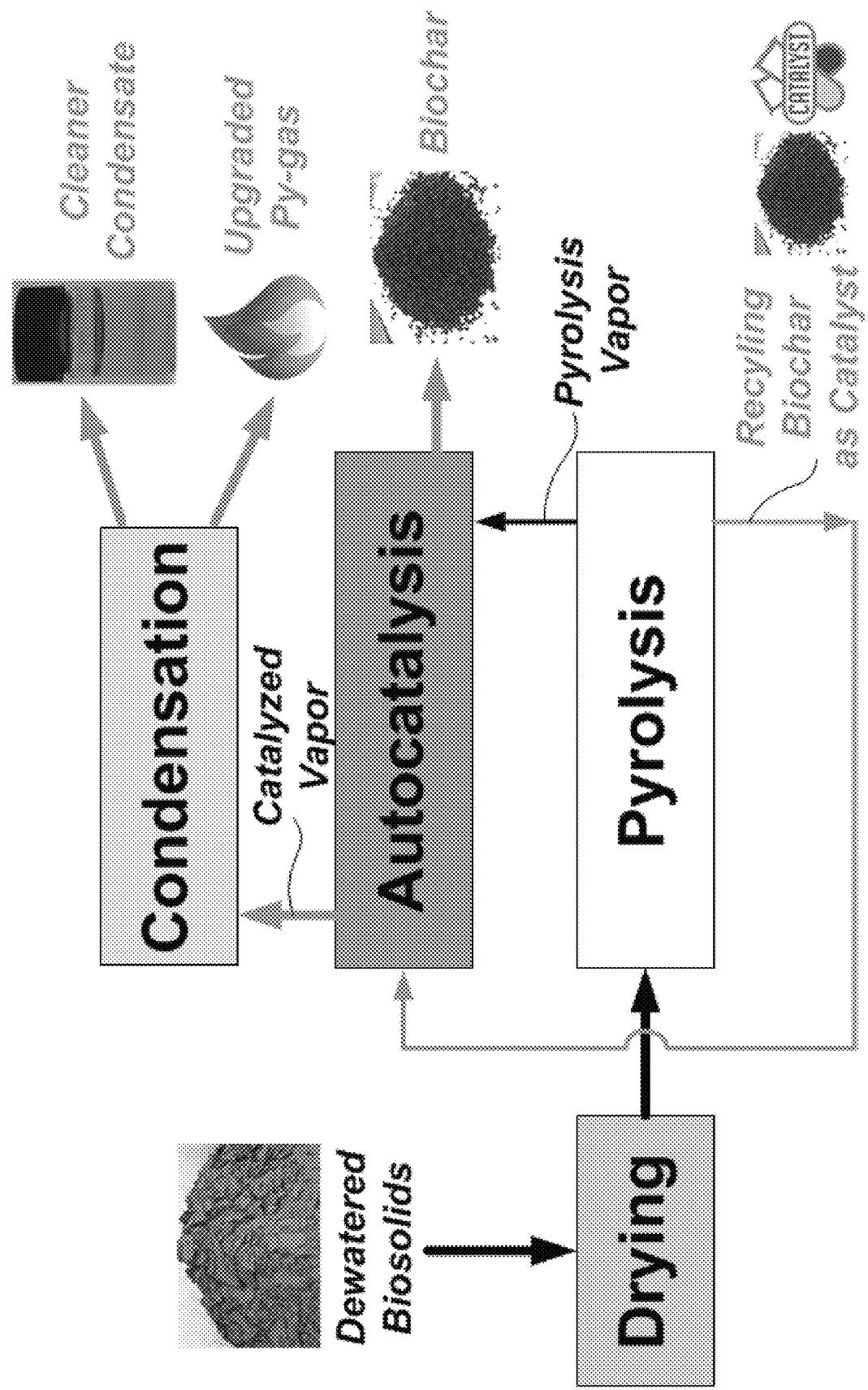
FIG. 7. Graphic illustration of the preparation of biochar from dewatered biosolids and use of biochar thus prepared as a catalyst in a process for enhancing py-gas yield.

Catalysis could be an efficient means to reduce bio-oil production while increasing py-gas yields. Typical bio-oil is largely composed of primary tars[40], a black mixture of high molecular weight hydrocarbons such as aromatics[41]. The destruction of tar using certain chars as catalysts has proven to be effective[42-48]. In particular, biochar derived from wood and corn stover were used as catalysts to increase py-gas yield[43,49,50]. Wastewater biosolids derived biochar (WB-biochar) contains a high concentration of metals such as Mg, Fe and Ca. These metals increase the catalytic ability for destruction of high molecular weight hydrocarbons (e.g. tar)[51-56], indicating that WB-biochar, as a recycled product of pyrolysis, could have catalytic potential to upgrade bio-oil (FIG. 7). Research on the catalytic effect of WB-biochar during wastewater biosolids pyrolysis is lacking. The objective of this research was to determine the autocatalytic potential of WB-biochar on the yield and compositions of py-gas and bio-oil. Also, mechanistic experiments were conducted to determine why WB-biochar was an effective catalyst.

Methodology

Pyrolysis Experiments. A laboratory system (FIG. 1 and FIG. 2) was used to pyrolyze dried biosolids (Milorganite®) from a WRRF (Jones Island Water Resource Recovery Facility, Milwaukee, Wisconsin). The dried biosolids material was a blend of waste activate sludge and anaerobically digested primary solids. The pyrolytic system consisted of a stainless steel reactor vessel (360 $cm^3$, 7.1 cm inner diameter, 8.9 cm in height), a ceramic radiative heater, a gas purge and vacuum system, a stainless steel tubular reactor (27.9 cm in length, 0.79 cm inner diameter), an ice bath for liquid condensation, and a gas collection system coupled with a Tedlar® bag. Pressure and temperature at different locations were monitored by pressure gauges and thermocouples, respectively.

Dried biosolid particles that were sieved to 1-2 mm nominal diameter were pyrolyzed by purging the pyrolysis vessel with argon gas at 15 mL/min. The heating rate was controlled at 8 to 15° C./min, and the retention time was 30 min after the reactor reached the desired pyrolysis temperature. Pyrolysis vapor passed through stainless tubing to condensers in an ice bath in which bio-oil and py-gas were separated. Py-gas was collected in a Tedlar® bag. The masses of biochar and bio-oil were measured gravimetrically. Coke can be formed during catalysis on the downstream biochar catalyst, mainly due to the decomposition of heavy hydrocarbons[57]. The coke mass yield was determined by measuring the weight gain of the spent biochar catalyst. The py-gas mass was calculated by difference (i.e. biosolids mass minus biochar, bio-oil, and coke mass).

For autocatalytic pyrolysis, the tubular reactor was filled with WB-biochar catalyst and preheated to the desired temperature. The catalyst was produced at 500° C. to 800° C. using the aforementioned pyrolysis method. The autocatalytic performance was evaluated by varying pyrolysis temperature (500° C. to 800° C.) and catalyst/feedstock mass ratio (0.2 to 1). All pyrolysis experiments were performed in triplicate.

Two non-catalytic pyrolysis tests were also performed as controls. For the first non-catalytic test (0S test), inert sand was added to the tubular reactor in place of WB-biochar catalyst to observe any effect of secondary, homogeneous reactions among vapor components at high temperature[43,49]. Inert sand had a similar particle size to that of the biochar catalyst (i.e. 0.5-1.5 mm nominal diameter). For the second non-catalytic test (0B), an empty tubular reactor was maintained at 500° C. to simulate the conventional bio-oil condensation with minimized secondary, homogeneous reactions. The tubular reactor was kept at 500° C. to prevent pyrolysis vapor constituents from condensing during conveyance downstream. The detailed experimental design of non-catalytic and autocatalytic testing is listed in Table 1.

Mechanistic Studies: Bio-oil and Simulated Py-Gas. The autocatalytic effects of WB-biochar on both bio-oil and py-gas alone were investigated using biogas decomposition and reforming tests as well as py-gas reforming tests, respectively. For bio-oil decomposition and reforming tests, the non-catalytic bio-oil (0B at 800° C.) was placed in the reactor vessel and WB-biochar catalyst was placed in the tubular reactor. The catalyst to bio-oil mass ratio was 1:1.08. The catalyst to feedstock mass ratio selected was 0.33 because this ratio yielded favorable results at 800° C., and the higher catalyst ratios did not yield substantially better results. The reactor vessel and tubular reactor temperatures were 800° C. Catalyzed bio-oil and gas products were collected and measured according to the procedures for pyrolysis experiments described above.

For py-gas reforming tests, a simulated non-catalytic py-gas (0B at 800° C.) containing major components (10% $CH_4$, 27.5% CO, 31.5% $H_2$, 27.5% $CO_2$) was used. This simulated py-gas was fed to the pyrolysis system at a flowrate of 200 mL/min. This flow rate was determined based on previous py-gas volume produced and pyrolysis reaction duration. The simulate py-gas was heated in the 800° C., empty reactor vessel before entering the 800° C. tubular reactor filled with WB-biochar. Reformed gas exiting the tubular reactor was collected in a Tedlar® bag for composition analysis.

Mechanistic Studies: Simulated Biochar Catalysts. Furthermore, it was hypothesized that Mg, Ca, and Fe in the WB-biochar improved autocatalysis based on elemental analysis by X-ray fluorescence (XRF) (Table 2). Therefore, simulated biochar catalysts were produced to investigate the catalytic influence of these metals during pyrolysis. The simulated catalysts were made by impregnating various metals on the biochar produced from dried distillers grains with solubles (DDGS). DDGS was employed because the resulting biochar surface area was similar to that of WB-biochar, but DDGS biochar had low background metal content (Table 2) with minimal catalytic activity when exposed to biosolids pyrolysis vapor.

Six DDGS-biochar-based catalysts were prepared by impregnating the biochar with $Mg^{2+}$, MgO, $Ca^{2+}$, CaO, $Fe^{3+}$, or $Fe_2O_3$ to obtain various metal concentrations (nominally 3% Mg, 7% Ca, and 11% Fe) in WB-biochar. $MgCl_2$, $CaCl_2$, and $FeCl_3$ were selected as the salt precursors. $Mg(NO_3)_2$, $Ca(NO_3)_2$, and $Fe(NO_3)_3$ were selected as the oxide precursors. Each precursor was dissolved in deionized water and mixed with DDGS biochar. The mixture was dried and then activated by calcination at 500° C. for 3 hours in an oxygen-free environment. The actual metal concentrations in the simulated biochar catalysts were confirmed by acid digestion to be 2.8% Mg, 6.7% Ca, and 10.7% Fe by dry weight. All mechanistic experiments were performed in triplicate at 800° C. with a catalyst/feedstock mass ratio of 0.33 (Table 3). Statistical analyses (ANOVA, a level=5%) were performed using OriginLab (Northampton, MA, USA).

Product Analyses. Py-gas composition ($H_2$, $CH_4$, CO, $C_2H_4$, $C_2H_6$, $CO_2$, $C_3H_8$ concentrations) in biosolids pyrolysis studies was determined by gas chromatography (GC) (Agilent Technologies 7890A) with a thermal conductivity detector as described previously[18]. Py-gas composition ($H_2$, $CH_4$, CO, and $CO_2$) in mechanistic studies using bio-oil and simulated py-gas as feedstock and using simulated biochar catalysts was analyzed by micro GC with a thermal conductivity detector (Agilent Technologies 490). The py-gas higher heating value (HHV) was calculated based on the constituent fraction and the corresponding constituent HHV. The HHVs of biochar and bio-oil were measured using a bomb calorimeter (Parr 1341, Plain Jacket Calorimeter, Parr Instrument Company, Moline, IL). The product energy per mass of biosolids pyrolyzed (kJ/kg biosolids) was calculated by multiplying each product yield with the corresponding HHV. Chemical constituents in the bio-oil were characterized by GC (7890B, Agilent Technologies, USA) mass spectroscopy (MS) (5977A, Agilent Technologies, USA) and by 430 GC/FID (Bruker Corporation, Bruker Daltonics, Inc., USA) at Iowa State University's Bioeconomy Institute. The detailed methodology was described by Brown et al.[58].

Results and Discussion

Figure 8A:
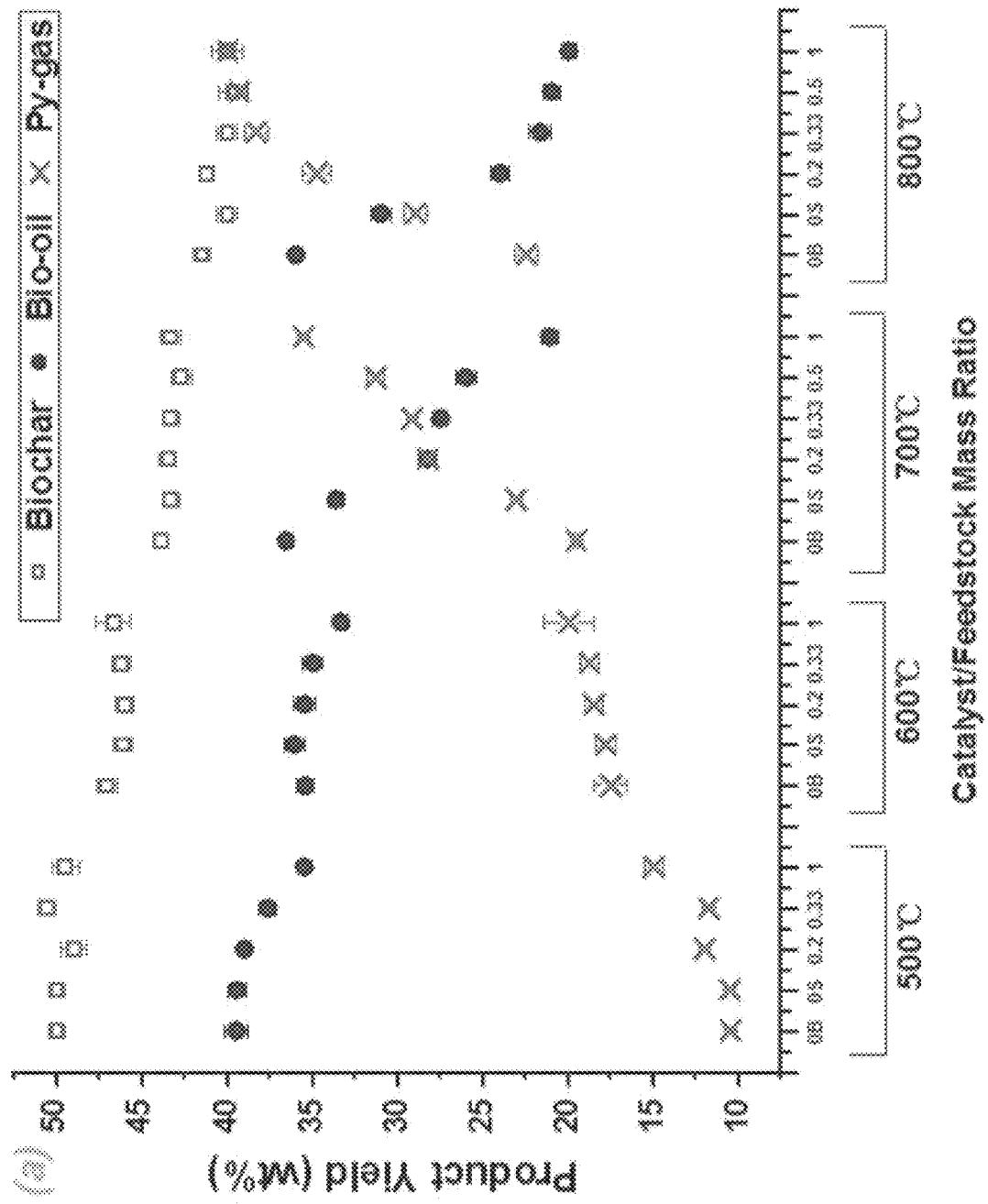
FIG. 8A. Autocatalysis impacts mass yields and shifts py-gas composition. The effect of temperature and catalyst loading on the product mass yield is shown. The catalyst to feedstock ratio is noted on the x-axis; 0B denotes experiments without catalyst or sand at 500 C.; 0S denotes experiments with sand in place of catalyst. Error bars represent one standard deviation of triplicate experiments; some error bars are small and not visible. Coke yield is listed in Table 2.

Impact of autocatalysis on mass yields and product composition. Using WB-biochar catalyst significantly increased py-gas production and decreased bio-oil production (FIG. 8A) (ANOVA, p<0.0001). The bio-oil yield decreased from 36% (of the total product mass) in the 0B control test to approximately 20% at temperatures ≥700° C. in the autocatalysis tests at a catalyst/feedstock mass ratio of 1. Additional cracking of bio-oil by the catalyst resulted in higher py-gas yields; the py-gas yield reached its highest value of 37% at 800° C. During the 0S control test, py-gas yield (wt %) of the total product mass) increased 3.5% and 6.2% at 700° C. and 800° C., respectively. Therefore, autocatalysis with WB-biochar further altered the product yield distribution in addition to secondary reactions. Others observed lower py-gas yield increases when using pinewood as the feedstock and pinewood biochar as the catalyst[43,49]. At 500° C. and 600° C. the impact of autocatalysis was minimal. When the catalyst/feedstock ratio increased from 0.2 to 1, the bio-oil fraction was reduced by less than 5%. Moreover, coke was formed at 700° C. and 800° C. (Table 2). The coke mass yield was always less than 4%.

Figure 8B:
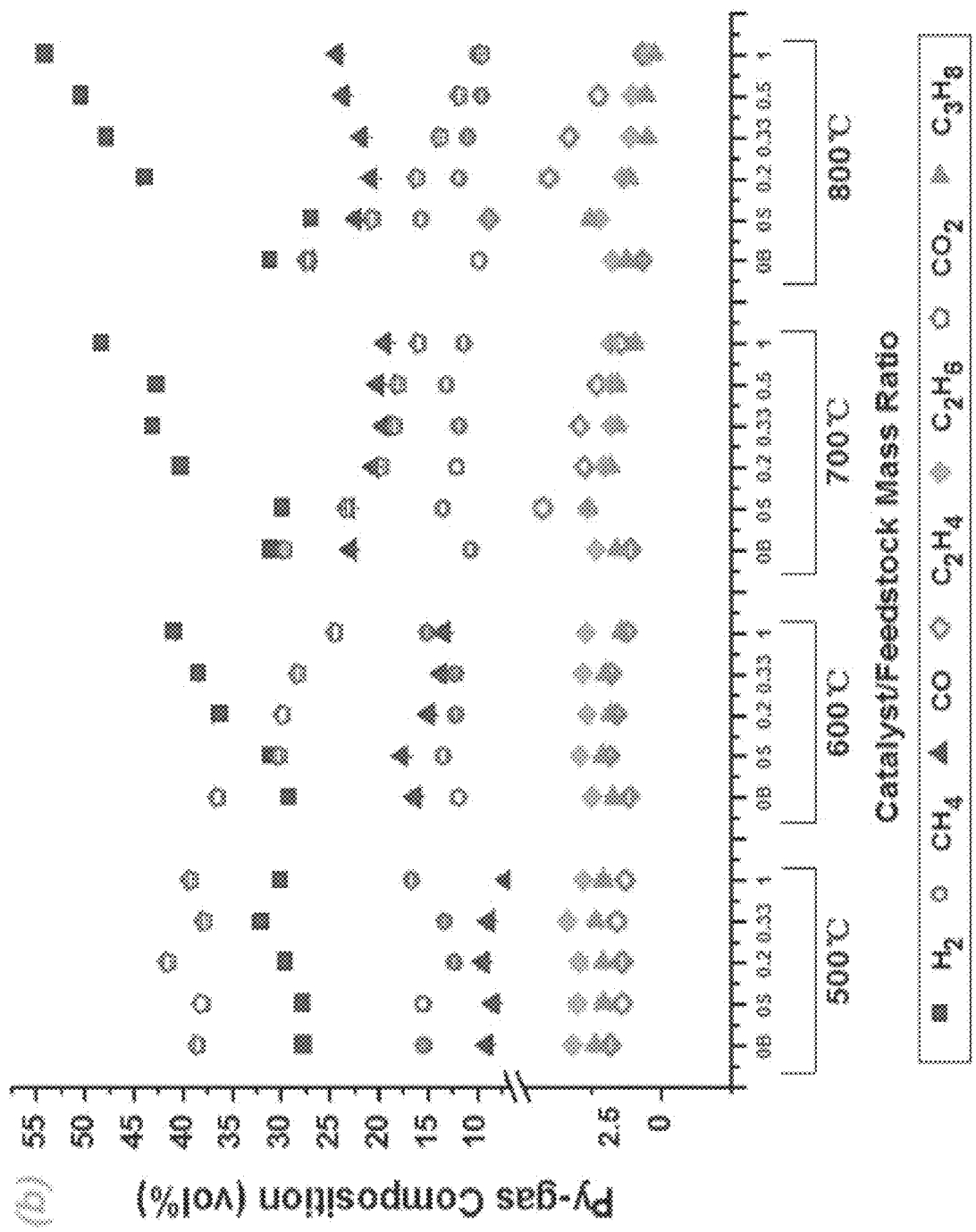
FIG. 8B. Autocatalysis impacts mass yields and shifts py-gas composition. The effect on py-gas composition is shown. The catalyst to feedstock ratio is noted on the x-axis; 0B denotes experiments without catalyst or sand at 500 C.; 0S denotes experiments with sand in place of catalyst. Error bars represent one standard deviation of triplicate experiments; some error bars are small and not visible. Coke yield is listed in Table 2.

In addition to altering mass yields, autocatalysis also altered the py-gas composition (FIG. 8B). The 0B sample represents the gas composition before catalyst, and the 0S sample represents the gas composition before catalyst but with secondary reactions. As catalyst loading increased, the H2 fraction increased from approximately 30% (by volume) to 55% at 800° C., and $CO_2$% decreased simultaneously from over 25% to 10%. The $H_2$ increase was likely a result of multiple thermochemical reactions including steam methane reforming ($H_2O+CH_4=3H_2+CO$; $2H_2O+CH_4=4H_2+CO_2$), dry reforming ($CO_2+CH_4=2CO+2H_2$), water gas shift reaction ($CO+H_2O=CO_2+H_2$), and tar decomposition and reforming (e.g. $Tar+H_2O=CO$, $CO_2$, and $H_2$). In particular, the tar decomposition to light molecular weight hydrocarbons and the $H_2$% increase was ostensibly catalyzed by the metals in the WB-biochar as discussed below. The decrease in the $CO_2$ percentage was ostensibly due to both the relative increase of $H_2$ and the dry reforming enhanced by biochar catalysts as proposed by previous studies[50,59,60]. CO may have been reduced via the water gas shift reaction, but steam methane reforming and tar steam reforming could make up CO in addition to dry reforming. Though $CH_4$ is consumed in reforming reactions, thermal cracking and steam reforming of tars may have compensated for the $CH_4$ decreases. $CH_4$, $C_2H_4$, and $C_3H_8$ were less dominant gases, but they still carry high energy values. The percentage of $C_2H_4$ and $C_3H_8$ increased at 700° C. and 800° C. These gases were likely produced by thermal cracking of tar at higher tempretures[61].

In addition to decreasing the bio-oil yield, autocatalysis altered the bio-oil chemical composition (SI, Tables 3 and 4). Based on GC-FID analysis, the 800° C. catalytic bio-oil contained few detectable organic constituents; only 3,4-dimethoxyacetophenone (0.46 wt %), 1,2,4-trimethoxybenzene (0.01 wt %) and 4-ethoxystyrene (0.96 wt %) (Table 3). In contrast, 40 organic constituents were detected and quantified in the non-catalyzed 0B bio-oil by GC-FID. Also, major hydrocarbon peaks in the non-catalyzed 0B bio-oil were detected by GC-MS analysis including toluene, ethylbenzene, styrene, phenol, cresol, indole, and hydantoin. These peaks were not present in the 800° C. catalytic bio-oil. A detailed list of chemicals detected by GC-MS is listed in Table 4.

Figure 9:
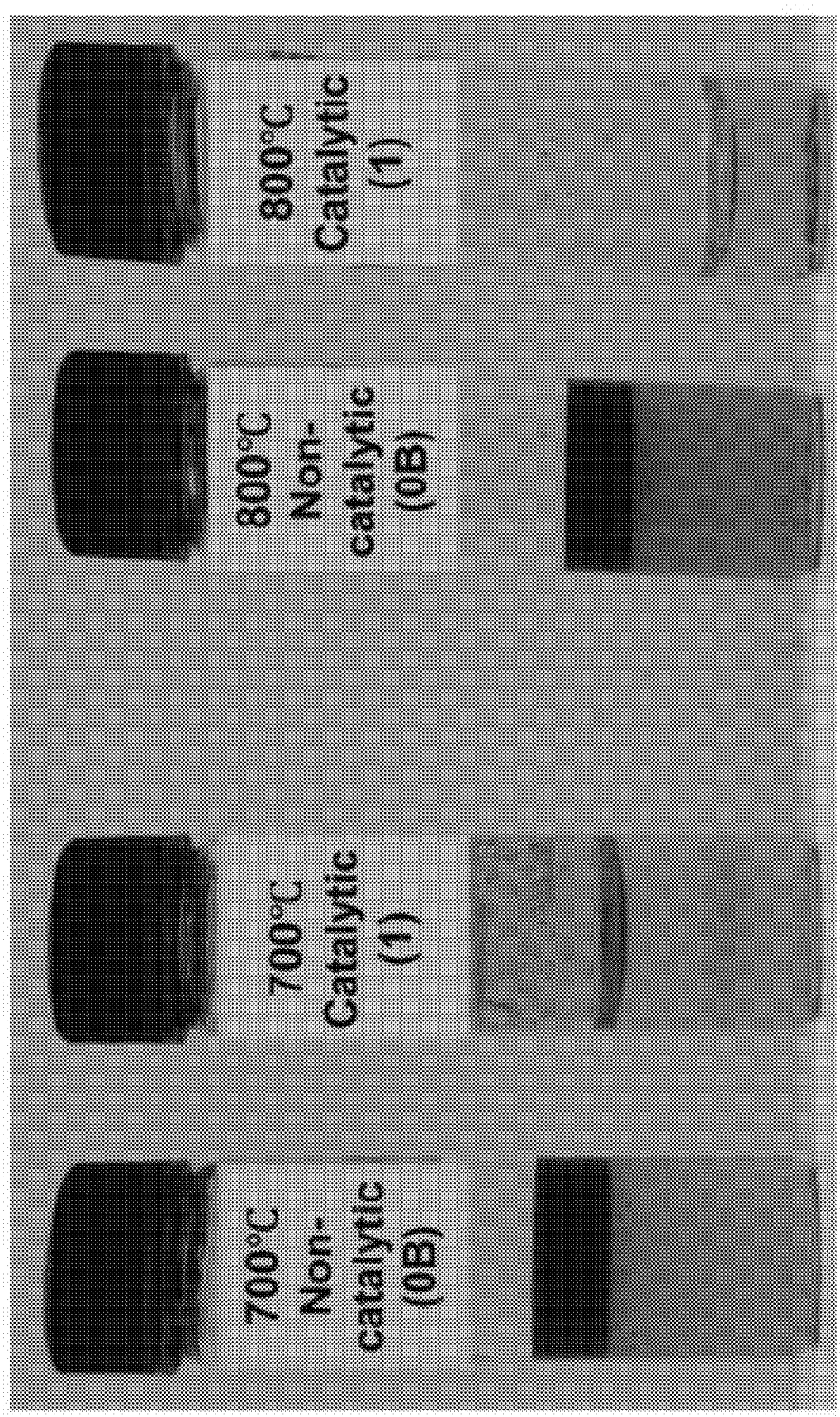
FIG. 9. Autocatalytic effect on the bio-oil optical property at 700° C. and 800° C. (0B: Blank test without catalyst and secondary reactions; 1: Biochar catalyst to biosolids feedstock mass ratio was 1.)

Along with changing the bio-oil chemical composition, autocatalysis substantially changed the bio-oil color (FIG. 9). The color of the aqueous layer in the catalytic bio-oil was more clear compared to that of non-catalytic bio-oil. The mass of the dark brown, light non-aqueous phase liquid product was greatly reduced. Very little light non-aqueous phase liquid was observed in the bio-oil catalyzed at 700° C. and none was observed at 800° C. with autocatalysis (FIG.

9). The dark color of bio-oil is associated with the presence of unsaturated hydrocarbons[62]. Therefore, autocatalysis led to fewer unsaturated hydrocarbons in the bio-oil. More research is needed to determine the chemical constituents of the catalyzed bio-oil.

Figure 10:
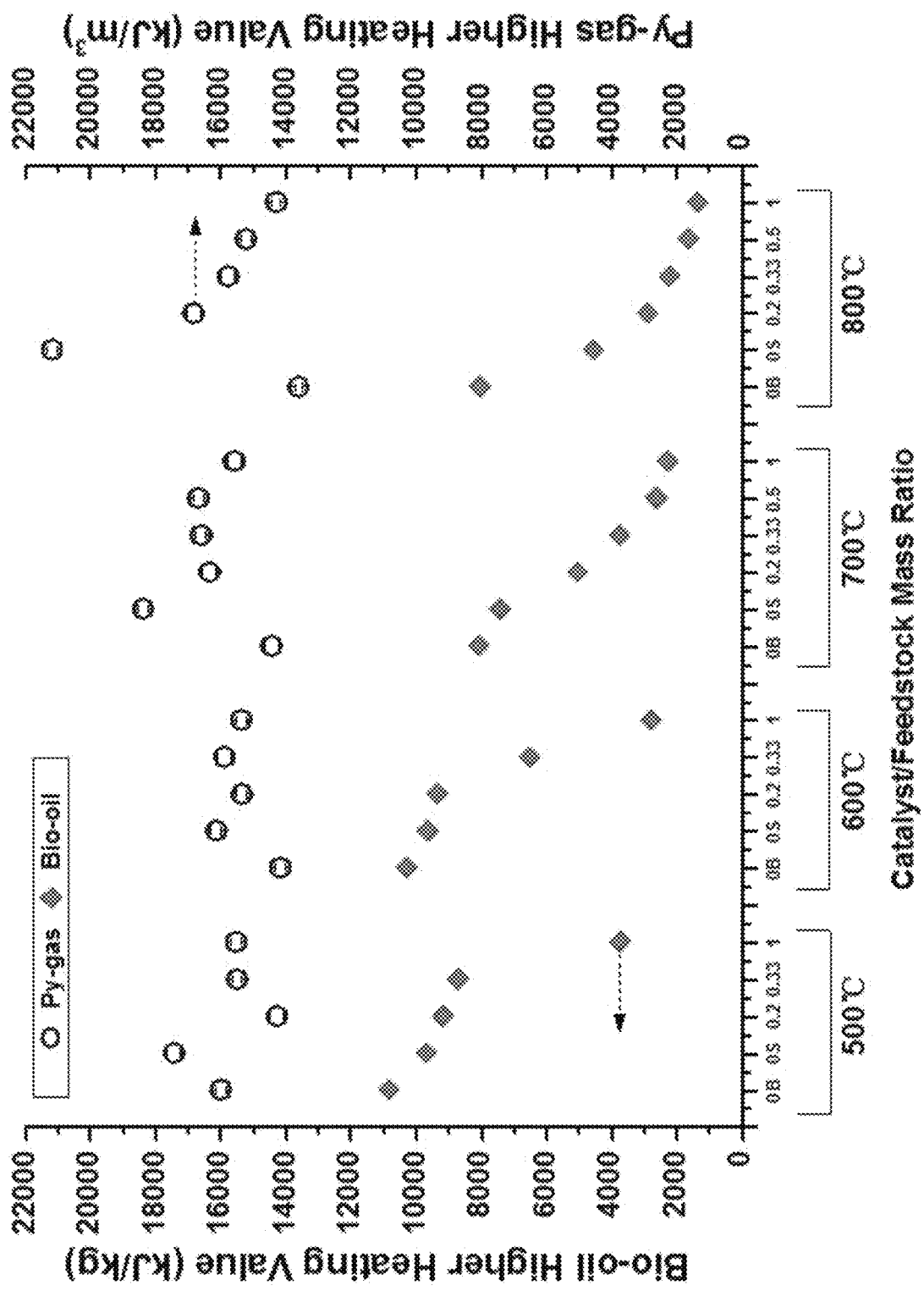
FIG. 10. Effect of temperature and catalyst loading on the product energy distribution.

Impact of Autocatalysis on Py-gas and Bio-oil Energy Yields. Autocatalysis reduced the bio-oil energy content (FIG. 10) and the bio-oil HHV decreased with increased catalyst/feedstock mass ratios at each pyrolysis temperature. In particular, at 800° C., the bio-oil HHV decreased from 8070 kJ/kg-bio-oil with no catalysis (0B) to below 1400 kJ/kg-bio-oil at the highest catalyst loading ratio of 1:1. The HHV decrease was likely due to the decrease in organic constituents described above and the formation of water during catalysis[50]. The py-gas HHV of 0S increased greatly at higher temperatures of 700° C. and 800° C. due to the increased concentrations of $CH_4$, $C_2H_4$, and $C_3H_8$, which have high unit energy contents. However, when more $H_2$ (comparatively lower volumetric energy content) was produced via autocatalysis, the py-gas HHV decreased.

Figure 11:
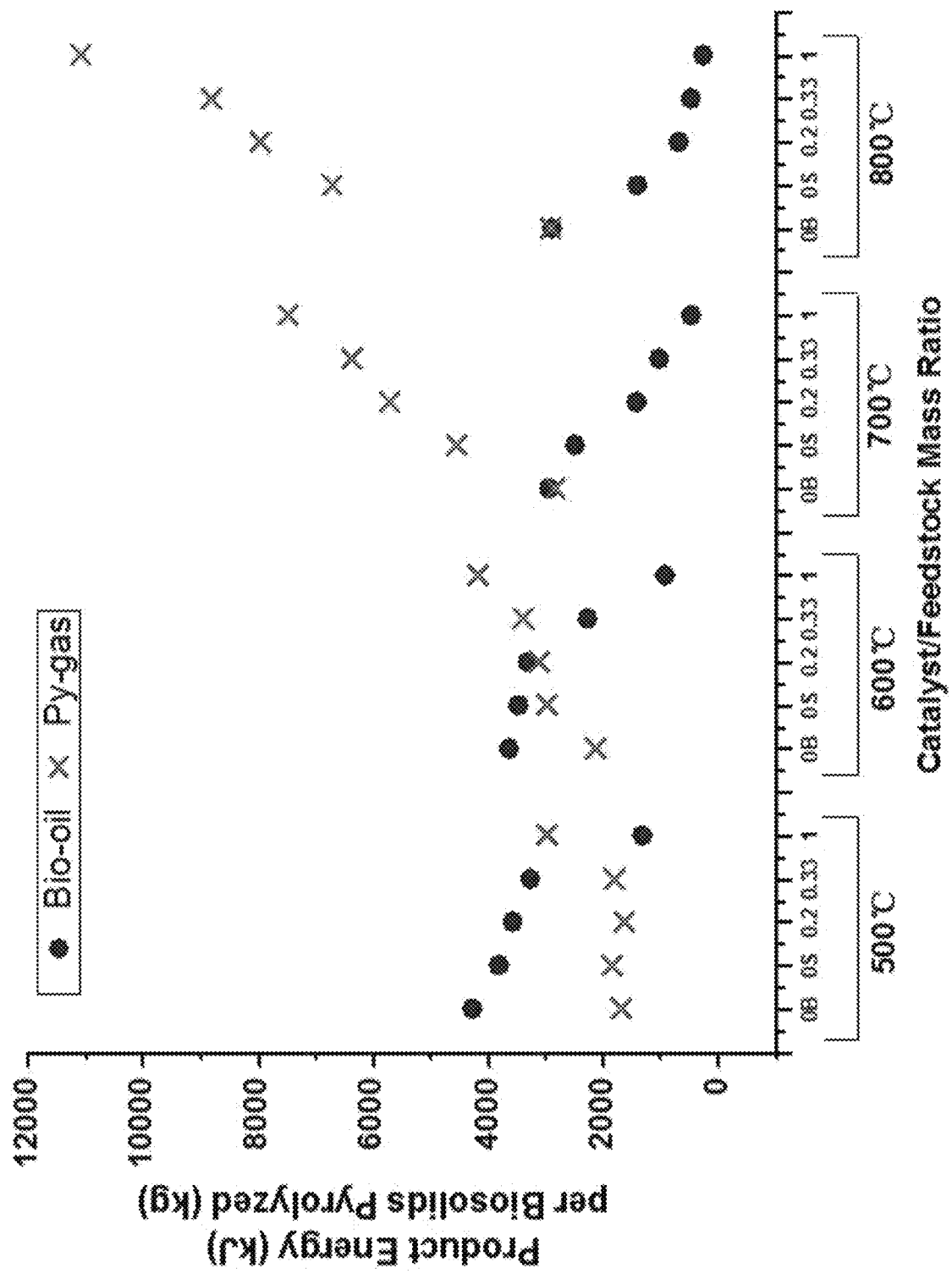
FIG. 11. Autocatalysis affects py-gas and bio-oil energy yields. 0B denotes experiments without catalyst or sand at 500° C.; 0S denotes experiments with sand in place of catalyst.

Energy yields associated with py-gas increased as temperature and catalyst/feedstock mass ratio increased (FIG. 11). For the non-catalyzed 0B control tests, more energy was produced in the form of bio-oil at 500° C. and 600° C., and as the temperature increased to 700° C. and 800° C., the energy in bio-oil and py-gas was almost equal. Secondary reactions under non-catalyzed 0S conditions shifted some energy from the bio-oil to the py-gas. The addition of the WB-catalyst further increased the energy yields of py-gas. At the highest catalyst loading, the py-gas energy increased to 10,200 kJ/kg-biosolids-pyrolyzed from the original 2,940 kJ/kg under non-catalyzed 0B condition at 800° C. Meanwhile, due to the greatly reduced yield and energy content in bio-oil, the bio-oil energy dropped from 2,900 kJ/kg-biosolids-pyrolyzed to 275 kJ/kg. The shift in energy from bio-oil to py-gas may be especially useful for utilities that combust biogas for on-site energy recovery.

Figure 12:
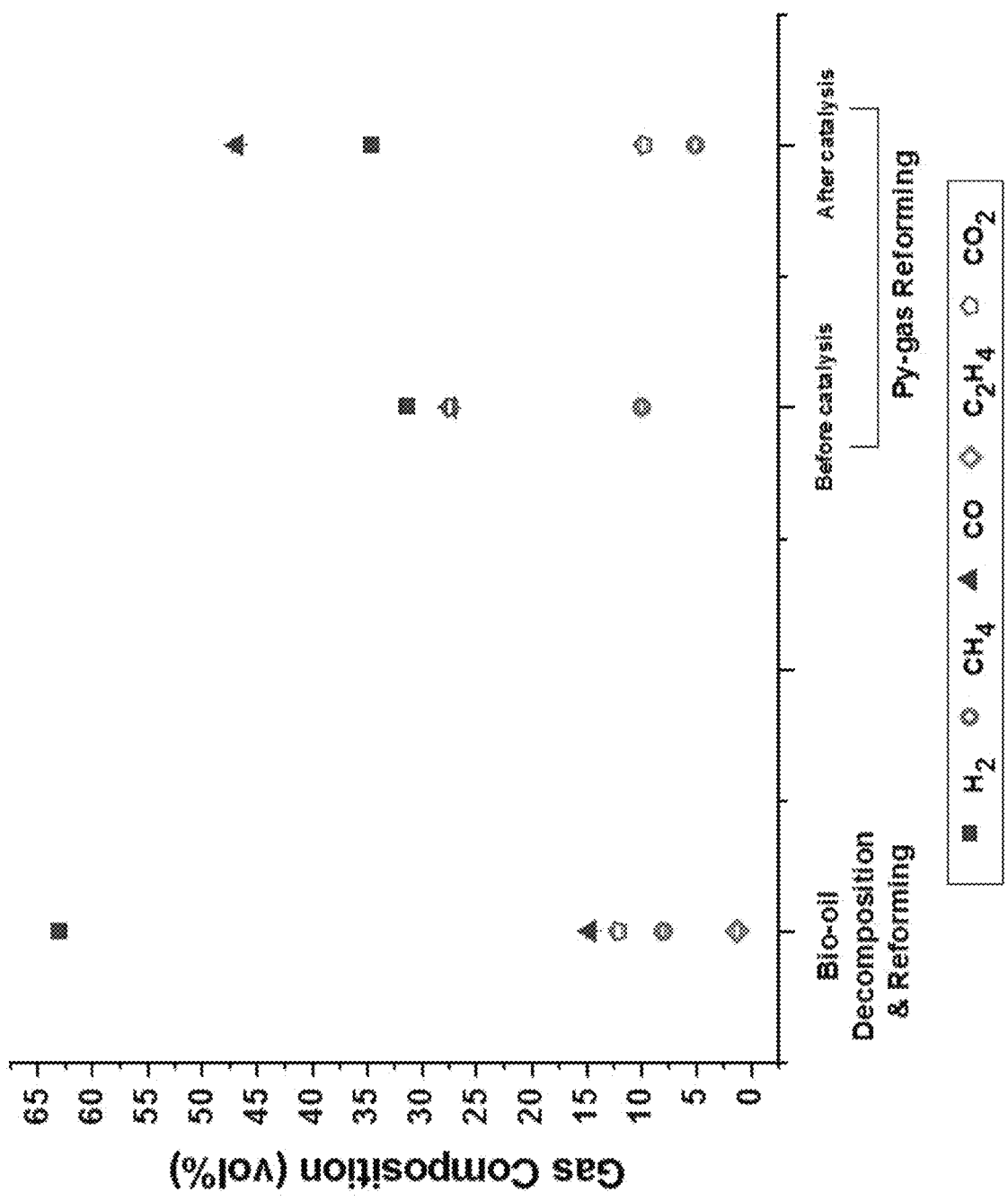
FIG. 12. The gas composition during the autocatalytic decomposition or reforming of bio-oil and pygas. Error bars represent one standard deviation of triplicate experiments; some error bars are small and not visible.

The individual autocatalytic effect of WB-biochar on bio-oil and py-gas. Bio-oil was decomposed using WB-biochar as a catalyst. The bio-oil mass was reduced by 40% during the individual autocatalytic test, which was similar to the bio-oil reduction percentage during the autocatalytic biosolids pyrolysis at 800° C. with a feedstock to catalyst ratio of 0.33 (i.e. from 36% to 22%). Meanwhile, the bio-oil decomposition and reforming produced $H_2$, $CH_4$, CO, $CO_2$, and $C_2H_4$, in which $H_2$ had the highest percentage of 63% (FIG. 12). These results demonstrate that the WB-biochar catalyst converts bio-oil into py-gas and corroborates results shown in FIG. 8B.

Py-gas was reformed using WB-biochar as a catalyst. The simulated py-gas was also reformed via autocatalysis. CO % increased from 27% to 47% while $CO_2$ decreased from 27% to 10%. The $CH_4$ content was also cut in half. However, $H_2$% only increased slightly. Summarily, the reduction of bio-oil yield was not affected by the co-existing py-gas. The destruction and reforming of bio-oil contributed to the $H_2$ increase. Py-gas reforming reduced $CO_2$ yield.

Figure 13A:
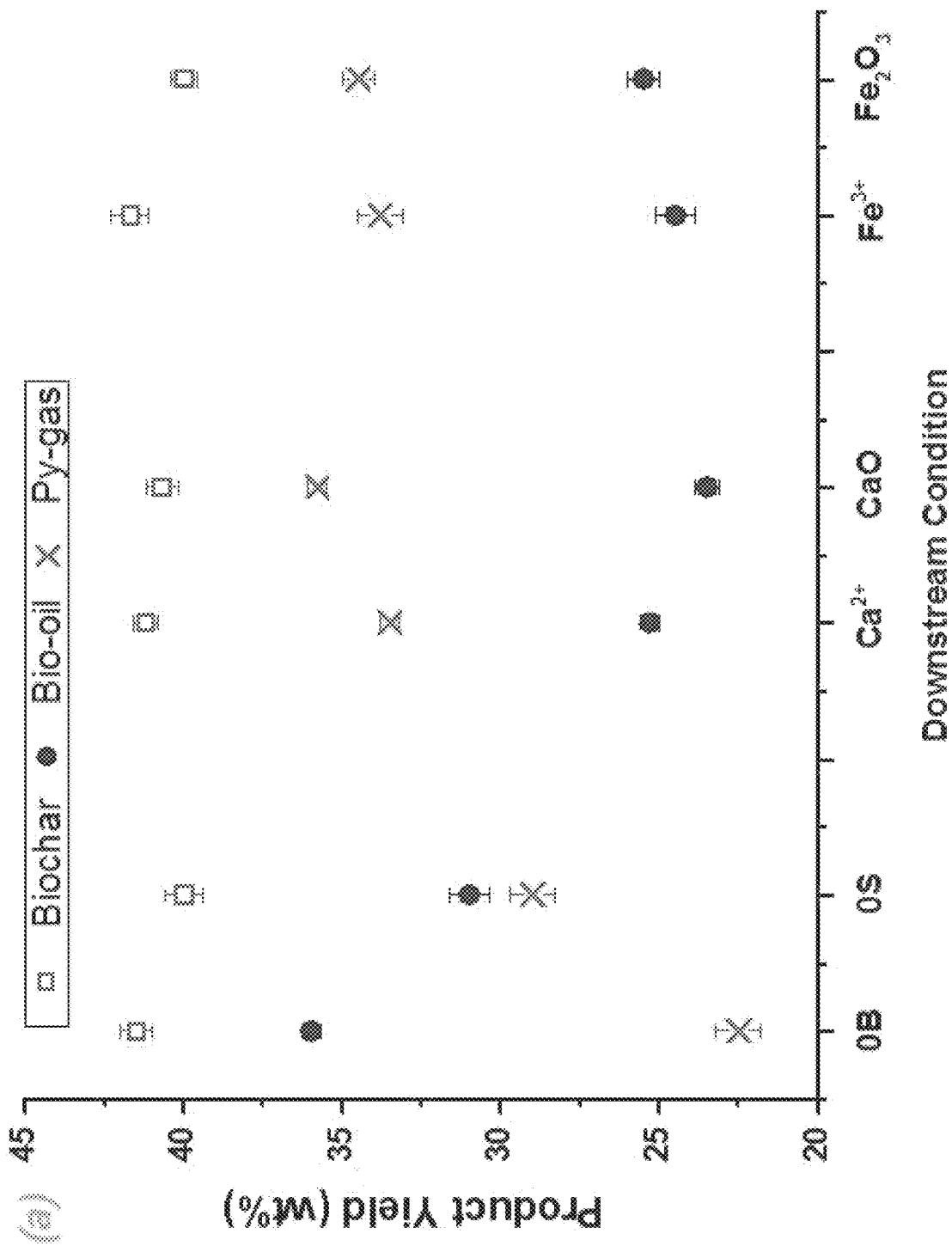
FIG. 13A. Catalytic effect of metals on product yields. 0B denotes experiments without catalyst or sand at 500 C.; 0S denotes experiments with sand in place of catalyst. Error bars represent one standard deviation of triplicate experiments.
Figure 13B:
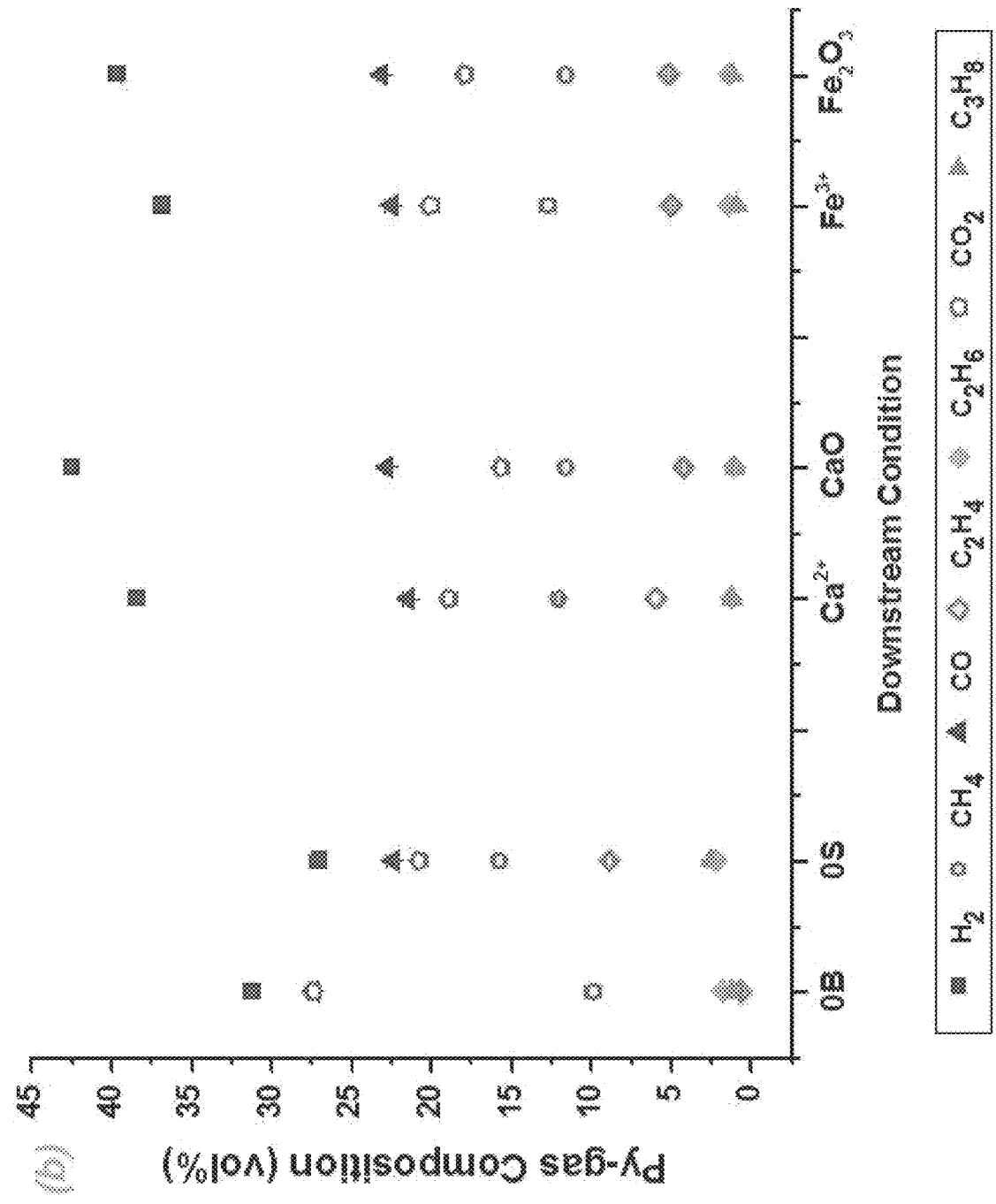
FIG. 13B. Catalytic effect of metals on py-gas composition. 0B denotes experiments without catalyst or sand at 500 C.; 0S denotes experiments with sand in place of catalyst. Error bars represent one standard deviation of triplicate experiments.

The autocatalytic role of dominant metal elements in WB-biochar. The catalytic effects of individual oxides and salt forms of Mg, Ca, and Fe in the WB-biochar were investigated. The addition of Ca and Fe significantly influenced both product distribution and py-gas composition (FIG. 13A). $Ca^{2+}$ and $Fe^{3+}$ reduced the bio-oil yield from over 35% (0B) to 25% (ANOVA, p<0.0001) and increased the py-gas yield from 22% (0B) to 34% (ANOVA, p <0.0001). The $H_2$ concentration increased from 31% (0B) to 37%. The metal oxides catalytic effects were similar to those of metal salts. The presence of CaO and $Fe_2O_3$ in the WB-biochar decreased the bio-oil yield to approximately 24% while increasing py-gas yield to 35%, and the py-gas $H_2$ concentration increased to 40%. The concentrations of the remaining py-gas components using the simulated catalysts and WB-biochar catalyst were similar (FIGS. 8B and 13B), indicating that the metals present in WB-biochar were largely responsible for the catalytic activity. Previous research demonstrated that $Mg^{2+}$ and MgO in catalysts reduced tar or bio-oil production[51,54]. The low Mg content used in these simulated catalyst experiments did not change the product yields (Mg data not shown in the figure).

WB-biochar, and the metals it contains, could facilitate bio-oil component decomposition by absorption-enhanced reforming[56,63]. Others have shown that tar constituents readily adsorb onto char and metal surfaces and then dissociate to reactive radicals such as aromatic ring fragments[46,56,63-66]. WB-biochar itself also contains free radicals in the carbon matrix that are generated by decomposition of organic matter during pyrolysis[67,68]. The porous carbon structure and the highly dispersed metals likely act as active sites for radical reactions, converting tar constituents to smaller molecules and gases[46,69-71]. In particular, high temperature favors free-radical reactions[72]. Also, iron oxides are the major component of commercial catalysts for high-temperature water gas shift reaction[73,74]. The py-gas $H_2$ concentration increase may have resulted from the catalytic water gas shift reaction. Moreover, iron oxides or ions could be partially transformed into metallic states via in-situ reduction by carbon (i.e. the char part of WB-biochar) or reductive gases (e.g., $H_2$ and CO) from biosolids pyrolysis[75-77]. The metallic irons could also enhance the tar decomposition[53,78]. Additionally, CaO played a special role in enhancing the $H_2$ production by in-situ removal of $CO_2$ from the py-gas[79]. In this sorption enhanced hydrogen production process, there were many reactions that produced $CO_2$ that could be involved such as steam methane reforming and water gas shift reaction[80,81].

In summary, using biochar produced from wastewater biosolids as a catalyst can significantly alter the products derived from the pyrolysis of wastewater biosolids. The autocatalytic process yielded more py-gas that is relatively clean and easily combusted for energy in existing boilers or engines, less bio-oil requiring conditioning or disposal, and biochar that is a valuable soil amendment. This work is the first research to demonstrate the autocatalytic effect of WB-biochar to alter product distribution and energy recovery during biosolids pyrolysis at WRRFs. The autocatalytic pyrolysis process could be a step to enhance energy recovery, minimize adverse environmental impacts, and generate value-added products from used water.

Tables

TABLE 1

Experimental design of non-catalytic, autocatalytic, and mechanistic test.

| | Pyrolysis Temperature (° C.) | Downstream Temperature (° C.) | Downstream Loading | Catalyst/Feedstock Mass Ratio |
|---|---|---|---|---|
| Non-catalytic (0B) | 500 | 500 | Blank | 0 |
| | 800 | 500 | Blank | 0 |
| | 700 | 500 | Blank | 0 |
| | 800 | 500 | Blank | 0 |
| Non-catalytic (0S) | 500 | 500 | 1-2 mm sand | 0 |
| | 600 | 600 | 1-2 mm sand | 0 |
| | 700 | 700 | 1-2 mm sand | 0 |
| | 800 | 800 | 1-2 mm sand | 0 |
| Autocatalytic | 500 | 500 | 1-2 mm biochar | 0.2, 0.33, 1 |
| | 800 | 600 | 1-2 mm biochar | 0.2. 0.33, 1 |
| | 700 | 700 | 1-2 mm biochar | 0.2, 0.33. 0.5, 1 |
| | 800 | 800 | 1-2 mm biochar | 0.2. 0.33. 0.5, 1 |
| Mechanistic | 800 | 800 | $MgCl_2$, $CaCl_2$, $FeCl_3$, MgO, CaO, $Fe_2O_3$ impregnated DDGS-biochar | 0.33 |

TABLE 2

Elemental analysis by XRF (wt % dry basis)

| Element | 500° C. WB-Biochar | 600° C. WB-Biochar | 700° C. WB-Biochar | 800° C. WB-Biochar | 200° C. DDGS-Biochar |
|---|---|---|---|---|---|
| Mg | 1.84 | 2.20 | 2.22 | 2.77 | 1.84 |
| Ca | 6.29 | 6.28 | 6.21 | 6.94 | 0.08 |
| K | 1.11 | ND | ND | ND | ND |
| Na | 0.43 | 0.42 | 0.41 | 0.42 | 0.37 |
| P | 4.55 | 4.87 | 4.86 | 5.06 | 4.26 |
| Ni | 0.02 | 0.02 | 0.02 | 0.02 | ND |
| Cu | 0.08 | 0.08 | 0.08 | 0.09 | ND |
| Zn | 0.18 | 0.18 | 0.18 | 0.19 | 0.01 |
| Mn | 0.34 | 0.34 | 0.33 | 0.36 | ND |
| Fe | 10.67 | 10.59 | 10.47 | 11.25 | 0.02 |
| Cr | 0.06 | 0.06 | 0.07 | 0.06 | ND |
| Ti | 0.67 | 0.64 | 0.65 | 0.68 | ND |
| Zr | 0.05 | 0.05 | 0.06 | 0.06 | ND |
| Cl | 0.49 | 0.51 | 0.48 | 0.49 | 0.11 |
| O | 23.58 | 24.59 | 23.52 | 21.30 | 13.31 |
| Al | 1.73 | 1.78 | 1.81 | 1.93 | ND |
| Si | 6.88 | 7.44 | 7.28 | 7.73 | 0.04 |
| C | 40.20 | 39.10 | 40.48 | 39.69 | 79.57 |

*The highest contents of Mg, Ca and Fe are highlighted in bold

TABLE 3

Experimental design of autocatalysis mechanism investigation

| Elemental Concentration in WB-Biochar | Impregnated Form | Activation Temperature (° C.) & Duration | Pyrolysis/ Downstream Temperature (° C.) | Catalyst/ Feedstock Mass Ratio |
|---|---|---|---|---|
| 3% Mg | $MgCl_2$ or MgO on DDGS-biochar | 500° C. & 3 hrs | 800 | 0.33 |
| 7% Ca | $CaCl_2$ or GaO on DDGS-biochar | 500° C. & 3 hrs | 800 | 0.33 |
| 11% Fe | $FeCl_3$ or $Fe_3O_2$ an DDGS-biochar | 500° C. & 3 hrs | 800 | 0.33 |

TABLE 4

Bio-oil compounds quantified by GC-FID

| Compounds (wt. %, raw basis) | 800° C. Non-catalytic (0B) | 800° C. Autocatalytic (1) |
|---|---|---|
| *Aldehyde* | | |
| Acetaldehyde | 0.03 | ND* |
| m-Tolualdehyde | 0.01 | ND |
| 3,5-Olmethoxy-4-hydroxybenzeldehyde | 0.01 | ND |
| Coniferaldehyde | 0.01 | ND |
| Vanillin | 0.01 | ND |
| *Ketone* | | |
| 4'-Hydroxy-3'-methoxyacetophenone | 0.02 | ND |
| 3,4-Dimethoxyacetophenone | 0.77 | 0.46 |
| Gualacyl acetone | 0.05 | ND |
| 2',4'-Dimethoxyacetophenone | 0.44 | ND |
| 3',5'-Dimethoxy-4'-hydroxyacetophenone | 0.72 | ND |
| *Phenol* | | |
| Phenol | 0.06 | ND |
| 2-Ethylphenol | 0.41 | ND |
| 3-Ethylphenol | 0.08 | ND |
| 2,5-Dimethylphenol | 0.16 | ND |

TABLE 4-continued

Bio-oil compounds quantified by GC-FID

| Compounds (wt. %, raw basis) | 800° C. Non-catalytic (OB) | 800° C. Autocatalytic (1) |
|---|---|---|
| 2,6-Dimethylphenol | 0.04 | ND |
| 3,4-Dimethylphenol | 0.41 | ND |
| 2,6-Dimethoxyphenol | 0.07 | ND |
| 4-Methyl-2,6-dimethoxyphenol | 0.01 | ND |
| o-Cresol | 0.11 | ND |
| m,p-Cresol | 0.11 | ND |
| 3-Methoxy-5-methylphenol | 0.02 | ND |
| *Gualacol* | | |
| 4-Ethyl-2-methoxyphenol | 0.02 | ND |
| 2-Methoxy-4-propylphenol | 0.35 | ND |
| 2-Methoxy-4-methylphenol | 0.04 | ND |
| 2-Methoxy-4-vinylphenol | 0.02 | ND |
| *Ether* | | |
| Anisole | 0.01 | ND |
| 2-Methylanisole | 0.44 | ND |
| 3-Methylanisole | 0.04 | ND |
| 4-Vinylanisole | 1.05 | ND |
| 1,2,3-Trimethoxybenzene | 0.02 | ND |
| 1,2,4-Trimethoxybenzene | 0.09 | 0.01 |
| *Alcohol* | | |
| 1,2-Benzenedimethanol | 2.51 | ND |
| 2,5-Dimethoxybenzylalcohol | 0.03 | ND |
| *Other Aromatics* | | |
| Ethylbenzene | 0.04 | ND |
| p-/m-Xylene composite | 0.02 | ND |
| o-Xylene | 0.04 | ND |
| Styrene | 0.37 | ND |
| 4-Ethoxystyrene | 0.99 | 0.96 |
| 2,3-Dimethoxytoluene | 0.33 | ND |
| 3,4-Dimethoxytoluene | 0.02 | ND |

*ND: Not Detected (detection limit is 600 ppm)

TABLE 5

DFT Cumulative Surface Area

| Sample (800° C.) | DFT cumulative surface area |
|---|---|
| Corn Stover Biochar | 5.49e + 00 m$^2$/g |
| DDGS Biochar | 6.90e − 01 m$^2$/g |
| Pinewood Biochar | 3.77e + 01 m$^2$/g |
| Papermill Sludge Biochar | 5.23e + 01 m$^2$/g |
| Biosolids Biochar | 5.24e + 01 m$^2$/g |

References (1) Jhansi, S. C.; Mishra, S. K. Wastewater Treatment and Reuse: Sustainability Options. *Cons. J. Sustain. Dev.* 2013, 10 (1), 1-15.

(2) Eggen, R. I. L.; Hollender, J.; Joss, A.; Scharer, M.; Stamm, C. Reducing the discharge of micropollutants in the aquatic environment: the benefits of upgrading wastewater treatment plants. *Environ. Sci. Technol.* 2014, 48 (14), 7683-7689.

(3) Venkatesan, A. K.; Hamdan, A.-H. M.; Chavez, V. M.; Brown, J. D.; Halden, R. U. Mass Balance Model for Sustainable Phosphorus Recovery in a US Wastewater Treatment Plant. *J. Environ. Qual.* 2016, 45 (1), 84-89.

(4) Mo, W.; Zhang, Q. Energy-nutrients-water nexus: integrated resource recovery in municipal wastewater treatment plants. *J. Environ. Manage.* 2013, 127, 255-267.

(5) Gude, V. Energy positive wastewater treatment and sludge management. *Edorium J. Waste* . . . 2015.

(6) Cao, Y.; Pawlowski, A. Sewage sludge-to-energy approaches based on anaerobic digestion and pyrolysis: Brief overview and energy efficiency assessment. Renew. *Sustain. Energy Rev.* 2012, 16 (3), 1657-1665.

(7) Xia, K.; Hundal, L.; Kumar, K. Triclocarban, triclosan, polybrominated diphenyl ethers, and 4-nonylphenol in biosolids and in soil receiving 33-year biosolids application. *Environ* . . . 2010.

(8) Bright, D. A.; Healey, N. Contaminant risks from biosolids land application. *Environ. Pollut.* 2003, 126 (1), 39-49.

(9) Singh, R. P.; Agrawal, M. Potential benefits and risks of land application of sewage sludge. *Waste Manag.* 2008, 28 (2), 347-358.

(10) Carey, D. E.; Zitomer, D. H.; Hristova, K. R.; Kappell, A. D.; McNamara, P. J. Triclocarban Influences Antibiotic Resistance and Alters Anaerobic Digester Microbial Community Structure. *Environ. Sci. Technol.* 2016, 50 (1), 126-134.

(11) Carey, D.; Zitomer, D. H.; Kappell, A.; Choi, M.; Krassimira Hristova, K. H.; McNamara, P. Chronic exposure to triclosan sustains microbial community shifts and alters antibiotic resistance gene levels in anaerobic digesters. *Environ. Sci. Process. Impacts* 2016.

(12) Torri, S.; Corrêa, R. Biosolids soil application: why a new special on an old issue? *Appl. And Environ. Soil Sci*, Vo. 2012 (2012), Article ID 265783, 3 pages.

(13) Evans, T. D. Biosolids in Europe. *Proc. Water Environ. Fed.* 2012, 2012 (2), 108-117.

(14) Rulkens, W. Sewage sludge as a biomass resource for the production of energy: Overview and assessment of the various options. *Energy and Fuels* 2008, 22 (1), 9-15.

(15) Chen, D.; Yu, Y.; Zhu, H.; Liu, Z.; Xu, Y. Ferrite process of electroplating sludge and enrichment of copper by hydrothermal reaction, *Separ. & Purif Technol.*, Vol. 62, Issue 2, 1 Sept. 2008, Pages 297-303.

(16) Lumley, N. P. G.; Ramey, D. F.; Prieto, A. L.; Braun, R. J.; Cath, T. Y.; Porter, J. M. Techno-economic analysis of wastewater sludge gasification: A decentralized urban perspective. *Bioresour. Technol.* 2014, 161, 385-394.

(17) Bridle, T.; Pritchard, D. Energy and nutrient recovery from sewage sludge via pyrolysis. *Water Sci. Technol.* 2004.

(18) McNamara, P.; Koch, J.; Zitomer, D. Pyrolysis of Wastewater Biosolids: Lab-Scale Experiments and Modeling. *Proc. Water Environ. Fed.* 2014, 2014 (2), 1-14.

(19) Liu, Z.; Qian, G.; Sun, Y.; Xu, R.; Zhou, J.; Xu, Y. Speciation Evolutions of Heavy Metals during the Sewage Sludge Incineration in a Laboratory Scale Incinerator. *Energy & Fuels* 2010, 24 (4), 2470-2478.

(20) Fytili, D.; Zabaniotou, A. Utilization of sewage sludge in EU application of old and new methods-A review. *Renew. Sustain. Energy Rev.* 2008, 12 (1), 116-140.

(21) Liu, Z. Development of a Sorption Enhanced Steam Hydrogasification Process for In-situ Carbon Dioxide (CO2) *Removal and Enhanced Synthetic Fuel Production.* 2013.

(22) Samolada, M. C.; Zabaniotou, A. A. Comparative assessment of municipal sewage sludge incineration, gasification and pyrolysis for a sustainable sludge-to-energy management in Greece. *Waste Manag.* 2014, 34 (2), 411-420.

(23) Carey, D. E.; McNamara, P. J.; Zitomer, D. H. Biochar from Pyrolysis of Biosolids for Nutrient Adsorption and Turfgrass Cultivation. *Water Environ. Res.* 2015, 87 (12), 2098-2106.

(24) Ross, J. J.; Zitomer, D. H.; Miller, T. R.; Weirich, C. A.; McNamara, P. J. Emerging investigators series: pyrolysis removes common microconstituents triclocarban, triclosan, and nonylphenol from biosolids. *Environ. Sci. Water Res. Technol.* 2016, 2 (2), 282-289.

(25) Hoffman, T. C.; Zitomer, D. H.; McNamara, P. J. Pyrolysis of Wastewater Biosolids Significantly Reduces Estrogenicity. *J. Hazard. Mater.* 2016.

(26) Lu, H.; Zhang, W.; Wang, S.; Zhuang, L. Characterization of sewage sludge-derived biochars from different feedstocks and pyrolysis temperatures. *J. Anal. And Appl. Phys.*, Vol. 102, July 2013, pages 137-143.

(27) Xu, W.; Wu, D. Comprehensive utilization of the pyrolysis products from sewage sludge. *Environ. Technol.* 2015.

(28) Khanmohammadi, Z. Effect of pyrolysis temperature on chemical and physical properties of sewage sludge biochar. *Waste Manag. Res.*, 2015 March; 33(3):275-83.

(29) Conesa, J.; Marcilla, A.; Moral, R. Evolution of gases in the primary pyrolysis of different sewage sludges. *Thermochim. Acta*, Vol. 313, Issue 1, 30 Mar. 1998, pages 63-73.

(30) Yuan, H.; Lu, T.; Zhao, D.; Huang, H. Influence of temperature on product distribution and biochar properties by municipal sludge pyrolysis. *J. Mater. Cycl. And Waste Mgmt.*, September 2013, Vol. 15, Issue 3, pp 357-361.

(31) Inguanzo, M.; Dominguez, A. On the pyrolysis of sewage sludge: the influence of pyrolysis conditions on solid, liquid and gas fractions. *J. Anal. and Appl. Phys.*, Vol. 63, Issue 1, March 2002, pages 209-222.

(32) Thipkhunthod, P.; Meeyoo, V. Pyrolytic characteristics of sewage sludge. *Chemosphere* 2006.

(33) Fonts, I.; Gea, G.; Azuara, M.; Abrego, J.; Arauzo, J. Sewage sludge pyrolysis for liquid production: A review. *Renew. Sustain. Energy Rev.* 2012, 16 (5), 2781-2805.

(34) Lu, G.; Low, J.; Liu, C.; Lua, A. Surface area development of sewage sludge during pyrolysis. *Fuel* 1995.

(35) Hossain, M.; Strezov, V.; Nelson, P. Thermal characterisation of the products of wastewater sludge pyrolysis. *J. Anal. Appl. Pyrolysis*, Vol. 85, Issues 1-2, May 2009, pages 442-446.

(36) Baratieri, M.; Baggio, P.; Bosio, B.; Grigiante, M.; Longo, G. A. The use of biomass syngas in IC engines and CCGT plants: A comparative analysis. *Appl. Therm. Eng.* 2009, 29 (16), 3309-3318.

(37) Lehto, J.; Oasmaa, A.; Solantausta, Y. Fuel oil quality and combustion of fast pyrolysis bio-oils. *VTT Technol.* 2013.

(38) Oasmaa, A.; Czernik, S. Fuel oil quality of biomass pyrolysis oils state of the art for the end users. *Energy & Fuels* 1999.

(39) Sadaka, S., Boateng, A., 2009. *Pyrolysis and bio-oil.*, University of Arkansas Division of Agriculture, Research & Extension.

(40) Vreugdenhil, B.; Zwart, R.; Neeft, *J. Tar formation in pyrolysis and gasification.* 2009.

(41) Daintith, J. *A dictionary of chemistry.* 2008.

(42) Zhang, Y. L.; Luo, Y. H.; Wu, W. G.; Zhao, S. H.; Long, Y. F. Heterogeneous cracking reaction of tar over biomass char, using naphthalene as model biomass tar. *Energy and Fuels* 2014, 28 (5), 3129-3137.

(43) Sun, Q.; Yu, S.; Wang, F.; Wang, J. Decomposition and gasification of pyrolysis volatiles from pine wood through a bed of hot char. *Fuel* 2011.

(44) Klinghoffer, N. B.; Castaldi, M. J.; Nzihou, A. Catalyst properties and catalytic performance of char from biomass gasification. *Ind. Eng. Chem. Res.* 2012, 51 (40), 13113-13122.

(45) Wang, F. J.; Zhang, S.; Chen, Z. D.; Liu, C.; Wang, Y. G. Tar reforming using char as catalyst during pyrolysis and gasification of Shengli brown coal. *J. Anal. Appl. Pyrolysis* 2014, 105, 269-275.

(46) Min, Z.; Yimsiri, P.; Asadullah, M.; Zhang, S.; Li, C. Catalytic reforming of tar during gasification. Part II. Char as a catalyst or as a catalyst support for tar reforming. *Fuel* 2011.

(47) Abu El-Rub, Z.; Bramer, E. A.; Brem, G. Experimental comparison of biomass chars with other catalysts for tar reduction. *Fuel* 2008, 87 (10-11), 2243-2252.

(48) Mani, S.; Kastner, J. R.; Juneja, A. Catalytic decomposition of toluene using a biomass derived catalyst. *Fuel Process. Technol.* 2013, 114, 118-125.

(49) Gilbert, P.; Ryu, C.; Sharifi, V.; Swithenbank, J. Tar reduction in pyrolysis vapours from biomass over a hot char bed. *Bioresour. Technol.* 2009.

(50) Ren, S.; Lei, H.; Wang, L.; Bu, Q.; Chen, S.; Wu, J. Hydrocarbon and hydrogen-rich syngas production by biomass catalytic pyrolysis and bio-oil upgrading over biochar catalysts. *RSC Adv.* 2014.

(51) El-Rub, Z. A.; Bramer, E.; Brem, G. Review of catalysts for tar elimination in biomass gasification processes. *Ind. Eng. and Chem. Res.*, 2004, 43(22), pp 6911-6919.

(52) Min, Z.; Asadullah, M.; Yimsiri, P.; Zhang, S.; Wu, H.; Li, C. Z. Catalytic reforming of tar during gasification. Part I. Steam reforming of biomass tar using ilmenite as a catalyst. *Fuel* 2011, 90 (5), 1847-1854.

(53) Nordgreen, T.; Liliedahl, T.; SjÖstrÖm, K. Metallic iron as a tar breakdown catalyst related to atmospheric, fluidised bed gasification of biomass. *Fuel* 2006.

(54) Liu, H.; Ma, X.; Li, L.; Hu, Z.; Guo, P.; Jiang, Y. The catalytic pyrolysis of food waste by microwave heating. *Bioresour. Technol.* 2014.

(55) Hayashi, J.; Iwatsuki, M.; Morishita, K.; Tsutsumi, A. Roles of inherent metallic species in secondary reactions of tar and char during rapid pyrolysis of brown coals in a drop-tube reactor. *Fuel* 2002.

(56) Uddin, M.; Tsuda, H.; Wu, S.; Sasaoka, E. Catalytic decomposition of biomass tars with iron oxide catalysts. *Fuel* 2008.

(57) Ahuja, P.; Kumar, S.; Singh, P. C. A model for primary and heterogeneous secondary reactions of wood pyrolysis. *Chem. Eng. Technol.* 1996, 19 (3), 272-282.

(58) Rover, M.; Hall, P.; Johnston, P.; Smith, R.; Brown, R. Stabilization of bio-oils using low temperature, low pressure hydrogenation. *Fuel* 2015.

(59) Muradov, N.; Fidalgo, B.; Gujar, A. C.; Garceau, N.; T-Raissi, A. Production and characterization of Lemna minor bio-char and its catalytic application for biogas reforming. *Biomass and Bioenergy* 2012, 42, 123-131.

(60) Dominguez, A.; Fernindez, Y.; Fidalgo, B.; Pis, J. J.; Menéndez, J. A. Biogas to Syngas by Microwave-Assisted Dry Reforming in the Presence of Char. *Energy & Fuels* 2007, 21 (4), 2066-2071.

(61) Namioka, T.; Son, Y.; Sato, M.; Yoshikawa, K. Practical method of gravimetric tar analysis that takes into account a thermal cracking reaction scheme. *Energy & Fuels* 2009.

(62) Sappok, M.; Wagels, D. Method for stabilizing heating oil or diesel oil, particularly heating oil or diesel oil from the depolymerization of hydrocarbon-containing residues, or pyrolysis oil. U.S. Pat. No. 8,394,264 2013.
(63) POLYCHRONOPOULOU, K.; BAKANDRITSOS, A.; TZITZIOS, V.; FIERRO, J.; EFSTATHIOU, A. Absorption-enhanced reforming of phenol by steam over supported Fe catalysts. *J. Catal.* 2006, 241 (1), 132-148.
(64) Shen, Y.; Yoshikawa, K. Recent progresses in catalytic tar elimination during biomass gasification or pyrolysis-A review. *Renew. Sustain. Energy Rev.* 2013.
(65) Alden, H.; Bjorkman, E. Catalytic cracking of naphthalene on dolomite . . . *Thermochem. biomass* . . . 1993.
(66) Taralas, G.; Vassilatos, V.; Sjostrom, K.; Delgado, J. Thermal and catalytic cracking of n-Heptane in presence of CaO, MgO and Calcined Dolomites. *Can. J. Chem. Eng.* 1991, 69 (6), 1413-1419.
(67) Amonette, J.; Joseph, S. Characteristics of biochar: microchemical properties. Biochar Environental Management: *Science and Technology,* 2009.
(68) Liao, S.; Pan, B.; Li, H.; Zhang, D.; Xing, B. Detecting free radicals in biochars and determining their ability to inhibit the germination and growth of corn, wheat and rice seedlings. *Environ. Sci. Technol.* 2014, 48 (15), 8581-8587.
(69) Li, C. Importance of volatile-char interactions during the pyrolysis and gasification of low-rank fuels-a review. *Fuel* 2013.
(70) Weston, P. M.; Sharifi, V.; Swithenbank, J. Destruction of Tar in a Novel Coanda Tar Cracking System. *Energy & Fuels* 2014, 28 (2), 1059-1065.
(71) Zhang, S.; Asadullah, M.; Dong, L.; Tay, H.; Li, C. An advanced biomass gasification technology with integrated catalytic hot gas cleaning. Part II: Tar reforming using char as a catalyst or as a catalyst support. *Fuel* 2013.
(72) Li, Y.; Guo, L.; Zhang, X.; Jin, H.; Lu, Y. Hydrogen production from coal gasification in supercritical water with a continuous flowing system. *Int. J. Hydrog . . .* 2010.
(73) Newsome, D. S. The Water-Gas Shift Reaction. *Catal. Rev.* 2006, 21 (2), 275-318.
(74) Natesakhawat, S.; Wang, X.; Zhang, L.; Ozkan, U. S. Development of chromium-free iron-based catalysts for high-temperature water-gas shift reaction. *J. Mol. Catal. A Chem.* 2006, 260 (1-2), 82-94.
(75) Shen, Y.; Zhao, P.; Shao, Q.; Ma, D.; Takahashi, F.; Yoshikawa, K. In-situ catalytic conversion of tar using rice husk char-supported nickel-iron catalysts for biomass pyrolysis/gasification. *Appl. Catal. B Environ.* 2014, 152-153, 140-151.
(76) Guan, G.; Chen, G.; Kasai, Y.; Lim, E. W. C.; Hao, X.; Kaewpanha, M.; Abuliti, A.; Fushimi, C.; Tsutsumi, A. Catalytic steam reforming of biomass tar over iron- or nickel-based catalyst supported on calcined scallop shell. *Appl. Catal. B Environ.* 2012, 115-116, 159-168.
(77) Fruehan, R. J. The rate of reduction of iron oxides by carbon. *Metall. Trans.* B 1977, 8 (1), 279-286.
(78) Nordgreen, T.; Liliedahl, T.; Sjostrom, K. Elemental Iron as a Tar Breakdown Catalyst in Conjunction with Atmospheric Fluidized Bed Gasification of Biomass: A Thermodynamic Study. *Energy & Fuels* 2006, 20 (3), 890-895.
(79) Florin, N. H.; Harris, A. T. Enhanced hydrogen production from biomass with in situ carbon dioxide capture using calcium oxide sorbents. *Chem. Eng. Sci.* 2008, 63 (2), 287-316.
(80) Liu, Z.; Park, C.; Norbeck, J. Sorption enhanced steam hydrogasification of coal for synthesis gas production with in-situ $CO_2$ removal and self-sustained hydrogen supply. *Int. J. Hydrogen Energy* 2013.
(81) Harrison, D. P. Sorption-Enhanced Hydrogen Production: A Review. *Ind. Eng. Chem. Res.* 2008, 47 (17), 6486-6501.

Example 5—Biosolids Incineration Ash as a Novel Catalyst for Enhanced Pyrolysis

Introduction

This example describes a modification to the pyrolysis process using an inexpensive catalyst and a catalytic process to reduce bio-oil and increase py-gas yields. The outcome is the production of clean, renewable energy from biomass, such as wastewater sludge and biosolids.

Pyrolysis is a process that decomposes organic matter (e.g., wood waste, corn stover, wastewater sludge solids) upon heating under anaerobic conditions. The resulting products are biochar—a valuable, clean soil amendment product that offers improved soil moisture holding capacity and plant growth—along with pyrolysis gas (py-gas), and bio-oil which can both be used as fuel. However, raw bio-oil cannot be readily used in conventional burners and engines. This is because raw bio-oil is largely composed of primary tars, a black mixture of high molecular weight hydrocarbons and free carbon that is corrosive, acidic, and reacts over time becoming an unpumpable, viscous mass (Darmstadt et al., 2004). Because of this, bio-oil often requires costly processing before it can be used as a clean fuel; processing technologies also require further development (Sadaka et al., 2009). In contrast, py-gas can be easily burned in existing engines to generate clean, on-site heat and power. Thus, reducing bio-oil yield and increasing py-gas yield is of great interest during the pyrolysis process at many industrial facilities, such as water reclamation facilities.

Over 8 million dry tons of wastewater sludge and wastewater biosolids (WB) and 4 million dry tons of pulp and paper mill sludge (PMS) from water and paper industrial sidestreams are produced in the United States every year (Gude, 2015; Scott et al., 1995). Also, biosolids incineration ash (BIA) is another byproduct from water industrial sidestream and its annual worldwide production is approximately 1.7 million tonnes (Donatello et al., 2013). These residuals are disposed of in landfills and are not often used to produce heat, power and value-added products.

This example describes the novel conversion of bio-oil to py-gas using inexpensive biochar derived from WB and PMS as a catalyst and using BIA as a catalyst directly. We have proven that these two biochar catalysts are surprisingly more effective than other biochars used for catalysis thus far and BIA is also effective to increase py-gas yield and reduce bio-oil yield simultaneously. Others have shown that py-gas yield can be increased and bio-oil production can be reduced during the pyrolysis of wood using biochar catalysts derived from pine wood (PW) or corn stover (CS) (Gilbert et al., 2009; Sun et al., 2011; Ren et al., 2014). However, these previous studies showed that hydrocarbons such as phenol still remained in the bio-oil. Surprisingly, we discovered that WB-biochar and PMS-biochar are better biochar based catalysts due to their higher concentration of alkali metals, alkaline earth metals and other metals such as iron compared to PW-biochar and CS-biochar. BIA is also a cost-efficient catalyst because it contains high contents of calcium and iron. These three new catalysts can increase py-gas yield, decrease py-oil yield, minimize bio-oil heavy hydrocarbons to below detection limits, and have longer catalytic lifetime.

The work described below was performed to evaluate the catalytic effect of WB-biochar, PMS-biochar and BIA on the pyrolysis product yield and quality. The catalytic effect of WB-biochar and PMS-biochar was compared to that of CS-biochar and PW-biochar under identical conditions.

Methodology

The mobile bench-scale thermochemical conversion system shown in FIG. 1 was used. Dried biosolids chaff (i.e. one type of WB, the fine powder and debris originated from the wastewater biosolids drying process) was pyrolyzed in the main reactor vessel at 600° C. to 800° C. with the introduction of BIA catalyst in the downstream tubular reactor, where the vapor-phase passed through the catalyst bed. The biosolids chaff was from Milwaukee Metropolitan Sewerage District (MMSD). This chaff is similar to chaff produced at wastewater treatment plants around the world and was used to represent typical wastewater treatment plant sludge. We anticipate that results using chaff from other wastewater treatment plants will behave similarly to the results we have observed for the MMSD chaff. The tubular reactor was maintained at 600° C. to 800° C. The ash/chaff mass ratio varied from 0.2 to 1. Blank tests without catalyst were conducted as controls. The tubular reactor was maintained at 500° C. for blank tests. Also, the BIA catalyst was recycled 5 times at 800° C. with an ash/chaff mass ratio of 1 to evaluate the effectiveness over multiple cycles.

Results and Discussion

Figure 14:
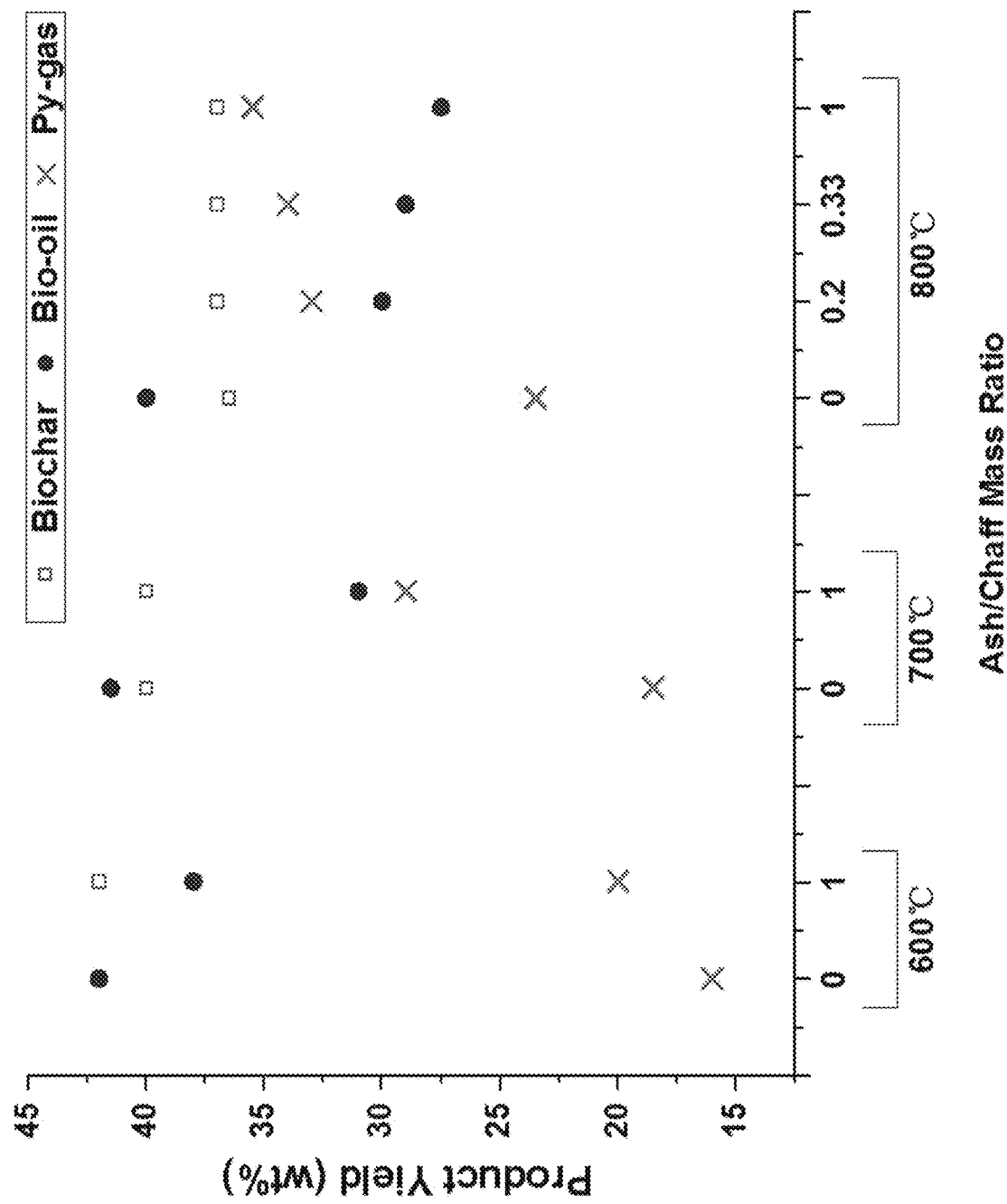
FIG. 14. Catalytic effect of BIA catalyst on the product yield during biosolids chaff pyrolysis (0 denotes non-catalytic test without catalyst introduced as a control; 0.2, 0.33 and 1 denote different ash/chaff mass ratios).
Figure 15:
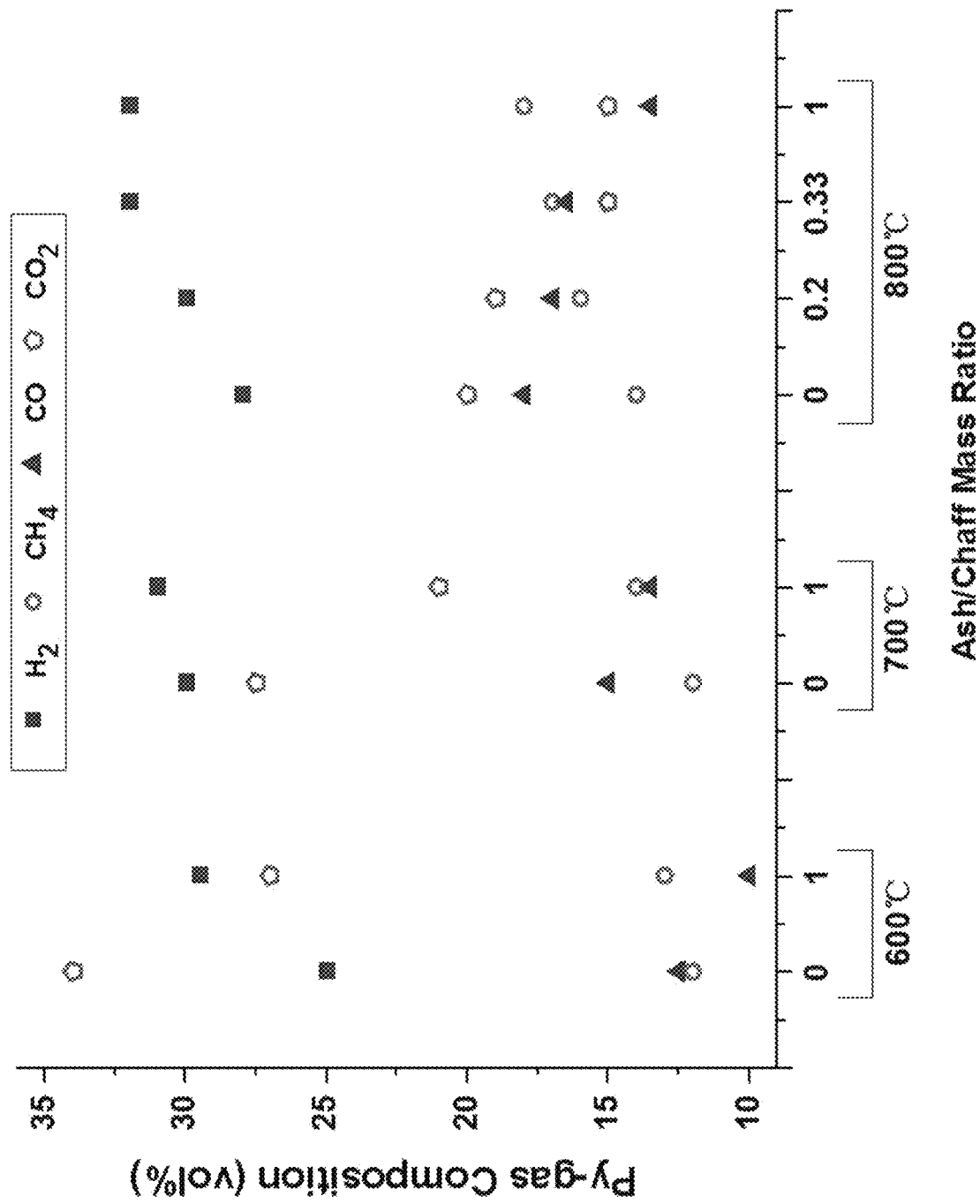
FIG. 15. Catalytic effect of BIA catalyst on the py-gas composition during biosolids chaff pyrolysis (0 denotes non-catalytic test without catalyst introduced as a control; 0.2, 0.33 and 1 denote different ash/chaff mass.
Figure 16:
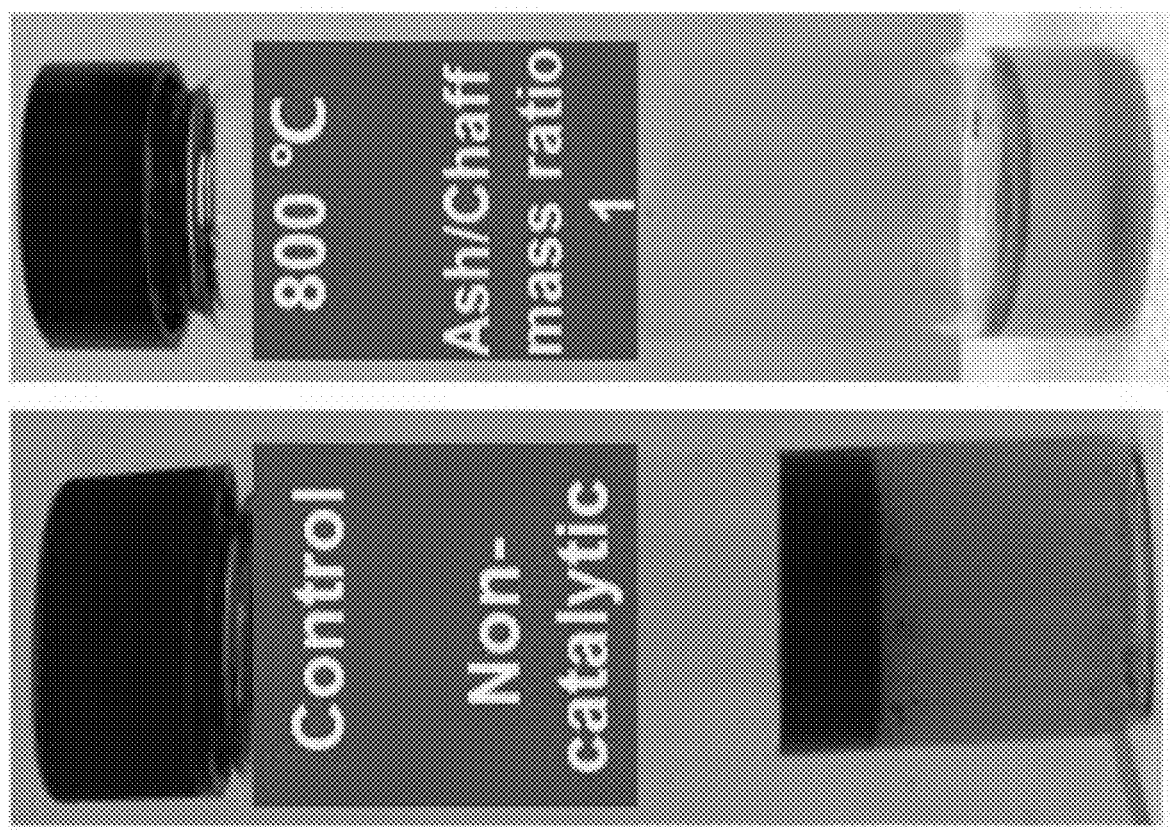
FIG. 16. Catalytic effect of BIA catalyst on the optical properties of biosolids chaff pyrolysis bio-oil from 800° C. tests (0 denotes non-catalytic test without catalyst introduced as a control; 1 indicates test performed with an ash/chaff mass ratio of 1).
Figure 17:
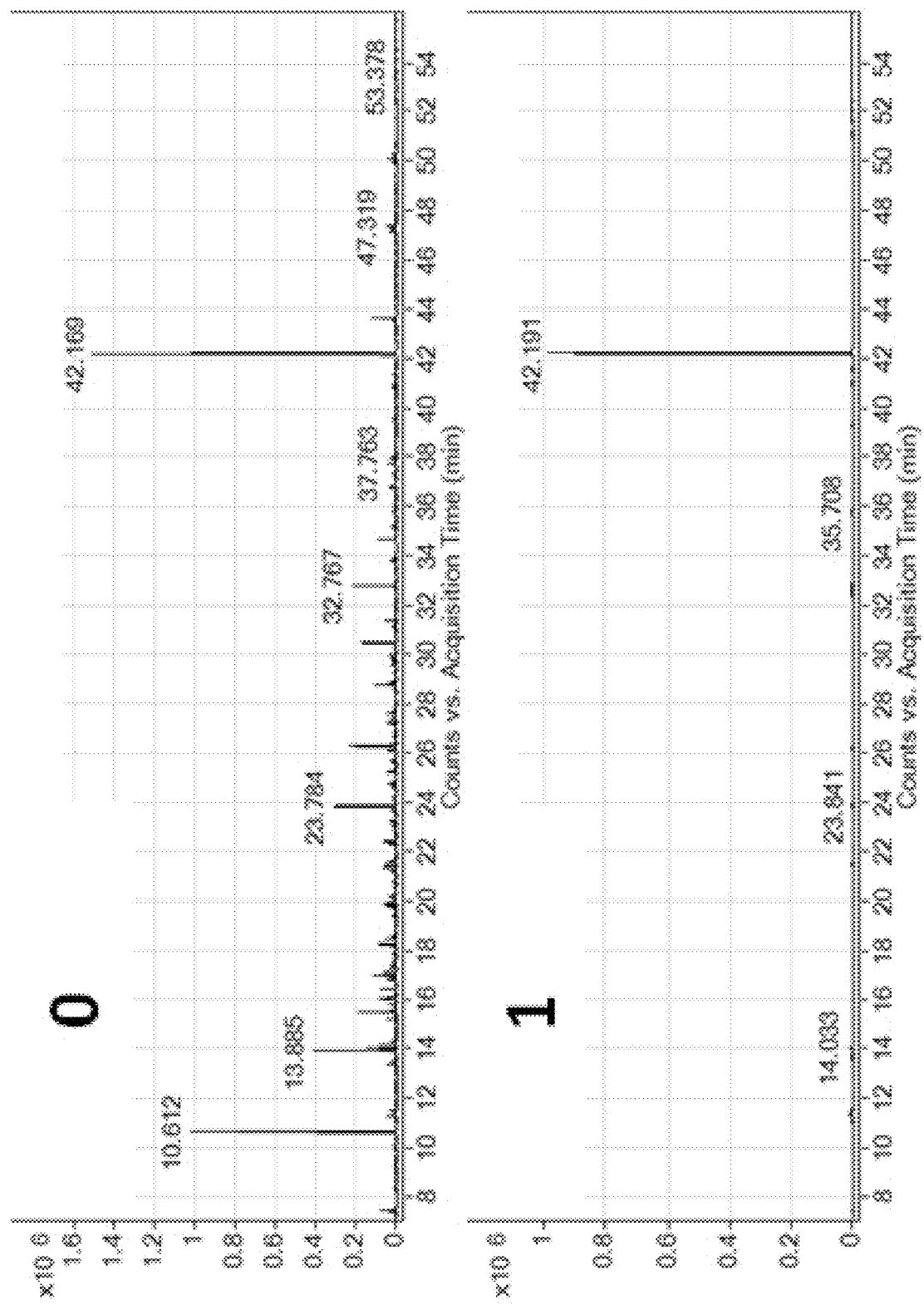
FIG. 17. GC-MS of bio-oils from 800° C. tests ("0" denotes non-catalytic test without catalyst introduced as a control; "1" indicates test performed with an ash/chaff mass ratio of 1).

The results of product distribution are shown in FIG. 14. Compared to the blank test without catalyst (0), the addition of our BIA significantly increased py-gas yield and greatly decreased bio-oil production. Taking 800° C. for example, compared to the blank test, our BIA catalyst decreased the mass yield of bio-oil by 31% (from 40% to 27.5% of total product mass). Meanwhile, the yield of py-gas increased 51% (from 23.5% to 35.5% of the total product mass). Besides, BIA catalyst improved py-gas quality by increasing the composition of energetic gas component (FIG. 15). $H_2$% increased to 30% and $CO_2$% decreased 5% in the BIA catalyzed py-gases. The color of bio-oil was different when using BIA, changing from dark brown (non-catalytic) to light yellow (FIG. 16). The darkness is proportional to the concentration of undesirable, unsaturated hydrocarbons and oxygen-containing organic constituents in the oil. The light-yellow color of BIA catalyzed bio-oil implied that most unsaturated hydrocarbons were decomposed. The chemical analyses of bio-oils are shown in FIG. 17. The results were in accordance with the bio-oil color change. Only 10 unsaturated hydrocarbons were identified by gas chromatography mass spectrometry (GC-MS) catalyzed bio-oils, almost all the oxygen-containing organic constituents such as aldehydes, ketones, guaiacols and ethers, were below detection limits, while over 40 unsaturated hydrocarbons were present in the non-catalytic bio-oil.

Figure 18:
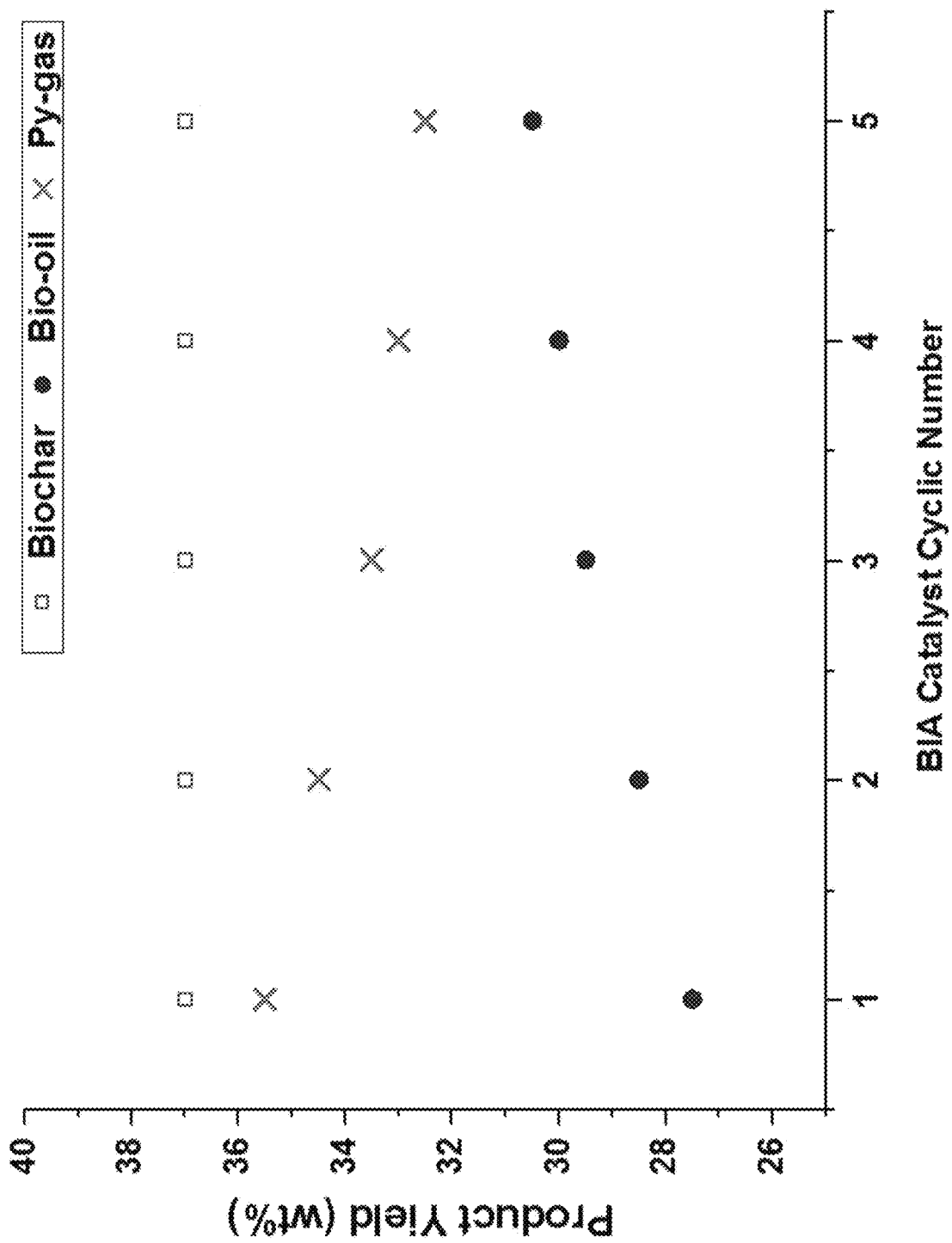
FIG. 18. Effect of BIA catalyst cyclic number on the product yield at 800° C. (ash/chaff mass ratio was 1).

Moreover, the lifetime of BIA catalyst was evaluated and the results are shown in FIG. 18. BIA catalyst's activity was weakened slightly after 5 cyclic uses. The py-gas yield only decreased 3% (from 35.5% to 32.5%) and bio-oil yield increased 3% at the same time (from 27.5% to 30.5%). After 5 cycles, py-gas yield was still higher than that of blank test (23.5%). Hence, BIA catalyst was stable cyclically.

The good catalytic effect of BIA is most likely due to the high contents of specific inherent elements. These elements are highlighted in Table 6. High concentrations of calcium (10.2%), iron (4.82%), phosphorus (8.4%), potassium (2.93%), and magnesium (4.43%) could result in the good catalytic performance. Also, our BIA contained trace heavy metals such as chromium, nickel and zinc. All the aforementioned elements have been found to be catalytic in tar breakdown, reforming, and conversion to permanent gases (Shen et al., 2013; Nordgreen et al., 2006; Nowakowski et al., 2008; Wang et al., 2011; Nokkosmaki, 2000). Therefore, our BIA have very good catalytic abilities.

Summary

Biosolids incineration ash (BIA) was determined to be a low-cost catalyst for pyrolysis. The use of BIA as a catalyst significantly increased py-gas yield and simultaneously reduced bio-oil yield. The use of BIA as a catalyst also minimized heavy hydrocarbon contents with longer lifetime and improved the bio-oil color to light-yellow. The additional py-gas produced by using BIA as a catalyst can be used easily for on-site energy recovery at water recovery facilities.

TABLE 6

Element analysis of BIA catalyst (wt. %)

| Element | BIA |
| --- | --- |
| Mg | 4.43 |
| Ca | 10.2 |
| K | 2.93 |
| Na | 1.13 |
| P | 8.4 |
| Ni | 0.01 |
| Cu | 0.21 |
| Zn | 0.21 |
| Mn | 0.06 |
| Fe | 4.82 |
| Cr | 0.01 |

References

Darmstadt, H., Garcia-Perez, M., Adnot, A., Chaala, A., Kretschmer, D., & Roy, C. (2004). Corrosion of metals by bio-oil obtained by vacuum pyrolysis of softwood bark residues. An X-ray photoelectron spectroscopy and auger electron spectroscopy study. *Energy & fuels*, 18(5), 1291-1301.

Donatello, S., & Cheeseman, C. R. (2013). Recycling and recovery routes for incinerated sewage sludge ash (ISSA): A review. *Waste Management*, 33(11), 2328-2340.

Gude, V. G. (2015). Energy positive wastewater treatment and sludge management. *Edorium Journal of Waste Management*, 1, 10-15.

Gilbert, P., Ryu, C., Sharifi, V., & Swithenbank, J. (2009). Tar reduction in pyrolysis vapours from biomass over a hot char bed. *Bioresource technology*, 100(23), 6045-6051.

Nowakowski, D. J., Woodbridge, C. R., & Jones, J. M. (2008). Phosphorus catalysis in the pyrolysis behaviour of biomass. *Journal of Analytical and Applied Pyrolysis*, 83(2), 197-204.

Nordgreen, T., Liliedahl, T., & Sjostrom, K. (2006). Metallic iron as a tar breakdown catalyst related to atmospheric, fluidised bed gasification of biomass. *Fuel*, 85(5), 689-694.

Nokkosmaki, M. I., Kuoppala, E. T., Leppämäki, E. A., & Krause, A. O. I. (2000). Catalytic conversion of biomass pyrolysis vapours with zinc oxide. *Journal of Analytical and Applied Pyrolysis,* 55(1), 119-131.

Ren, S., Lei, H., Wang, L., Bu, Q., Chen, S., & Wu, J. (2014). Hydrocarbon and hydrogen-rich syngas production by biomass catalytic pyrolysis and bio-oil upgrading over biochar catalysts. *RSC Advances,* 4(21), 10731-10737.

Sadaka, S., & Boateng, A. A. (2009). *Pyrolysis and bio-oil.* Cooperative Extension Service, University of Arkansas, US Department of Agriculture and county governments cooperating.

Scott, G. M., & Smith, A. (1995, May). Sludge characteristics and disposal alternatives for the pulp and paper industry. In TAPPI INTERNATIONAL ENVIRONMENTAL CONFERENCE (pp. 269-269). *TAPPI PRESS.*

Shen, Y., & Yoshikawa, K. (2013). Recent progresses in catalytic tar elimination during biomass gasification or pyrolysis-a review. *Renewable and Sustainable Energy Reviews,* 21, 371-392.

Sun, Q., Yu, S., Wang, F., & Wang, J. (2011). Decomposition and gasification of pyrolysis volatiles from pine wood through a bed of hot char. *Fuel,* 90(3), 1041-1048.

Wang, L., Li, D., Koike, M., Koso, S., Nakagawa, Y., Xu, Y., & Tomishige, K. (2011). Catalytic performance and characterization of Ni—Fe catalysts for the steam reforming of tar from biomass pyrolysis to synthesis gas. *Applied Catalysis A: General,* 392(1), 248-255.

It will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scope of this invention.

Citations to a number of patent and non-patent references are made herein. The cited references are incorporated by reference herein in their entireties. In the event that there is an inconsistency between a definition of a term in the specification as compared to a definition of the term in a cited reference, the term should be interpreted based on the definition in the specification.

We claim:

1. A method comprising performing pyrolysis of a biomass or biosolids in the presence of a catalyst, the method comprising:
   (a) performing pyrolysis of the biomass or biosolids in a first heated reactor vessel to generate a pyrolysis product, wherein the pyrolysis product comprises a vapor;
   (b) transferring the pyrolysis product to a second heated reactor vessel and heating the pyrolysis product to a temperature of at least about 700° C. in the second heated reactor vessel in the presence of the catalyst to obtain a treated pyrolysis product comprising a treated pyrolysis vapor, wherein the catalyst comprises a biochar obtained from pyrolysis of wastewater biosolids (WB-biochar), a biochar obtained from pyrolysis of paper mill sludge (PMS-biochar), or ash obtained from biosolids incineration (BIA), and wherein during heating, the catalyst and the pyrolysis product are present in the second heated reactor vessel at a concentration ratio by weight of (0.2-1):1; and
   (c) transferring the treated pyrolysis product from the second heated reactor vessel to a condenser and separating the treated pyrolysis vapor from the treated pyrolysis product in the condenser to obtain a liquid product comprising bio-oil and a gaseous product comprising py-gas.

2. The method of claim 1, comprising heating the pyrolysis product to a temperature of at least about 800° C. in the second heated reactor vessel.

3. The method of claim 1, wherein the catalyst comprises metal or a salt or oxide thereof selected from calcium, iron, and magnesium.

4. The method of claim 1, wherein the catalyst comprises magnesium metal, magnesium salt, or magnesium oxide, at a concentration of at least about 2% by dry weight.

5. The method of claim 1, wherein the catalyst comprises calcium metal, calcium salt, or calcium oxide, at a concentration of at least about 6% by dry weight.

6. The method of claim 1, wherein the catalyst comprises iron metal, iron salt, or iron oxide, at a concentration of at least about 10% by dry weight.

7. The method of claim 1, wherein the catalyst is WB-biochar produced by pyrolyzing dried biosolids material comprising waste activated sludge, raw primary sludge, anaerobically digested sludge, aerobically digester sludge, lime-stabilized sludge, or a mixture thereof.

8. The method of claim 1 further comprising recycling the catalyst after performing step (b) in a further treatment step wherein a second pyrolysis product is heated to a temperature of at least about 700° C. in the presence of the recycled catalyst to obtain a second treated pyrolysis product.

9. The method of claim 8, wherein the second pyrolysis product is different from the pyrolysis product of claim 1.

* * * * *

UNITED STATES PATENT AND TRADEMARK OFFICE
CERTIFICATE OF CORRECTION

PATENT NO. : 12,152,197 B2
APPLICATION NO. : 17/153651
DATED : November 26, 2024
INVENTOR(S) : Daniel Zitomer et al.

It is certified that error appears in the above-identified patent and that said Letters Patent is hereby corrected as shown below:

In the Specification

Column 8, Line 44, "MilorganiteR" should be --Milorganite®--.

Column 9, Line 20, "KJ/kg" should be --kJ/kg--.

Column 9, Line 59, "KJ/m$^3$" should be --kJ/m$^3$--.

Column 10, Line 29, "KJ/kg" should be --kJ/kg--.

Column 12, Line 5, "can" should be --Can--.

Column 13, Line 23, "MilorganiteR" should be --Milorganite®--.

Column 14, Line 1, "KJ/kg" should be --kJ/kg--.

Column 18, Line 29, "KJ/m$^3$" should be --kJ/m$^3$--.

Column 18, Line 31, "KJ/kg" should be --kJ/kg--.

Column 18, Line 36, "KJ/kg" should be --kJ/kg--.

Column 23, Line 36, "a level=5%" should be --α level=5%--.

Column 27, TABLE 3, Line 6, "GaO" should be --CaO--.

Column 27, TABLE 3, Line 7, "Fe$_3$O$_2$" should be --Fe$_2$O$_3$--.

Column 28, TABLE 4, Line 8, "3,5-Olmethoxy-4" should be --3,5-Dimethoxy-4--.

Signed and Sealed this
Eighteenth Day of March, 2025

Coke Morgan Stewart
*Acting Director of the United States Patent and Trademark Office*

Column 32, Line 37, "SjÖstrÖm" should be --Sjöström--.

Column 32, Line 60, "Fernindez" should be --Fernández--.

Column 33, Line 14, "Sjostrom" should be --Sjöström--.

Column 33, Line 57, "Sjostrom" should be --Sjöström--.

Column 36, Line 62, "Sjostrom" should be --Sjöström--.